United States Patent
Xu et al.

(10) Patent No.: US 11,792,685 B2
(45) Date of Patent: *Oct. 17, 2023

(54) DATA REPORTING METHOD, DATA RECEIVING METHOD, AND RELATED APPARATUS

(71) Applicant: Huawei Technologies Co., Ltd., Shenzhen (CN)

(72) Inventors: Minghui Xu, Shenzhen (CN); Xi Zhang, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/721,593

(22) Filed: Apr. 15, 2022

(65) Prior Publication Data

US 2022/0248266 A1    Aug. 4, 2022

Related U.S. Application Data

(63) Continuation of application No. 16/837,798, filed on Apr. 1, 2020, now Pat. No. 11,317,320, which is a (Continued)

(30) Foreign Application Priority Data

Nov. 25, 2017   (CN) .......................... 201711197927.9

(51) Int. Cl.
*H04W 28/06* (2009.01)
*H04W 72/21* (2023.01)
*H04W 72/51* (2023.01)

(52) U.S. Cl.
CPC ........... *H04W 28/06* (2013.01); *H04W 72/21* (2023.01); *H04W 72/51* (2023.01)

(58) Field of Classification Search
None
See application file for complete search history.

(56) References Cited

U.S. PATENT DOCUMENTS

| | | |
|---|---|---|
| 2010/0103887 A1 | 4/2010 | Zhu et al. |
| 2011/0268043 A1 | 11/2011 | Golitschek Edler Von Elbwart |

(Continued)

FOREIGN PATENT DOCUMENTS

| | | |
|---|---|---|
| CN | 1946231 A | 4/2007 |
| CN | 101984572 A | 3/2011 |

(Continued)

OTHER PUBLICATIONS

"PTRS for CP-OFDM," 3GPP TSG RAN WG1 Meeting #89, R1-1706937, Hangzhou, China, total 6 pages, 3rd Generation Partnership Project, Valbonne, France (May 15-19, 2017).

(Continued)

*Primary Examiner* — Hong S Cho
(74) *Attorney, Agent, or Firm* — Leydig, Voit & Mayer, Ltd.

(57) ABSTRACT

This application discloses a method, including: determining, by a network device, at least one modulation and coding scheme (MCS) threshold; sending, by the network device to a terminal device, the at least one MCS threshold; wherein the at least one MCS threshold and a maximum MCS threshold are associated with a first MCS table corresponding to a highest modulation scheme supported by the terminal device; wherein the highest modulation scheme supported by the terminal device is 64 QAM, and the maximum MCS threshold is 29; or the highest modulation scheme supported by the terminal device is 256 QAM, and the maximum MCS threshold is 28.

21 Claims, 17 Drawing Sheets

Related U.S. Application Data continuation of application No. PCT/CN2018/115613, filed on Nov. 15, 2018.

(56) References Cited

U.S. PATENT DOCUMENTS

| | | | |
|---|---|---|---|
| 2012/0288020 | A1 | 11/2012 | Suga et al. |
| 2013/0258968 | A1* | 10/2013 | Hong ................. H04W 52/262 |
| | | | 370/329 |
| 2014/0313985 | A1 | 10/2014 | Nimbalker et al. |
| 2014/0321406 | A1 | 10/2014 | Marinier et al. |
| 2015/0365181 | A1 | 12/2015 | Nagata et al. |
| 2016/0205564 | A1* | 7/2016 | Ren ....................... H04L 27/362 |
| | | | 370/252 |
| 2017/0012735 | A1 | 1/2017 | Yang et al. |
| 2017/0019909 | A1 | 1/2017 | Si et al. |
| 2018/0279337 | A1* | 9/2018 | Kwon ................... H04L 1/0016 |
| 2020/0163078 | A1 | 5/2020 | Jiang et al. |

FOREIGN PATENT DOCUMENTS

| | | |
|---|---|---|
| CN | 102035579 A | 4/2011 |
| CN | 104426628 A | 3/2015 |
| CN | 105939539 A | 9/2016 |
| CN | 106357370 A | 1/2017 |
| CN | 107294573 A | 10/2017 |
| CN | 108632009 A | 10/2018 |
| CN | 109802754 A | 5/2019 |
| EP | 3605924 A1 | 2/2020 |
| EP | 3713118 A1 | 9/2020 |

OTHER PUBLICATIONS

"Further details of PTRS," 3GPP TSG RAN WG1 Meeting #90bis, R1-1717306, Prague, Czech Republic, total 13 pages, 3rd Generation Partnership Project, Valbonne, France (Oct. 9-13, 2017).

"3rd Generation Partnership Project; Technical Specification Group Radio Access Network; NR; Physical layer procedures for data (Release 15)," 3GPP TS 38.214 V1.2.0, total 54 pages, 3rd Generation Partnership Project, Valbonne, France (Nov. 2017).

"PTRS for CP-OFDM," 3GPP TSG RAN WG1 Meeting #90, R1-1712241, Prague, Czech Republic, total 9 pages, 3rd Generation Partnership Project, Valbonne, France (Aug. 21-25, 2017).

"3rd Generation Partnership Project;Technical Specification Group Radio Access Network; NR; Physical layer procedures for data (Release 15)," 3GPP TS 38.214 V1.0.0, total 32 pages, 3rd Generation Partnership project, Valbonne, France (Sep. 2017).

"PTRS for CP-OFDM," 3GPP TSG RAN WG1 Ad Hoc Meeting, Qingdao, China, R1-1709939, total 6 pages, 3rd Generation Partnership Project, Valbonne, France (Jun. 27-30, 2017).

"CQI/ MCS/TBS table design for higher order modulation," 3GPP TSG RAN WG1 #76, Prague, Czech Republic, R1-140593, total 5 pages, 3rd Generation Partnership Project, Valbonne, France (Feb. 10-14, 2014).

"3rd Generation Partnership Project; Technical Specification Group Radio Access Network; Evolved Universal Terrestrial Radio Access (E-UTRA); Physical layer procedures (Release 14)," 3GPP TS 36.213 V14.4.0, total 462 pages, 3rd Generation Partnership Project, Valbonne, France (Sep. 2017).

\* cited by examiner

DATA REPORTING METHOD, DATA RECEIVING METHOD, AND RELATED APPARATUS

CROSS-REFERENCE TO RELATED APPLICATIONS

This application is a continuation of U.S. patent application Ser. No. 16/837,798, filed on Apr. 1, 2020, which is a continuation of International Application No. PCT/CN2018/115613, filed on Nov. 15, 2018, which claims priority to Chinese Patent Application No. 201711197927.9, filed on Nov. 25, 2017. All of the afore-mentioned patent applications are hereby incorporated by reference in their entireties.

TECHNICAL FIELD

The present disclosure relates to the communications field, and in particular, to a data reporting method, a data receiving method, and a related apparatus.

BACKGROUND

In an existing wireless communications network, fewer frequency bands are available in frequency resources below 6 GHz. Consequently, increasing communication requirements cannot be met. On the contrary, there are a large quantity of available frequency bands in a frequency range above 6 GHz. In a next generation communications network (for example, NR (new radio)), use of frequencies above 6 GHz as an operating frequency band is being considered. Therefore, the next generation communications network has a distinguishing feature of a high-frequency communications system, to easily achieve a higher throughput. However, compared with the existing wireless communications network, because the next generation communications network operates in a frequency band above 6 GHz, the next generation communications network suffers from more severe mid-radio frequency distortion, especially impact brought by phase noise.

To suppress phase noise, the next generation communications network provides a phase tracking reference signal (PTRS). A base station delivers one group of scheduling bandwidth thresholds and one group of scheduling MCS thresholds to UE, determines a corresponding phase tracking reference signal pattern based on scheduling information, the delivered group of scheduling bandwidth thresholds, and the delivered group of scheduling MCS thresholds, and sends a PTRS to the UE based on the determined phase tracking reference signal pattern. Before delivering the group of scheduling bandwidth thresholds and the group of scheduling MCS thresholds to the UE, the base station may consider one group of scheduling bandwidth threshold sets and/or one group of scheduling bandwidth modulation and coding scheme MCS (modulation and coding scheme) threshold sets that are reported by the UE as suggested values. How to reduce overheads for reporting thresholds by UE is a problem urgently to be resolved.

SUMMARY

A technical problem to be resolved by embodiments of the present disclosure is to provide a data reporting method, a data receiving method, and a related device, to compress thresholds to be reported by a terminal device, thereby reducing a data amount of the thresholds to be reported by the terminal device, and reducing resource overheads for reporting the thresholds by the terminal device.

According to a first aspect, this application provides a data reporting method, including: determining, by a terminal device, at least one scheduling bandwidth threshold, where each scheduling bandwidth threshold is a natural number power of 2; obtaining, by the terminal device, at least one element based on the at least one scheduling bandwidth threshold, where each element is used to indicate one of the at least one scheduling bandwidth threshold; and sending, by the terminal device, the at least one element to a network device.

The at least one scheduling bandwidth threshold is different from each other. A value of each scheduling bandwidth threshold may be $2^0$, $2^1$, $2^2$, ..., or the like. An element quantity of the at least one element is equal to a scheduling bandwidth threshold quantity of the at least one scheduling bandwidth threshold, the at least one element is in a one-to-one correspondence with the at least one scheduling bandwidth threshold, and each element is used to indicate one of the at least one scheduling bandwidth threshold. For example, a first element in the at least one element is used to indicate a first scheduling bandwidth threshold, and a second element in the at least one element is used to indicate a second scheduling bandwidth threshold. A value of an element may be less than a scheduling bandwidth threshold indicated by the element. For example, a value of the first element is less than the first scheduling bandwidth threshold, and a value of the second element is less than the second scheduling bandwidth threshold.

According to the foregoing descriptions, the scheduling bandwidth threshold reported by the terminal device to the network device is a natural number power of 2, so that a value range of the scheduling bandwidth threshold becomes smaller, and a quantity of scheduling bandwidth thresholds that can be selected by the terminal device is reduced. A reported scheduling bandwidth threshold is indicated by an element in a data set. In this way, a value of an element actually reported by the terminal device is less than an original scheduling bandwidth threshold, thereby reducing an amount of data reported by the terminal device.

In a possible design, a value of each element is a logarithm of the scheduling bandwidth threshold indicated by the element to a base 2.

In a possible design, a value of the at least one scheduling bandwidth threshold is less than or equal to a maximum bandwidth supported by the terminal device.

In a possible design, each of the at least one scheduling bandwidth threshold is greater than a preset value.

According to a second aspect, this application provides a data reporting apparatus, including:
a determining unit, configured to determine at least one scheduling bandwidth threshold, where each scheduling bandwidth threshold is a natural number power of 2;
a generating unit, configured to obtain at least one element based on the at least one scheduling bandwidth threshold, where each element is used to indicate one of the at least one scheduling bandwidth threshold; and
a sending unit, configured to send the at least one element to a network device.

In a possible design, a value of each element is a logarithm of the indicated scheduling bandwidth threshold to a base 2.

In a possible design, a maximum scheduling bandwidth threshold in the at least one scheduling bandwidth threshold is less than or equal to a maximum bandwidth supported by the terminal device.

In a possible design, each of the at least one scheduling bandwidth threshold is greater than a preset value.

According to a third aspect, this application provides a data receiving method, including:

receiving, by a network device, at least one element from a terminal device, where each element is used to indicate one scheduling bandwidth threshold; and obtaining, by the network device, at least one scheduling bandwidth threshold based on the at least one element, where each scheduling bandwidth threshold is a natural number power of 2.

In a possible design, each scheduling bandwidth threshold is equal to a $k^{th}$ power of 2, where k is a value of a corresponding element.

According to a fourth aspect, this application provides a data receiving apparatus, including:

a receiving unit, configured to receive at least one element from a terminal device, where each element is used to indicate one scheduling bandwidth threshold; and a generating unit, configured to obtain at least one scheduling bandwidth threshold based on the at least one element, where each scheduling bandwidth threshold is a natural number power of 2.

In a possible design, each scheduling bandwidth threshold is equal to a $k^{th}$ power of 2, where k is a value of a corresponding element.

According to a fifth aspect, this application provides a data reporting method, including:

determining, by a terminal device, at least one scheduling bandwidth threshold, where a maximum scheduling bandwidth threshold in the at least one scheduling bandwidth threshold is less than or equal to a maximum bandwidth supported by the terminal device; and sending, by the terminal device, the at least one scheduling bandwidth threshold to a network device.

According to a sixth aspect, this application provides a data reporting apparatus, including:

a determining unit, configured to determine at least one scheduling bandwidth threshold, where a maximum scheduling bandwidth threshold in the at least one scheduling bandwidth threshold is less than or equal to a maximum bandwidth supported by a terminal device; and a sending unit, configured to send the at least one scheduling bandwidth threshold to a network device.

According to a seventh aspect, this application provides a data reporting method, including:

determining, by a terminal device, at least one scheduling bandwidth threshold, where a minimum scheduling bandwidth threshold in the at least one scheduling bandwidth threshold is greater than a preset value;

obtaining, by the terminal device, at least one element based on the at least one scheduling bandwidth threshold, where each element is used to indicate one of the at least one scheduling bandwidth threshold; and sending, by the terminal device, the at least one element to a network device.

According to an eighth aspect, this application provides a data reporting apparatus, including:

a determining unit, configured to determine at least one scheduling bandwidth threshold, where a minimum scheduling bandwidth threshold in the at least one scheduling bandwidth threshold is greater than a preset value;

a generating unit, configured to obtain at least one element based on the at least one scheduling bandwidth threshold, where each element is used to indicate one of the at least one scheduling bandwidth threshold; and a sending unit, configured to send the at least one element to a network device.

In a possible design, each scheduling bandwidth threshold is a natural number power of 2.

In a possible design, each scheduling bandwidth threshold is a product of a natural number power of 2, a natural number power of 3, and a natural number power of 5.

According to a ninth aspect, this application provides a data reporting method, including:

determining, by a terminal device, at least one scheduling bandwidth threshold, where each scheduling bandwidth threshold is a product of a natural number power of 2, a natural number power of 3, and a natural number power of 5; generating, by the terminal device, at least one element, where each element is used to indicate one of the at least one scheduling bandwidth threshold; and sending, by the terminal device, the at least one element to a network device.

In a possible design, a waveform used by the terminal device is DFT-S-OFDM.

In a possible design, each scheduling bandwidth threshold is less than or equal to a maximum bandwidth supported by the terminal device.

According to a tenth aspect, this application provides a data reporting apparatus, including:

a determining unit, configured to determine at least one scheduling bandwidth threshold, where each scheduling bandwidth threshold is a product of a natural number power of 2, a natural number power of 3, and a natural number power of 5;

a generating unit, configured to obtain at least one element based on the at least one scheduling bandwidth threshold, where each element is used to indicate one of the at least one scheduling bandwidth threshold; and a sending unit, configured to send the at least one element to a network device.

In a possible design, a waveform used by the terminal device is DFT-S-OFDM.

In a possible design, each scheduling bandwidth threshold is less than or equal to a maximum bandwidth supported by the terminal device.

According to an eleventh aspect, this application provides a data receiving method, including:

receiving, by a network device, at least one element from a terminal device, where each element is used to indicate one scheduling bandwidth threshold; and obtaining, by the network device, at least one scheduling bandwidth threshold based on the at least one element, where each scheduling bandwidth threshold is a product of a natural number power of 2, a natural number power of 3, and a natural number power of 5.

According to a twelfth aspect, this application provides a data receiving apparatus, including:

a receiving unit, configured to receive at least one element from a terminal device, where each element is used to indicate one scheduling bandwidth threshold; and a generating unit, configured to obtain at least one scheduling bandwidth threshold based on the at least one element, where each scheduling bandwidth threshold is a product of a natural number power of 2, a natural number power of 3, and a natural number power of 5.

In a possible design, a waveform used by the terminal device is a DFT-S-OFDM waveform.

According to a thirteenth aspect, this application provides a data reporting method, including: determining, by a terminal device, two scheduling bandwidth thresholds, where a larger one of the two scheduling bandwidth thresholds is less than a maximum bandwidth supported by the terminal device; and sending, by the terminal device, the two scheduling bandwidth thresholds to a network device.

According to a fourteenth aspect, this application provides a data reporting apparatus, including:

a determining unit, configured to determine two scheduling bandwidth thresholds, where a larger one of the two scheduling bandwidth thresholds is less than a maximum bandwidth supported by the terminal device; and a sending unit, configured to send the two scheduling bandwidth thresholds to a network device.

According to a fifteenth aspect, this application provides a data reporting method, including:

a determining unit, configured to determine at least one scheduling bandwidth threshold associated with a first subcarrier spacing; and a sending unit, configured to send the at least one scheduling bandwidth threshold associated with the first subcarrier spacing to a network device.

In a possible design, the first subcarrier spacing is associated with two scheduling bandwidth thresholds, and each scheduling bandwidth threshold is less than or equal to a maximum bandwidth supported by the terminal device.

According to a sixteenth aspect, this application provides a data reporting apparatus, including:

a determining unit, configured to determine at least one scheduling bandwidth threshold associated with a first subcarrier spacing; and a sending unit, configured to send the at least one scheduling bandwidth threshold associated with the first subcarrier spacing to a network device.

In a possible design, the first subcarrier spacing is associated with two scheduling bandwidth thresholds, and each scheduling bandwidth threshold is less than or equal to a maximum bandwidth supported by a terminal device.

According to a seventeenth aspect, this application provides a data receiving method, including:

receiving, by a network device from a terminal device, at least one scheduling bandwidth threshold associated with a first subcarrier spacing; and determining, by the network device based on a ratio relationship between the first subcarrier spacing and a second subcarrier spacing, at least one scheduling bandwidth threshold associated with the second subcarrier spacing.

In a possible design, the first subcarrier spacing is associated with two scheduling bandwidth thresholds, and each scheduling bandwidth threshold is less than or equal to a maximum bandwidth supported by the terminal device.

According to an eighteenth aspect, this application provides a data receiving apparatus, including:

a receiving unit, configured to receive, from a terminal device, at least one scheduling bandwidth threshold associated with a first subcarrier spacing; and a generating unit, configured to determine, based on a ratio relationship between the first subcarrier spacing and a second subcarrier spacing, at least one scheduling bandwidth threshold associated with the second subcarrier spacing.

In a possible design, the first subcarrier spacing is associated with two scheduling bandwidth thresholds, and each scheduling bandwidth threshold is less than or equal to a maximum bandwidth supported by the terminal device.

According to a nineteenth aspect, this application provides a data reporting method, including:

determining, by a terminal device, n scheduling bandwidth thresholds, where the n scheduling bandwidth thresholds are $ptrsthRB_1$, $ptrsthRB_2$, ..., and $ptrsthRB_n$, $ptrsthRB_1 < ptrsthRB_2 < ... < ptrsthRB_n$, and n is an integer greater than 1; and sending, by the terminal device, $ptrsthRB_1$, $ptrsthRB_2-ptrsthRB_1$, ..., and $ptrsthRB_n-ptrsthRB_{n-1}$ to a network device.

In a possible design, n is equal to 2, and $ptrsthRB_1$ and $ptrsthRB_2$ each are less than or equal to a maximum bandwidth supported by the terminal device.

According to a twentieth aspect, this application provides a data reporting apparatus, including:

a determining unit, configured to determine n scheduling bandwidth thresholds, where the n scheduling bandwidth thresholds are $ptrsthRB_1$, $ptrsthRB_2$, ..., and $ptrsthRB_n$, $ptrsthRB_1 < ptrsthRB_2 < ... < ptrsthRB_n$, and n is an integer greater than 1; and a sending unit, configured to send $ptrsthRB_1$, $ptrsthRB_2-ptrsthRB_1$, ..., and $ptrsthRB_n-ptrsthRB_{n-1}$ to a network device.

In a possible design, n is equal to 2, and $ptrsthRB_1$ and $ptrsthRB_2$ each are less than or equal to a maximum bandwidth supported by the terminal device.

According to a twenty-first aspect, this application provides a data receiving method, including:

receiving, by a network device, n elements from a terminal device, where n is an integer greater than 1, and values of the n elements are $C_1$, $C_2$, ..., and $C_n$; and generating, by the network device, n scheduling bandwidth thresholds based on the n elements, where the n scheduling bandwidth thresholds are $C_1$, $C_1+C_2$, ..., and $C_1+C_2+...+C_n$.

According to a twenty-second aspect, this application provides a data receiving apparatus, including:

a receiving unit, configured to receive n elements from a terminal device, where n is an integer greater than 1, and values of the n elements are $C_1$, $C_2$, ..., and $C_n$; and a generating unit, configured to generate n scheduling bandwidth thresholds based on the n elements, where the n scheduling bandwidth thresholds are $C_1$, $C_1+C_2$, ..., and $C_1+C_2+...+C_n$.

According to a twenty-third aspect, this application provides a data reporting method, including:

determining, by a terminal device, n scheduling bandwidth thresholds, where the n scheduling bandwidth thresholds are $ptrsthRB_1$, $ptrsthRB_2$, ..., and $ptrsthRB_n$, n is an integer greater than 1, and $ptrsthRB_1 - ptrsthRB_2 < ... < ptrsthRB_n$; and sending, by the terminal device, $ptrsthRB_2-ptrsthRB_3$, $ptrsthRB_3-ptrsthRB_2$, ..., $ptrsthRB_n-ptrsthRB_{n-1}$, and $ptrsthRB_n$ to a network device.

According to a twenty-fourth aspect, this application provides a data reporting apparatus, including:

a determining unit, configured to determine n scheduling bandwidth thresholds, where the n scheduling bandwidth thresholds are $ptrsthRB_1$, $ptrsthRB_2$, ..., and $ptrsthRB_n$, n is an integer greater than 1, and $ptrsthRB_1 < ptrsthRB_2 < ... < ptrsthRB_n$; and a sending unit, configured to send $ptrsthRB_2-ptrsthRB_1$, $ptrsthRB_3-ptrsthRB_2$, ..., $ptrsthRB_n-ptrsthRB_{n-1}$, and $ptrsthRB_n$ to a network device.

According to a twenty-fifth aspect, this application provides a data receiving method, including:

receiving, by a network device, n elements from a terminal device, where n is an integer greater than 1, and values of the n elements are $C_1$, $C_2$, ..., and $C_n$; and generating, by the network device, n scheduling bandwidth thresholds based on the n elements, where then scheduling bandwidth thresholds are $C_n-C_{n-1}-, ..., -C_2-C_1$, $C_n-C_{n-1}-, ..., C_2, ..., C_n-C_{n-1}$, and $C_n$.

According to a twenty-sixth aspect, this application provides a data receiving apparatus, including:

a receiving unit, configured to receive n elements from a terminal device, where n is an integer greater than 1, and values of the n elements are $C_1$, $C_2$, . . . , and $C_n$; and a generating unit, configured to generate n scheduling bandwidth thresholds based on the n elements, where the n scheduling bandwidth thresholds are $C_n-C_{n-1}-$, . . . , $-C_2-C_1$, $C_n-C_{n-1}-$, . . . , $-C_2$, . . . , $C_n-C_{n-1}$, and $C_n$.

According to a twenty-seventh aspect, this application provides a data reporting method, including:

determining, by a terminal device, at least one scheduling MCS threshold, where each scheduling MCS threshold is an even number;

obtaining, by the terminal device, at least one element, where each element is used to indicate one of the at least one scheduling MCS threshold; and sending, by the terminal device, the at least one element to a network device.

In a possible design, each scheduling MCS threshold is greater than a preset value.

According to a twenty-eighth aspect, this application provides a data reporting apparatus, including:

a determining unit, configured to determine at least one scheduling MCS threshold, where each scheduling MCS threshold is an even number;

a generating unit, configured to obtain at least one element based on the at least one scheduling MCS threshold, where each element is used to indicate one of the at least one scheduling MCS threshold; and a sending unit, configured to send the at least one element to a network device.

In a possible design, each scheduling MCS threshold is greater than a preset value.

According to a twenty-ninth aspect, this application provides a data reporting method, including:

determining, by a terminal device, at least one scheduling MCS threshold, where each scheduling MCS threshold is an odd number;

obtaining, by the terminal device, at least one element based on the at least one scheduling MCS threshold, where each element is used to indicate one of the at least one scheduling MCS threshold; and sending, by the terminal device, the at least one element to a network device.

According to a thirtieth aspect, this application provides a data reporting apparatus, including:

a determining unit, configured to determine at least one scheduling MCS threshold, where each scheduling MCS threshold is an odd number;

a generating unit, configured to obtain or generate at least one element based on the at least one scheduling MCS threshold, where each element is used to indicate one of the at least one scheduling MCS threshold; and a sending unit, configured to send the at least one element to a network device.

In a possible design, each scheduling MCS threshold is greater than a preset value.

According to a thirty-first aspect, this application provides a data reporting method, including:

a determining unit, configured to determine at least one scheduling MCS threshold, where each scheduling MCS threshold is greater than a preset MCS threshold;

a generating unit, configured to obtain at least one element based on the at least one scheduling MCS threshold, where each element is used to indicate one of the at least one scheduling MCS threshold; and a sending unit, configured to send the at least one element to a network device.

In a possible implementation, the data reporting method includes: determining, by a terminal device, at least one scheduling MCS threshold associated with an MCS table corresponding to a highest modulation scheme supported by the terminal device; and sending, by the terminal device to a network device, the at least one scheduling MCS threshold associated with the MCS table corresponding to the highest modulation scheme supported by the terminal device.

In a possible design, the at least one scheduling MCS threshold includes three scheduling MCS thresholds, and a maximum scheduling MCS threshold in the three scheduling MCS thresholds is less than or equal to 1 plus a maximum MCS index value directly corresponding to a code rate in the MCS table.

According to a thirty-second aspect, this application provides a data reporting apparatus, including:

a determining unit, configured to determine at least one scheduling MCS threshold associated with an MCS table corresponding to a highest modulation scheme; and a sending unit, configured to send, to a network device, the at least one scheduling MCS threshold associated with the MCS table corresponding to the highest modulation scheme.

In a possible design, the at least one scheduling MCS threshold includes three scheduling MCS thresholds, and a maximum scheduling MCS threshold in the three scheduling MCS thresholds is less than or equal to 1 plus a maximum MCS index value directly corresponding to a code rate in the MCS table.

According to a thirty-third aspect, this application provides a data reporting method, including:

determining, by a terminal device, m scheduling MCS thresholds, where the m scheduling MCS thresholds are $ptrsthMCS_1$, $ptrsthMCS_2$, . . . , and $ptrsthMCS_m$, m is an integer greater than 1, and $ptrsthMCS_1 < ptrsthMCS_2$, . . . , $< ptrsthMCS_m$; and sending, by the terminal device, $ptrsthMCS_1$, $ptrsthMCS_2 - ptrsthMCS_1$, . . . , and $ptrsthMCS_m - ptrsthMCS_{m-1}$ to a network device.

According to a thirty-fourth aspect, this application provides a data reporting apparatus, including:

a determining unit, configured to determine m scheduling MCS thresholds, where the m scheduling MCS thresholds are $ptrsthMCS_1$, $ptrsthMCS_2$, . . . , and $ptrsthMCS_m$, m is an integer greater than 1, and $ptrsthMCS_1 < ptrsthMCS_2$, . . . , $< ptrsthMCS_m$; and a sending unit, configured to send $ptrsthMCS_1$, $ptrsthMCS_2 - ptrsthMCS_1$, . . . , and $ptrsthMCS_m - ptrsthMCS_{m-1}$ to a network device.

According to a thirty-fifth aspect, this application provides a data receiving method, including:

receiving, by a network device, m elements sent by a terminal device, where values of the m elements are $D_1$, $D_2$, . . . , and $D_m$; and generating, by the network device, m scheduling MCS thresholds, where the m MCS thresholds are $D_1$, $D_1+D_2$, . . . , and $D_1+D_2+ \ldots +D_{m-1}+D_m$.

According to a thirty-sixth aspect, this application provides a data receiving apparatus, including:

a receiving unit, configured to receive m elements sent by a terminal device, where values of the m elements are $D_1$, $D_2$, . . . , and $D_m$; and a generating unit, configured to generate m scheduling MCS thresholds, where the m MCS thresholds are $D_1$, $D_1+D_2, \ldots$, and $D_1+D_2+ \ldots +D_{m-1}+D_m$.

According to a thirty-seventh aspect, this application provides a data reporting method, including:

determining, by a terminal device, m scheduling MCS thresholds, where the m scheduling MCS thresholds are ptrsthMCS$_1$, ptrsthMCS$_2$, ..., and ptrsthMCS$_m$, m is an integer greater than 1, and ptrsthMCS$_1$<ptrsthMCS$_2$, ..., <ptrsthMCS$_m$; and sending, by the terminal device, ptrsthMCS$_2$−ptrsthMCS$_1$, ptrsthMCS$_3$−ptrsthMCS$_2$, ..., ptrsthMCS$_m$−ptrsthMCS$_{m-1}$, and ptrsthMCS$_m$ to a network device.

According to a thirty-eighth aspect, this application provides a data reporting apparatus, including:

a determining unit, configured to determine m scheduling MCS thresholds, where the m scheduling MCS thresholds are ptrsthMCS$_1$, ptrsthMCS$_2$, ..., and ptrsthMCS$_m$, m is an integer greater than 1, and ptrsthMCS$_1$<ptrsthMCS$_2$, ..., <ptrsthMCS$_m$; and a sending unit, configured to send ptrsthMCS$_2$−ptrsthMCS$_1$, ptrsthMCS$_3$−ptrsthMCS$_2$, ..., ptrsthMCS$_m$−ptrsthMCS$_{m-1}$, and ptrsthMCS$_m$ to a network device.

According to a thirty-ninth aspect, this application provides data receiving method, including:

receiving, by a network device, m elements from a terminal device, where values of the m elements are $D_1$, $D_2, \ldots$, and $D_m$; and generating, by the network device, m scheduling MCS thresholds, where the m scheduling MCS thresholds are $D_m-D_{m-1}- \ldots -D_2-D_1, D_m-D_{m-1}- \ldots -D_2, \ldots D_m-D_{m-1}$, and $D_m$.

According to a fortieth aspect, this application provides a data receiving apparatus, including:

a receiving unit, configured to receive m elements from a terminal device, where values of the m elements are $D_1$, $D_2, \ldots$, and $D_m$; and a generating unit, configured to generate m scheduling MCS thresholds, where the m scheduling MCS thresholds are $D_m-D_{m-1}- \ldots -D_2-D_1, D_m-D_{m-1}- \ldots -D_2, \ldots D_m-D_{m-1}$, and $D_m$.

According to another aspect, an apparatus is provided. The apparatus has a function of implementing behavior of the terminal device or the network device in the foregoing methods. The function may be implemented by hardware, or may be implemented by hardware by executing corresponding software. The hardware or the software includes one or more modules corresponding to the foregoing function.

The apparatus includes a receiver, a transmitter, a memory, and a processor. The memory stores a set of program code, and the processor is configured to invoke the program code stored in the memory, to perform the methods according to the foregoing aspects.

Based on a same disclosure idea, for a problem-resolving principle and beneficial effects of the apparatus, refer to the possible method implementations of the terminal device or the network device and beneficial effects thereof. Therefore, for implementation of the apparatus, refer to implementation of the methods. Repeated parts are not described again.

According to another aspect, this application provides a method for configuring a scheduling bandwidth threshold, including:

determining, by a network device, at least one scheduling bandwidth threshold, where each scheduling bandwidth threshold is a natural number power of 2;

obtaining, by the network device, at least one element based on the at least one scheduling bandwidth threshold, where each element is used to indicate one of the at least one scheduling bandwidth threshold; and sending, by the network device, the at least one element to a terminal device.

In a possible implementation, a value of each element is a logarithm of the indicated scheduling bandwidth threshold to a base 2.

In another possible implementation, a maximum scheduling bandwidth threshold in the at least one scheduling bandwidth threshold is greater than a maximum bandwidth supported by the terminal.

In another possible implementation, each of the at least one scheduling bandwidth threshold is greater than a preset value.

According to another aspect, this application provides an apparatus for configuring a scheduling bandwidth threshold, including:

a determining unit, configured to determine at least one scheduling bandwidth threshold, where each scheduling bandwidth threshold is a natural number power of 2;

a generating unit, configured to obtain at least one element based on the at least one scheduling bandwidth threshold, where each element is used to indicate one of the at least one scheduling bandwidth threshold; and a sending unit, configured to send the at least one element to a terminal device.

In a possible implementation, a value of each element is a logarithm of the indicated scheduling bandwidth threshold to a base 2.

In another possible implementation, a maximum scheduling bandwidth threshold in the at least one scheduling bandwidth threshold is greater than a maximum bandwidth supported by the terminal.

In another possible implementation, each of the at least one scheduling bandwidth threshold is greater than a preset value.

According to another aspect, this application further provides a method for configuring a scheduling bandwidth threshold, including:

receiving, by a terminal device, at least one element from a network device, where each element is used to indicate one scheduling bandwidth threshold; and obtaining, by the terminal device, at least one scheduling bandwidth threshold based on the at least one element, where each scheduling bandwidth threshold is a natural number power of 2.

In a possible implementation, each scheduling bandwidth threshold is equal to a $k^{th}$ power of 2, where k is a value of a corresponding element.

According to another aspect, this application further provides an apparatus for configuring a scheduling bandwidth threshold, including:

a receiving unit, configured to receive at least one element from a network device, where each element is used to indicate one scheduling bandwidth threshold; and a generating unit, configured to obtain at least one scheduling bandwidth threshold based on the at least one element, where each scheduling bandwidth threshold is a natural number power of 2.

In a possible implementation, each scheduling bandwidth threshold is equal to a $k^{th}$ power of 2, where k is a value of a corresponding element.

According to another aspect, this application further provides a method for configuring a scheduling bandwidth threshold, including:

determining, by a network device, at least one scheduling bandwidth threshold, where each scheduling bandwidth threshold is a product of a natural number power of 2, a natural number power of 3, and a natural number power of 5;

obtaining, by the network device, at least one element based on the at least one scheduling bandwidth threshold, where each element is used to indicate one of the at least one scheduling bandwidth threshold; and sending, by the network device, the at least one element to a terminal device.

In a possible implementation, the used waveform is a discrete Fourier transform-spread-orthogonal frequency division multiplexing DFT-S-OFDM waveform.

According to another aspect, this application further provides an apparatus for configuring a scheduling bandwidth threshold, including:

a determining unit, configured to determine at least one scheduling bandwidth threshold, where each scheduling bandwidth threshold is a product of a natural number power of 2, a natural number power of 3, and a natural number power of 5;

a generating unit, configured to obtain at least one element based on the at least one scheduling bandwidth threshold, where each element is used to indicate one of the at least one scheduling bandwidth threshold; and a sending unit, configured to send the at least one element to a terminal device.

According to another aspect, this application further provides a method for configuring a scheduling bandwidth threshold, including:

receiving, by a terminal device, at least one element from a network device, where each element is used to indicate one scheduling bandwidth threshold; and obtaining, by the terminal device, at least one scheduling bandwidth threshold based on the at least one element, where each scheduling bandwidth threshold is a product of a natural number power of 2, a natural number power of 3, and a natural number power of 5.

According to another aspect, this application further provides an apparatus for configuring a scheduling bandwidth threshold, including:

a receiving unit, configured to receive at least one element from a network device, where each element is used to indicate one scheduling bandwidth threshold; and a generating unit, configured to obtain at least one scheduling bandwidth threshold based on the at least one element, where each scheduling bandwidth threshold is a product of a natural number power of 2, a natural number power of 3, and a natural number power of 5.

In a possible implementation, a waveform used by the terminal device is a DFT-S-OFDM waveform.

According to another aspect, this application further provides a method for configuring a scheduling bandwidth threshold, including:

determining, by a network device, at least one scheduling bandwidth threshold associated with a first subcarrier spacing; and sending, by the network device to a terminal device, the at least one scheduling bandwidth threshold associated with the first subcarrier spacing.

In a possible implementation, the first subcarrier spacing is associated with the at least one scheduling bandwidth threshold, and each scheduling bandwidth threshold is less than or equal to 1 plus a maximum bandwidth supported by the terminal device.

According to another aspect, this application further provides an apparatus for configuring a scheduling bandwidth threshold, including:

a determining unit, configured to determine at least one scheduling bandwidth threshold associated with a first subcarrier spacing; and a sending unit, configured to send, to a terminal device, the at least one scheduling bandwidth threshold associated with the first subcarrier spacing.

In a possible implementation, the first subcarrier spacing is associated with two scheduling bandwidth thresholds, and each scheduling bandwidth threshold is less than or equal to 1 plus a maximum bandwidth supported by the terminal device.

According to another aspect, this application further provides a method for configuring a scheduling bandwidth threshold, including:

receiving, by a terminal device from a network device, at least one scheduling bandwidth threshold associated with a first subcarrier spacing; and determining, by the terminal device based on a ratio relationship between the first subcarrier spacing and a second subcarrier spacing, at least one scheduling bandwidth threshold associated with the second subcarrier spacing.

In a possible implementation, the first subcarrier spacing is associated with the at least one scheduling bandwidth threshold, and each scheduling bandwidth threshold is less than or equal to 1 plus a maximum bandwidth supported by the terminal device.

According to another aspect, this application further provides an apparatus for configuring a scheduling bandwidth threshold, including:

a receiving unit, configured to receive, from a network device, at least one scheduling bandwidth threshold associated with a first subcarrier spacing; and a generating unit, configured to determine, based on a ratio relationship between the first subcarrier spacing and a second subcarrier spacing, at least one scheduling bandwidth threshold associated with the second subcarrier spacing.

In a possible implementation, the first subcarrier spacing is associated with the at least one scheduling bandwidth threshold, and each scheduling bandwidth threshold is less than or equal to 1 plus a maximum bandwidth supported by a terminal device.

According to another aspect, this application further provides a method for configuring a scheduling bandwidth threshold, including:

determining, by a network device, n scheduling bandwidth thresholds, where the n scheduling bandwidth thresholds are $ptrsthRB_1$, $ptrsthRB_2$, . . . , and $ptrsthRB_n$, $ptrsthRB_1 < ptrsthRB_2 < . . . < ptrsthRB_n$, and n is an integer greater than 1; and sending, by the network device, $ptrsthRB_1$, $ptrsthRB_2 - ptrsthRB_1$, . . . , and $ptrsthRB_n - ptrsthRB_{n-1}$ to a terminal device.

In a possible implementation, n is equal to 2, and $ptrsthRB_1$ and $ptrsthRB_2$ each are less than or equal to a maximum bandwidth supported by the terminal device.

According to another aspect, this application further provides an apparatus for configuring a scheduling bandwidth threshold, including:

a determining unit, configured to determine n scheduling bandwidth thresholds, where the n scheduling bandwidth thresholds are $ptrsthRB_1$, $ptrsthRB_2$, . . . , and $ptrsthRB_n$, $ptrsthRB_1 < ptrsthRB_2 < . . . < ptrsthRB_n$, and n is an integer greater than 1; and a sending unit, configured to send $ptrsthRB_1$, $ptrsthRB_2 - ptrsthRB_1$, . . . , and $ptrsthRB_n - ptrsthRB_{n-1}$ to a terminal device.

In a possible implementation, n is equal to 2, and $ptrsthRB_1$ and $ptrsthRB_2$ each are less than or equal to a maximum bandwidth supported by the terminal device.

According to another aspect, this application further provides a method for configuring a scheduling bandwidth threshold, including:

receiving, by a terminal device, n elements from a network device, where n is an integer greater than 1, and values of the n elements are $C_1, C_2, \ldots,$ and $C_n$; and generating, by the terminal device, n scheduling bandwidth thresholds based on the n elements, where the n scheduling bandwidth thresholds are $C_1, C_1+C_2, \ldots,$ and $C_1+C_2+\ldots+C_n$.

According to another aspect, this application further provides an apparatus for configuring a scheduling bandwidth threshold, including:

a receiving unit, configured to receive n elements from a network device, where n is an integer greater than 1, and values of the n elements are $C_1, C_2, \ldots,$ and $C_n$; and a generating unit, configured to generate n scheduling bandwidth thresholds based on the n elements, where the n scheduling bandwidth thresholds are $C_1, C_1+C_2, \ldots,$ and $C_1+C_2+\ldots+C_n$.

According to another aspect, this application further provides a method for configuring a scheduling bandwidth threshold, including:

determining, by a network device, n scheduling bandwidth thresholds, where the n scheduling bandwidth thresholds are $ptrsthRB_1, ptrsthRB_2, \ldots,$ and $ptrsthRB_n$, n is an integer greater than 1, and $ptrsthRB_1 < ptrsthRB_2 < \ldots < ptrsthRB_n$; and sending, by the network device, $ptrsthRB_2-ptrsthRB_1$, $ptrsthRB_3-ptrsthRB_2, \ldots, ptrsthRB_n-ptrsthRB_{n-1}$, and $ptrsthRB_n$ to a terminal device.

According to another aspect, this application further provides an apparatus for configuring a scheduling bandwidth threshold, including:

a determining unit, configured to determine n scheduling bandwidth thresholds, where the n scheduling bandwidth thresholds are $ptrsthRB_1, ptrsthRB_2, \ldots,$ and $ptrsthRB_n$, n is an integer greater than 1, and $ptrsthRB_1 < ptrsthRB_2 < \ldots < ptrsthRB_n$; and a sending unit, configured to send $ptrsthRB_2-ptrsthRB_1$, $ptrsthRB_3-ptrsthRB_2, \ldots, ptrsthRB_n-ptrsthRB_{n-1}$, and $ptrsthRB_n$ to a terminal device.

According to another aspect, this application further provides a method for configuring a scheduling bandwidth threshold, including:

receiving, by a terminal device, n elements from a network device, where n is an integer greater than 1, and values of the n elements are $C_1, C_2, \ldots,$ and $C_n$; and generating, by the terminal device, n scheduling bandwidth thresholds based on the n elements, where the n scheduling bandwidth thresholds are $C_n-C_{n-1}, \ldots, C_2-C_1, C_n-C_{n-1}-, \ldots, -C_2, \ldots, C_n-C_{n-1},$ and $C_n$.

According to another aspect, this application further provides an apparatus for configuring a scheduling bandwidth threshold, including:

a receiving unit, configured to receive n elements from a network device, where n is an integer greater than 1, and values of the n elements are $C_1, C_2, \ldots,$ and $C_n$; and a generating unit, configured to generate n scheduling bandwidth thresholds based on the n elements, where the n scheduling bandwidth thresholds are $C_n-C_{n-1}-, \ldots, -C_2-C_1, C_n-C_{n-1}-, \ldots, -C_2, \ldots C_n-C_{n-1},$ and $C_n$.

According to another aspect, this application further provides a method for configuring a scheduling bandwidth threshold, including:

determining, by a network device, at least one scheduling MCS threshold associated with an MCS table corresponding to a highest modulation scheme supported by a terminal device; and sending, by the network device to the terminal device, the at least one scheduling MCS threshold associated with the MCS table corresponding to the highest modulation scheme supported by the terminal device.

In a possible implementation, the at least one scheduling MCS threshold includes three scheduling MCS thresholds, and a maximum scheduling MCS threshold in the three scheduling MCS thresholds is less than or equal to 1 plus a maximum MCS index value directly corresponding to a code rate in the MCS table.

According to another aspect, this application further provides an apparatus for configuring a scheduling bandwidth threshold, including:

a determining unit, configured to determine at least one scheduling MCS threshold associated with an MCS table corresponding to a highest modulation scheme; and a sending unit, configured to send, to a terminal device, the at least one scheduling MCS threshold associated with the MCS table corresponding to the highest modulation scheme.

In a possible implementation, the at least one scheduling MCS threshold includes three scheduling MCS thresholds, and a maximum scheduling MCS threshold in the three scheduling MCS thresholds is less than or equal to 1 plus a maximum MCS index value directly corresponding to a code rate in the MCS table.

According to another aspect, this application further provides a method for configuring a scheduling bandwidth threshold, including:

determining, by a network device, m scheduling MCS thresholds, where the m scheduling MCS thresholds are $ptrsthMCS_1, ptrsthMCS_2, \ldots,$ and $ptrsthMCS_m$, m is an integer greater than 1, and $ptrsthMCS_1 < ptrsthMCS_2, \ldots, < ptrsthMCS_m$; and sending, by the network device, $ptrsthMCS_1$, $ptrsthMCS_2-ptrsthMCS_1, \ldots,$ and $ptrsthMCS_m-ptrsthMCS_{m-1}$ to a terminal device.

According to another aspect, this application further provides an apparatus for configuring a scheduling bandwidth threshold, including:

a determining unit, configured to determine m scheduling MCS thresholds, where the m scheduling MCS thresholds are $ptrsthMCS_1, ptrsthMCS_2, \ldots,$ and $ptrsthMCS_m$, m is an integer greater than 1, and $ptrsthMCS_1 < ptrsthMCS_2, \ldots, < ptrsthMCS_m$; and a sending unit, configured to send $ptrsthMCS_1$, $ptrsthMCS_2-ptrsthMCS_1, \ldots,$ and $ptrsthMCS_m-ptrsthMCS_{m-1}$ to a terminal device.

According to another aspect, this application further provides a method for configuring a scheduling bandwidth threshold, including:

receiving, by a terminal device, m elements sent by a network device, where values of the m elements are $D_1, D_2, \ldots,$ and $D_m$; and generating, by the terminal device, m scheduling MCS thresholds, where the m MCS thresholds are $D_1, D_1+D_2, \ldots,$ and $D_1+D_2+\ldots+D_{m-1}+D_m$.

According to another aspect, this application further provides an apparatus for configuring a scheduling bandwidth threshold, including:

a receiving unit, configured to receive m elements sent by a network device, where values of the m elements are $D_1$, $D_2, \ldots$, and $D_m$; and a generating unit, configured to generate m scheduling MCS thresholds, where the m MCS thresholds are $D_1$, $D_1+D_2, \ldots$, and $D_1+D_2+\ldots+D_{m-1}+D_m$.

According to another aspect, this application further provides a method for configuring a scheduling bandwidth threshold, including:

determining, by a network device, m scheduling MCS thresholds, where the m scheduling MCS thresholds are ptrsthMCS$_1$, ptrsthMCS$_2, \ldots$, and ptrsthMCS$_m$, m is an integer greater than 1, and ptrsthMCS$_1$<ptrsthMCS$_2, \ldots$, <ptrsthMCS$_m$; and sending, by the network device, ptrsthMCS$_2$-ptrsthMCS$_1$, ptrsthMCS$_3$-ptrsthMCS$_2, \ldots$, ptrsthMCS$_m$-ptrsthMCS$_{m-1}$, and ptrsthMCS$_m$ to a terminal device.

According to another aspect, this application further provides an apparatus for configuring a scheduling bandwidth threshold, including:

a determining unit, configured to determine m scheduling MCS thresholds, where the m scheduling MCS thresholds are ptrsthMCS$_1$, ptrsthMCS$_2, \ldots$, and ptrsthMCS$_m$, m is an integer greater than 1, and ptrsthMCS$_1$<ptrsthMCS$_2, \ldots$, <ptrsthMCS$_m$; and a sending unit, configured to send ptrsthMCS$_2$-ptrsthMCS$_1$, ptrsthMCS$_3$-ptrsthMCS$_2, \ldots$, ptrsthMCS$_m$-ptrsthMCS$_{m-1}$, and ptrsthMCS$_m$ to a terminal device.

According to another aspect, this application further provides a method for configuring a scheduling bandwidth threshold, including:

receiving, by a terminal device, m elements from a network device, where values of the m elements are $D_1$, $D_2, \ldots$, and $D_m$; and generating, by the terminal device, m scheduling MCS thresholds, where the m scheduling MCS thresholds are $D_m-D_{m-1}-\ldots-D_2-D_1$, $D_m-D_{m-1}-\ldots-D_2, \ldots D_m-D_{m-1}$, and $D_m$.

According to another aspect, this application further provides an apparatus for configuring a scheduling bandwidth threshold, including:

a receiving unit, configured to receive m elements from a network device, where values of the m elements are $D_1$, $D_2, \ldots$, and $D_m$; and a generating unit, configured to generate m scheduling MCS thresholds, where the m scheduling MCS thresholds are $D_m-D_{m-1}-\ldots-D_2-D_1$, $D_m-D_{m-1}-\ldots-D_2, \ldots$, $D_m-D_{m-1}$, and $D_m$.

Still another aspect of this application provides a computer-readable storage medium. The computer-readable storage medium stores an instruction, and when the instruction is run on a computer, the computer is enabled to perform the methods according to the foregoing aspects.

Still another aspect of this application provides a computer program product including an instruction. When the computer program product is run on a computer, the computer is enabled to perform the methods according to the foregoing aspects.

BRIEF DESCRIPTION OF DRAWINGS

To describe the technical solutions in the embodiments or the background of the present disclosure more clearly, the following describes the accompanying drawings required for the embodiments or the background of the present disclosure.

DESCRIPTION OF EMBODIMENTS

Embodiments of this application may be applied to a wireless communications system. It should be noted that, the wireless communications system mentioned in the embodiments of this application includes but is not limited to a narrow band-Internet of things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, an NR (new radio) communications system, and three application scenarios of a next generation 5G mobile communications system, including enhanced mobile broadband (eMBB), URLLC, and massive machine type communication (mMTC).

In the embodiments of this application, a terminal device includes but is not limited to a mobile station (MS), a mobile terminal device, a mobile telephone, a handset, portable equipment, and the like. The terminal device may communicate with one or more core networks by using a radio access network (RAN). For example, the terminal device may be a mobile phone (or referred to as a "cellular" phone), or a computer having a wireless communication function; or the terminal device may be a portable, pocket-sized, handheld, computer built-in, or vehicle-mounted mobile apparatus or device.

Figure 1A:
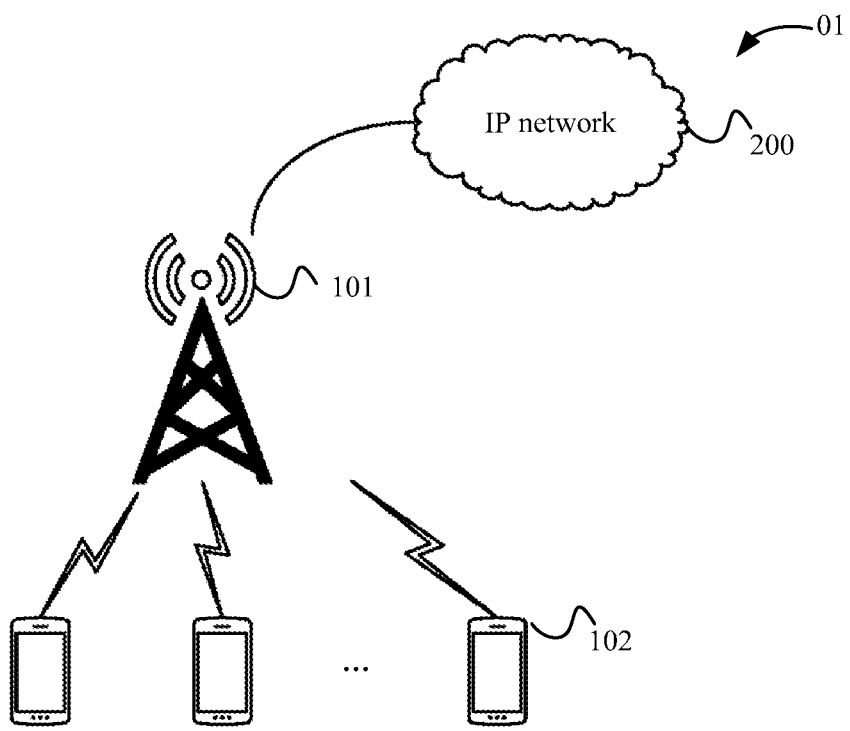
FIG. 1A is a schematic architectural diagram of a communications system according to an embodiment of the present disclosure.

FIG. 1A is a schematic architectural diagram of a communications system according to this application.

As shown in FIG. 1A, a communications system 01 includes a network device 101 and a terminal device 102. When the communications system 01 includes a core network, the network device 101 may be further connected to the core network. The network device 101 may further communicate with an Internet protocol (IP) network 200, for example, the Internet, a private IP network, or another data network. The network device provides a service for a terminal device within coverage. For example, referring to FIG. 1A, the network device 101 provides radio access for one or more terminal devices within coverage of the network device 101. In addition, network devices may communicate with each other.

The network device 101 may be a device configured to communicate with the terminal device. For example, the network device may be a base transceiver station (BTS) in a GSM system or a CDMA system, may be a NodeB (NB) in a WCDMA system, or may be an evolved NodeB (eNB or eNodeB) in an LTE system or a network side device in a future 5G network; or the network device may be a relay station, an access point, a vehicle-mounted device, or the like. In a terminal device to terminal device (Device to Device, D2D) communications system, the network device may alternatively be a terminal device having a function of a base station. The terminal device may include various handheld devices having a wireless communication function, a vehicle-mounted device, a wearable device, a computing device, or another processing device connected to a wireless modem, and various forms of user equipments (UEs), mobile stations (MSs), and the like.

In an NR communications system, a process in which a network device sends a PTRS signal to a terminal device includes: The network device determines a PTRS pattern that represents PTRS distribution positions including a time domain position and a frequency domain position. The network device sends a PTRS to the terminal device based on the PTRS pattern. The terminal device receives a corresponding scheduling bandwidth threshold and scheduling MCS threshold that are sent by the network device and that are used to indicate the PTRS pattern. The terminal device determines a PTRS frequency domain density based on one group of received scheduling bandwidth thresholds, determines a PTRS time domain density based on one group of received scheduling MCS thresholds, determines the phase tracking reference signal pattern based on the PTRS time domain density and the PTRS frequency domain density, and receives, based on the determined PTRS pattern, the PTRS sent by the network device. Table 1 lists association relationships between scheduling MCSs and PTRS time domain densities, and Table 2 lists association relationships between scheduling bandwidths and PTRS frequency domain densities.

TABLE 1

| Scheduling MCS | Time domain density |
| --- | --- |
| $I_{MCS} < \text{ptrsthMCS}_1$ | No PTRS exists |
| $\text{ptrsthMCS}_1 \le I_{MCS} < \text{ptrsthMCS}_2$ | 4 |
| $\text{ptrsthMCS}_2 \le I_{MCS} < \text{ptrsthMCS}_3$ | 2 |
| $\text{ptrsthMCS}_3 \le I_{MCS} < \text{ptrsthMCS}_4$ | 1 |

TABLE 2

| Scheduling bandwidth | Frequency domain density |
| --- | --- |
| $N_{RB} <$ ptrsthRB$_0$ | No PTRS exists |
| ptrsthRB$_0 \leq N_{RB} <$ ptrsthRB$_2$ | 2 |
| ptrsthRB$_2 \leq N_{RB} <$ ptrsthRB$_4$ | 4 |

A scheduling MCS threshold set {ptrsrhMCS$_1$, ptrsrhMCS$_2$, ptrsrhMCS$_3$, ptrsrhMCS$_4$} and a scheduling bandwidth threshold set {ptrsrhRB$_0$, ptrsrhRB$_2$, ptrsrhRB$_4$} in Table 1 and Table 2 are configured by a base station for UE by using higher layer signaling (for example, radio resource control (RRC) signaling). ptrsrhMCS$_1 \leq$ ptrsthMCS$_2 \leq$ ptrsthMCS$_3 \leq$ ptrsthMCS$_4$. At least two scheduling bandwidth thresholds in the scheduling MCS threshold set are equal; therefore, the PTRS time domain density is not applicable to the mapping relationship in Table 1. ptrsthRB$_0 \leq$ ptrsthRB$_2 \leq$ ptrsthRB$_4$. When at least two scheduling bandwidth thresholds in the scheduling bandwidth threshold set are equal, the PTRS frequency domain density is not applicable to the mapping relationship in Table 2. Each scheduling bandwidth threshold fixedly occupies 9 bits, and each scheduling MCS threshold fixedly occupies 5 bits. Before the UE receives the scheduling MCS threshold set and the scheduling bandwidth threshold set that are configured by the base station, the UE may be capable of reporting one group of suggested scheduling MCS threshold sets and/or scheduling bandwidth threshold sets to the base station. When the terminal device directly reports one group of scheduling bandwidth thresholds and one group of scheduling MCS thresholds, a quantity of consumed bits is 5*4+9*3=47. In some scenarios, the terminal device needs to report a plurality of groups of scheduling bandwidth thresholds and a plurality of groups of scheduling MCS thresholds, and a quantity of bits needing to be consumed is further increased.

Figure 1B:
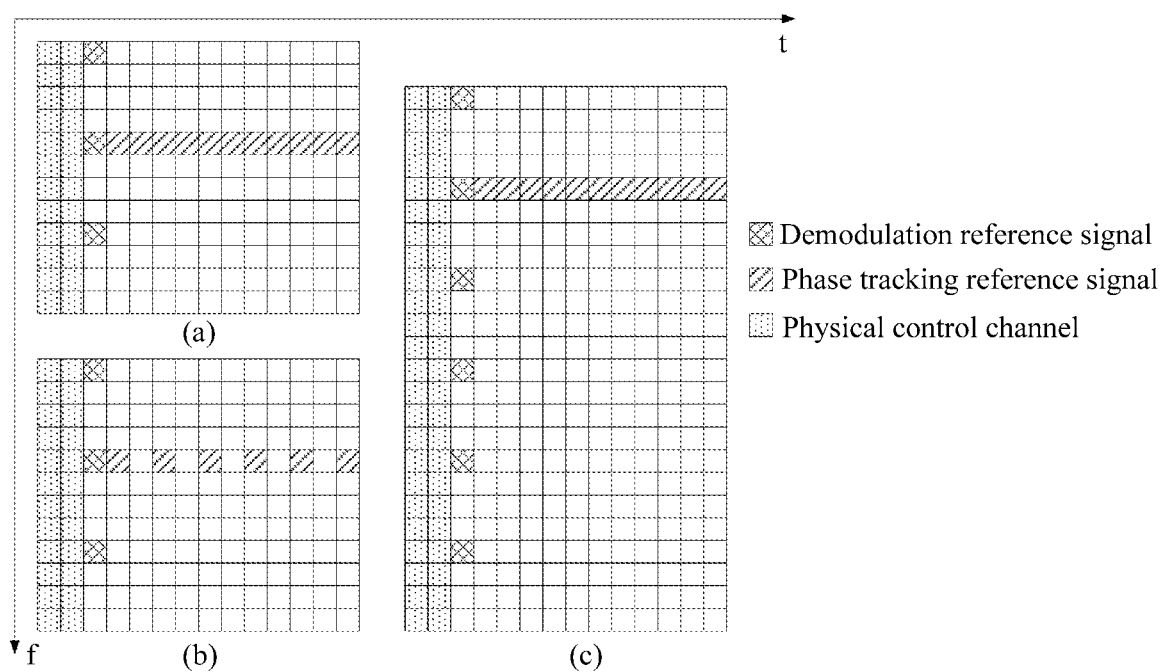
FIG. 1B is a schematic diagram of a PTRS pattern according to an embodiment of the present disclosure.

FIG. 1B is a schematic diagram of different PTRS patterns. The network device determines a phase tracking reference signal pattern based on at least one of a current scheduling modulation and coding scheme and a current scheduling bandwidth and at least one of a modulation and coding scheme threshold corresponding to a phase tracking reference signal pattern requested by the terminal device, a scheduling resource block quantity threshold corresponding to the phase tracking reference signal requested by the terminal device, and an effect factor of phase noise of the terminal device on a signal received by the terminal device, where the modulation and coding scheme threshold, the scheduling resource block quantity threshold, and the effect factor are sent by the terminal device. In a drawing (a) in FIG. 1B, a PTRS frequency domain density is 1 (there is one PTRS on every 12 subcarriers), and a time domain density is 1; in a drawing (b), a PTRS frequency domain density is 1 (there is one PTRS on every 12 subcarriers (one RB)), and a time domain density is 2 (every two symbols); and in a drawing (c), a PTRS frequency domain density is 2 (there is one PTRS on every 24 subcarriers (two RBs)), and a time domain density is 1.

Figure 2A:
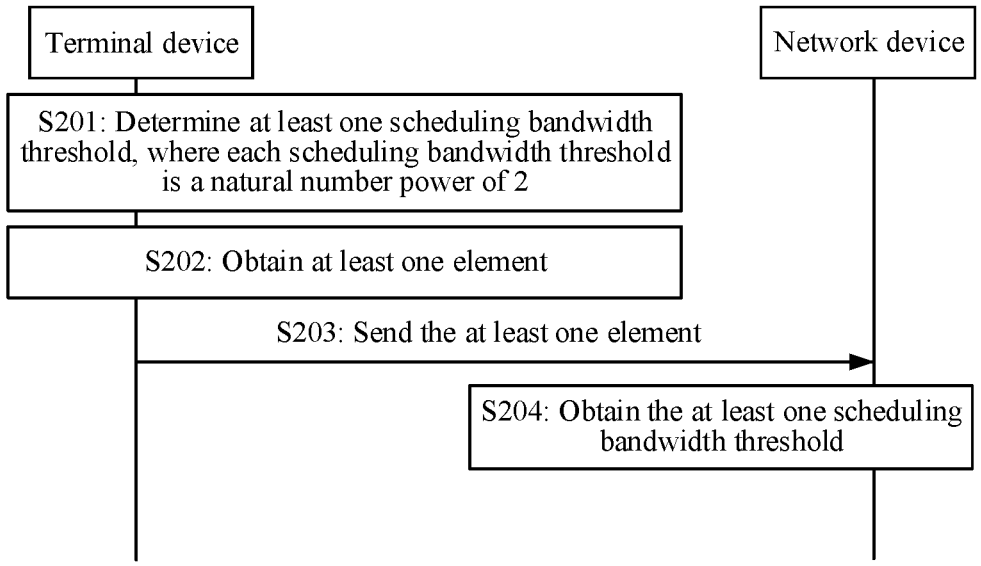
FIG. 2A is a schematic flowchart of a data reporting method according to an embodiment of the present disclosure.

FIG. 2A is a schematic flowchart of a data reporting method according to an embodiment of the present disclosure. The method includes but is not limited to the following steps.

S201: A terminal device determines at least one scheduling bandwidth threshold.

Specifically, the at least one scheduling bandwidth threshold includes a first scheduling bandwidth threshold and a second scheduling bandwidth threshold, each scheduling bandwidth threshold may be represented by an RB (resource block) quantity, and the RB quantity is an integer greater than or equal to 1. The at least one scheduling bandwidth threshold determined by the terminal device belongs to all possible scheduling bandwidth thresholds of the terminal device. For ease of description, in this embodiment, all the possible scheduling bandwidth thresholds of the terminal device are referred to as a "value set", a maximum scheduling bandwidth threshold in the value set needs to be less than or equal to a specified value, and the specified value is related to a maximum valid system bandwidth and a subcarrier spacing used by the terminal device. For example, the specified value is equal to RB_sym/(SCS$_{UE}$*12), where RB_sym is the maximum valid system bandwidth in a unit of Hz; SCS$_{UE}$ represents the subcarrier spacing used by the terminal device in a unit of Hz; and 12 represents a quantity of subcarrier spacings corresponding to one RB. Assuming that the maximum valid system bandwidth is 400 MHz*0.96, and the subcarrier spacing used by the terminal device is 120 kHz, the specified value is 400 M*0.96/120 k/12+1=267, or the specified value is greater than a system bandwidth+1, for example, the specified value is 512.

Each of the at least one scheduling bandwidth threshold determined by the terminal device is a natural number power of 2, that is, each scheduling bandwidth threshold in the value set is a natural number power of 2, a natural number is an integer greater than or equal to 0, the scheduling bandwidth thresholds in the value set of the terminal device are $2^0, 2^1, 2^2, \ldots$, and $2^{NidxMax}$. $2^{NidxMax}$ is a minimum power of 2 that is greater than the system bandwidth, and the terminal device determines at least one different scheduling bandwidth threshold in the value set.

An example is used for description: If the specified value is 512, the scheduling bandwidth thresholds in the value set are {1, 2, 4, 8, 16, 32, 64, 128, 256, 512}, and a quantity of the scheduling bandwidth thresholds in the value set is 10. It is assumed that three scheduling bandwidth thresholds determined by the terminal device are 2, 8, and 64 in the value set.

S202: The terminal device obtains at least one element.

Specifically, the at least one element is in a one-to-one correspondence with the at least one scheduling bandwidth threshold, and each element is used to indicate one of the at least one scheduling bandwidth threshold. For example, a first element in the at least one element is used to indicate a first scheduling bandwidth threshold in the at least one scheduling bandwidth threshold, and a second element in the at least one element is used to indicate a second scheduling bandwidth threshold in the at least one scheduling bandwidth threshold. All the scheduling bandwidth thresholds in the value set are numbered, and an element is a number of a scheduling bandwidth threshold. A numbering rule for the scheduling bandwidth thresholds in the value set may be that numbering is performed in ascending order starting from 1 by using a step of 1, and a number increases as a scheduling bandwidth threshold increases; or numbering is performed in ascending order starting from 0 by using a step of 1, and a number increases as a scheduling bandwidth threshold increases; or numbering is performed in descending order starting from the quantity of the scheduling bandwidth thresholds in the value set by using a step of 1, and a number decreases as a scheduling bandwidth threshold increases; or another numbering manner is used. This is not limited in this embodiment. The terminal device prestores or preconfigures mapping relationships between all the possible scheduling bandwidth thresholds and elements, and the terminal device generates, based on the mapping relationships, the at least one element corresponding to the at least one scheduling bandwidth threshold. The mapping relationships may be expressed by using a mapping table or a formula.

For example, the mapping relationships prestored or preconfigured by the terminal device are listed in a mapping table in Table 3:

TABLE 3

| Scheduling bandwidth threshold | Element value |
| --- | --- |
| 1 | 1 |
| 2 | 2 |
| 4 | 3 |
| 8 | 4 |
| 16 | 5 |
| 32 | 6 |
| 64 | 7 |
| 128 | 8 |
| 256 | 9 |
| 512 | 10 |

Assuming that the three scheduling bandwidth thresholds determined by the terminal device are 2, 16, and 64, values of three elements generated by the terminal device based on the foregoing mapping relationships are respectively 2, 5, and 7.

For another example, the mapping relationships prestored or preconfigured by the terminal device are listed in Table 4:

TABLE 4

| Scheduling bandwidth threshold | Element value |
| --- | --- |
| 1 | 10 |
| 2 | 9 |
| 4 | 8 |
| 8 | 7 |
| 16 | 6 |
| 32 | 5 |
| 64 | 4 |
| 128 | 3 |
| 256 | 2 |
| 512 | 1 |

Assuming that the three scheduling bandwidth thresholds determined by the terminal device are 2, 16, and 64, values of three elements generated by the terminal device are 9, 6, and 4.

For another example, the mapping relationships prestored or preconfigured by the terminal device are listed in Table 5:

TABLE 5

| Scheduling bandwidth threshold | Element value |
| --- | --- |
| 1 | 0 |
| 2 | 1 |
| 4 | 3 |
| 8 | 5 |
| 16 | 7 |
| 32 | 2 |
| 64 | 4 |
| 128 | 6 |
| 256 | 8 |
| 512 | 9 |

Assuming that the three scheduling bandwidth thresholds determined by the terminal device are 2, 16, and 64, values of three elements generated by the terminal device are 1, 7, and 4.

In a possible implementation, the mapping relationships may be expressed by using a formula: A value of each element is a logarithm of a corresponding scheduling bandwidth threshold to a base 2. For example, a value of the first element is a logarithm of the first scheduling bandwidth threshold to the base 2, that is, $c_1=\log_2 \text{ptrsthRB}_1$, $c_1$ is the first element, $\log_2$ represents a logarithmic operation to the base 2, and $\text{ptrsthRB}_1$ represents the first scheduling bandwidth threshold. A value of the second element is a logarithm of the second scheduling bandwidth threshold to the base 2.

For example, the three scheduling bandwidth thresholds determined by the terminal device are 2, 8, and 64, and the three elements generated by the terminal device are $\log_2 2$, $\log_2 8$, and $\log_2 64$, that is, the values of the three generated elements are 1, 3, and 6.

S203: The terminal device sends the at least one element to a network device, and the network device receives the at least one element from the terminal device.

Specifically, the terminal device sends the at least one element to the network device by using a bit, and the terminal device determines, based on the quantity of the scheduling bandwidth thresholds in the value set, a quantity of bits used to send each element. The bit quantity is a minimum integer of b satisfying $S \leq 2^b$, where S is the quantity of the scheduling bandwidth thresholds in the value set, and b is the bit quantity. For example, the quantity of the scheduling bandwidth thresholds in the value set is 10. According to the foregoing formula, b=4, and the terminal device uses 4 bits to represent each element. For example, if the three generated elements are 1, 6, and 7, the three elements sent by the terminal device are respectively 0001, 0110, and 0111, and a total of 12 bits are required. Compared with the prior art in which 9 bits are fixedly used to report each scheduling bandwidth threshold, in this embodiment of the present disclosure, 15 bits are reduced, and overheads for reporting the scheduling bandwidth thresholds by the terminal device are greatly reduced.

S204: The network device obtains the at least one scheduling bandwidth threshold.

Specifically, the network device prestores or preconfigures the mapping relationships between the scheduling bandwidth thresholds and the elements, and the network device obtains the at least one scheduling bandwidth threshold based on the received element. The mapping relationships may be expressed by using a mapping table (for example, as listed in Table 3 to Table 5) or a formula. This step is an inverse process of S202. For a specific process, refer to the descriptions of S202. Details are not described herein again.

In the method described in FIG. 2A, the scheduling bandwidth threshold determined by the terminal device is a natural number power of 2, and the terminal device reports the element associated with the scheduling bandwidth threshold to the network device, thereby reducing a quantity of bits required for reporting by the terminal device, and reducing reporting overheads.

In another embodiment, the method for limiting the scheduling bandwidth threshold to a natural number power of 2 may also be extended to a process in which the network device configures a threshold for the terminal device, that is, the network device configures, for the terminal device, an element associated with a bandwidth threshold, thereby reducing a quantity of bits required for configuring the threshold by the network device, and reducing overheads of configuration signaling.

Figure 2B:
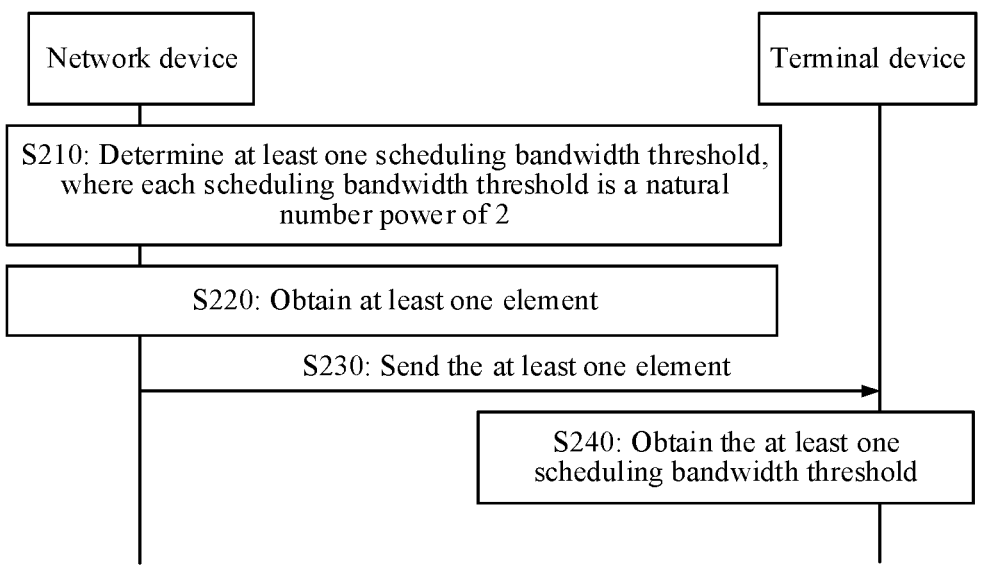
FIG. 2B is a schematic flowchart of a method for configuring a scheduling bandwidth threshold according to an embodiment of the present disclosure.

Specifically, for example, as shown in FIG. 2B, a method for configuring a threshold by the network device includes the following steps.

S210: The network device obtains at least one element.

Specifically, the at least one element is in a one-to-one correspondence with at least one scheduling bandwidth threshold, and each element is used to indicate one of the at least one scheduling bandwidth threshold. For example, a first element in the at least one element is used to indicate a first scheduling bandwidth threshold in the at least one scheduling bandwidth threshold, and a second element in the at least one element is used to indicate a second scheduling bandwidth threshold in the at least one scheduling bandwidth threshold. All the scheduling bandwidth thresholds in the value set are numbered, and an element is a number of a scheduling bandwidth threshold. A numbering rule for the scheduling bandwidth thresholds in the value set may be that numbering is performed in ascending order starting from 1 by using a step of 1, and a number increases as a scheduling bandwidth threshold increases; or numbering is performed in ascending order starting from 0 by using a step of 1, and a number increases as a scheduling bandwidth threshold increases; or numbering is performed in descending order starting from the quantity of the scheduling bandwidth thresholds in the value set by using a step of 1, and a number decreases as a scheduling bandwidth threshold increases; or another numbering manner is used. This is not limited in this embodiment. The network device prestores or preconfigures mapping relationships between all the possible scheduling bandwidth thresholds and elements, and the network device generates, based on the mapping relationships, the at least one element corresponding to the at least one scheduling bandwidth threshold. The mapping relationships may be expressed by using a mapping table or a formula.

For example, the mapping relationships prestored or preconfigured by the network device are listed in a mapping table in Table 6:

TABLE 6

| Scheduling bandwidth threshold | Element value |
| --- | --- |
| 1 | 1 |
| 2 | 2 |
| 4 | 3 |
| 8 | 4 |
| 16 | 5 |
| 32 | 6 |
| 64 | 7 |
| 128 | 8 |
| 256 | 9 |
| 512 | 10 |

Assuming that three scheduling bandwidth thresholds determined by the network device are 2, 16, and 64, according to the foregoing mapping relationships, values of three elements generated by the network device are respectively 2, 5, and 7.

For another example, the mapping relationships prestored or preconfigured by the network device are listed in Table 7:

TABLE 7

| Scheduling bandwidth threshold | Element value |
| --- | --- |
| 1 | 10 |
| 2 | 9 |
| 4 | 8 |
| 8 | 7 |

TABLE 7-continued

| Scheduling bandwidth threshold | Element value |
| --- | --- |
| 16 | 6 |
| 32 | 5 |
| 64 | 4 |
| 128 | 3 |
| 256 | 2 |
| 512 | 1 |

Assuming that three scheduling bandwidth thresholds determined by the network device are 2, 16, and 64, values of three elements generated by the network device are 9, 6, and 4.

For another example, the mapping relationships prestored or preconfigured by the network device are listed in Table 8:

TABLE 8

| Scheduling bandwidth threshold | Element value |
| --- | --- |
| 1 | 0 |
| 2 | 1 |
| 4 | 3 |
| 8 | 5 |
| 16 | 7 |
| 32 | 2 |
| 64 | 4 |
| 128 | 6 |
| 256 | 8 |
| 512 | 9 |

Assuming that three scheduling bandwidth thresholds determined by the network device are 2, 16, and 64, values of three elements generated by the network device are 1, 7, and 4.

In a possible implementation, the mapping relationships may be expressed by using a formula: A value of each element is a logarithm of a corresponding scheduling bandwidth threshold to a base 2. For example, a value of the first element is a logarithm of the first scheduling bandwidth threshold to the base 2, that is, $c_1 = \log_2 \text{ptrsthRB}_1$, $c_1$ is the first element, $\log_2$ represents a logarithmic operation to the base 2, and $\text{ptrsthRB}_1$ represents the first scheduling bandwidth threshold. A value of the second element is a logarithm of the second scheduling bandwidth threshold to the base 2.

For example, if the three scheduling bandwidth thresholds determined by the network device are 2, 8, and 64, the three elements generated by the network device are $\log_2 2$, $\log_2 8$, and $\log_2 64$, that is, the values of the three generated elements are 1, 3, and 6.

S220: The network device sends the at least one element to the terminal device.

Specifically, the network device sends the at least one element to the terminal device by using a bit, and the network device determines, based on the quantity of the scheduling bandwidth thresholds in the value set, a quantity of bits used to send each element. The bit quantity is a minimum integer of b satisfying $S \leq 2^b$, where S is the quantity of the scheduling bandwidth thresholds in the value set, and b is the bit quantity. For example, the quantity of the scheduling bandwidth thresholds in the value set is 10. According to the foregoing formula, b=4, and the network device uses 4 bits to represent each element. For example, if the three generated elements are 1, 6, and 7, the three elements sent by the network device are respectively 0001, 0110, and 0111, and a total of 12 bits are required. Compared with the prior art in which 9 bits are fixedly used to configure each scheduling bandwidth threshold, in this embodiment of the present disclosure, 15 bits are reduced, and overheads for configuring the scheduling bandwidth thresholds by the network device are greatly reduced.

S230: The terminal device obtains the at least one scheduling bandwidth threshold.

Specifically, the terminal device prestores or preconfigures the mapping relationships between the scheduling bandwidth thresholds and the elements, and the terminal device obtains the at least one scheduling bandwidth threshold based on the received element. The mapping relationships may be expressed by using a mapping table (for example, as listed in Table 6 to Table 8) or a formula. This step is an inverse process of S210. For a specific process, refer to the descriptions of S210. Details are not described herein again.

Figure 3A:
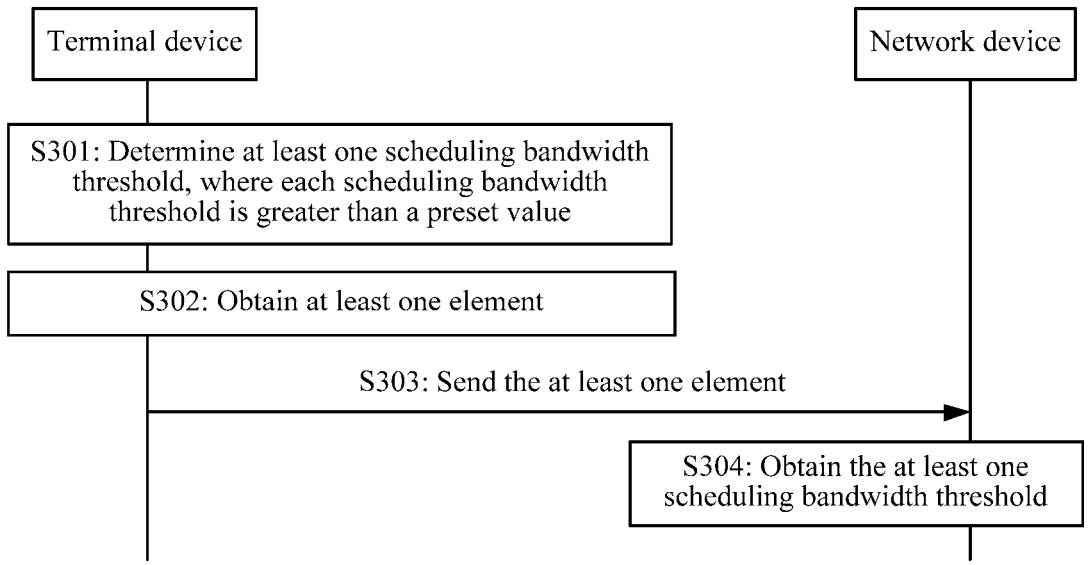
FIG. 3A is another schematic flowchart of a data reporting method according to an embodiment of the present disclosure.

FIG. 3A is a schematic flowchart of a data reporting method according to an embodiment of the present disclosure. In this embodiment of the present disclosure, the method includes the following steps.

S301: A terminal device determines at least one scheduling bandwidth threshold, where each scheduling bandwidth threshold is greater than a preset value.

Specifically, the at least one scheduling bandwidth threshold includes a first scheduling bandwidth threshold and a second scheduling bandwidth threshold, each scheduling bandwidth threshold may be represented by an RB quantity, and the RB quantity is an integer greater than or equal to 1. In this embodiment, for ease of description, a set of all possible scheduling bandwidth thresholds of the terminal device is referred to as a "value set", a maximum scheduling bandwidth threshold in the value set needs to be less than or equal to a specified value, and the specified value is related to a maximum valid system bandwidth and a subcarrier spacing used by the terminal device. For example, the specified value is equal to RB_sym/(SCS$_{UE}$*12), where RB_sym is the maximum valid system bandwidth in a unit of Hz; SCS$_{UE}$ represents the subcarrier spacing used by the terminal device in a unit of Hz; and 12 represents a quantity of subcarrier spacings corresponding to one RB. Assuming that the maximum valid system bandwidth is 400 MHz*0.96, and the subcarrier spacing used by the terminal device is 120 kHz, the specified value is 400 M*0.96/120 k/12+1=267. Optionally, the specified value may be greater than the maximum system bandwidth+1, for example, the specified value may be 512.

Each of the at least one scheduling bandwidth threshold is greater than the preset value, that is, each scheduling bandwidth threshold in the value set is greater than the preset value, the preset value may be a value preconfigured or prestored by the terminal device, and a specific value of the preset value is not limited in this embodiment. The terminal device determines the at least one scheduling bandwidth threshold in the value set.

For example, if the specified value is 267, and the preset value is 199, the value set of the terminal device is {200, 201, 202, . . . , 265, 266, 267}. A quantity of the scheduling bandwidth thresholds in the value set is 68. It is assumed that three scheduling bandwidth thresholds determined by the terminal device are 201, 240, and 260 in the value set.

In another possible implementation, each of the at least one scheduling bandwidth threshold is a natural number power of 2, that is, each scheduling bandwidth threshold in the value set is greater than the preset value and is a natural number power of 2.

For example, if the specified value is 512, and the preset value is 50, the value set is {64, 128, 256, 512}, and three scheduling bandwidth thresholds selected by the terminal device from the value set are 64, 128, and 256.

In another possible implementation, each of the at least one scheduling bandwidth threshold is a product of a natural number power of 2, a natural number power of 3, and a natural number power of 5, and each scheduling bandwidth threshold in the value set is greater than the preset value and is a product of a natural number power of 2, a natural number power of 3, and a natural number power of 5.

For example, if the specified value is 270 (a minimum natural number greater than a system bandwidth and satisfying a product of a natural number power of 2, a natural number power of 3, and a natural number power of 5), and the preset value is 150, the value set is {160, 162, 180, 192, 200, 216, 225, 240, 243, 250, 256, 270}.

S302: The terminal device obtains at least one element.

Specifically, the at least one element is in a one-to-one mapping relationship with the at least one scheduling bandwidth threshold, and each element is used to indicate a first scheduling bandwidth threshold. For example, a first element in the at least one element is used to indicate a first scheduling bandwidth threshold in the at least one scheduling bandwidth threshold, and a second element in the at least one element is used to indicate a second scheduling bandwidth threshold in the at least one scheduling bandwidth threshold. All the scheduling bandwidth thresholds in the value set are numbered, and an element is a number of a scheduling bandwidth threshold. A numbering rule for the scheduling bandwidth thresholds in the value set may be that numbering is performed in ascending order starting from 1 by using a step of 1, and a number increases as a scheduling bandwidth threshold increases; or numbering is performed in ascending order starting from 0 by using a step of 1, and a number increases as a scheduling bandwidth threshold increases; or numbering is performed in descending order starting from the quantity of the scheduling bandwidth thresholds in the value set by using a step of 1, and a number decreases as a scheduling bandwidth threshold increases; or another numbering rule is used to number the scheduling bandwidth thresholds in the value set. This is not limited in this embodiment. The terminal device prestores or preconfigures correspondences between all the possible scheduling bandwidth thresholds and elements, and the terminal device obtains, based on the mapping relationships, the at least one element corresponding to the at least one scheduling bandwidth threshold. The mapping relationships may be expressed by using a mapping table or a formula.

According to the example in S302, the mapping relationships prestored or preconfigured by the terminal device are listed in Table 9:

TABLE 9

| Scheduling bandwidth threshold | Element value |
| --- | --- |
| 258 | 1 |
| 259 | 2 |
| 260 | 3 |
| 261 | 4 |
| 262 | 5 |
| 263 | 6 |
| 264 | 7 |
| 265 | 8 |
| 266 | 9 |
| 267 | 10 |

Assuming that the three scheduling bandwidth thresholds determined by the terminal device are 258, 262, and 266, values of three elements obtained by the terminal device are 1, 5, and 9.

S303: The terminal device sends the at least one element to a network device, and the network device receives the at least one element from the terminal device.

Specifically, the terminal device sends the at least one element to the network device by using a bit, and the terminal device determines, based on the quantity of the scheduling bandwidth thresholds in the value set, a quantity of bits used to send each element. The bit quantity is a minimum integer of b satisfying $S \leq 2^b$, where S is the quantity of the scheduling bandwidth thresholds in the value set, and b is the bit quantity. For example, the quantity of the scheduling bandwidth thresholds in the value set is 10. According to the foregoing formula, b=4, and the terminal device uses 4 bits to represent each element. For example, the at least one element generated by the terminal device is 1, 5, and 9, values sent by the terminal device to the network device are 0001, 0101, and 1001, and a total of 12 bits are occupied. Compared with the prior art in which 9 bits are fixedly occupied by each scheduling bandwidth threshold, in this embodiment of the present disclosure, 15 bits are reduced, and overheads for reporting the scheduling bandwidth thresholds by the terminal device are greatly reduced.

S304: The network device obtains the at least one scheduling bandwidth threshold.

Specifically, the network device prestores or preconfigures the correspondences between all the possible scheduling bandwidth thresholds and elements. The correspondences may be expressed by using a mapping table or a formula. The network device generates the at least one corresponding scheduling bandwidth threshold based on the at least one received element.

Specifically, the network device prestores or preconfigures the mapping relationships between the scheduling bandwidth thresholds and the elements, and the network device obtains the at least one scheduling bandwidth threshold based on the received element. The mapping relationships may be expressed by using a mapping table (for example, as listed in Table 9) or a formula. This step is an inverse process of S302. For a specific process, refer to the descriptions of S302. Details are not described herein again.

In the method described in FIG. 3A, the scheduling bandwidth threshold determined by the terminal device is greater than the preset value, and the terminal device reports the element associated with the scheduling bandwidth threshold to the network device, thereby reducing a quantity of bits required for reporting by the terminal device, and reducing reporting overheads.

Figure 3B:
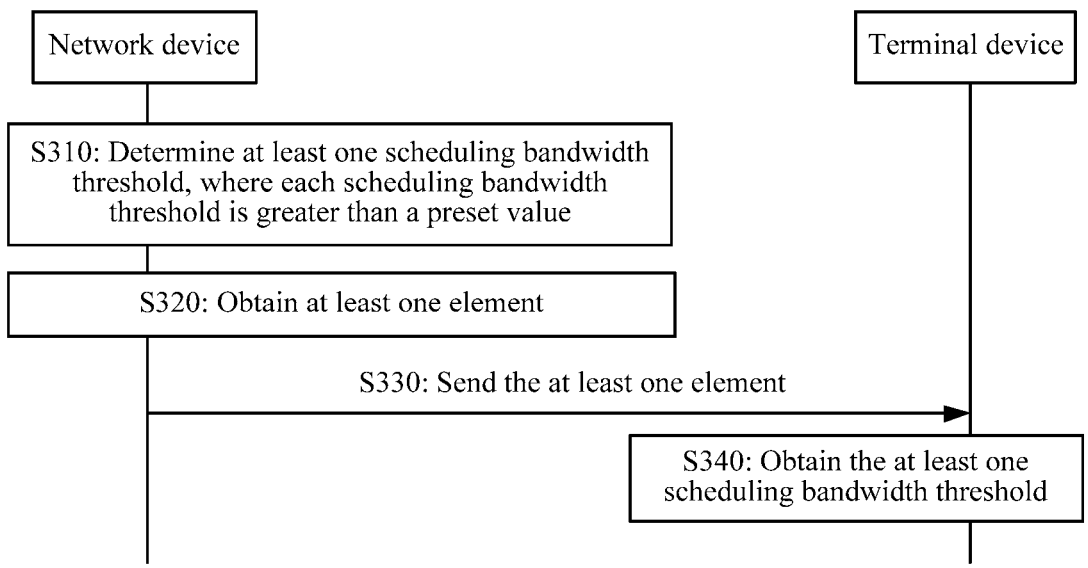
FIG. 3B is another schematic flowchart of a method for configuring a scheduling bandwidth threshold according to an embodiment of the present disclosure.

In another embodiment, the method for limiting the scheduling bandwidth threshold to being greater than the preset value may also be extended to a process in which the network device configures a threshold for the terminal device, that is, the network device configures, for the terminal device, an element associated with a bandwidth threshold, thereby reducing a quantity of bits required for configuring the threshold by the network device, and reducing overheads of configuration signaling. Specifically, for example, as shown in FIG. 3B, a method for configuring a threshold by the network device includes the following steps.

S310: The network device obtains at least one element.

Specifically, the at least one element is in a one-to-one mapping relationship with at least one scheduling bandwidth threshold, and each element is used to indicate a first scheduling bandwidth threshold. For example, a first element in the at least one element is used to indicate a first scheduling bandwidth threshold in the at least one scheduling bandwidth threshold, and a second element in the at least one element is used to indicate a second scheduling bandwidth threshold in the at least one scheduling bandwidth threshold. All the scheduling bandwidth thresholds in the value set are numbered, and an element is a number of a scheduling bandwidth threshold. A numbering rule for the scheduling bandwidth thresholds in the value set may be that numbering is performed in ascending order starting from 1 by using a step of 1, and a number increases as a scheduling bandwidth threshold increases; or numbering is performed in ascending order starting from 0 by using a step of 1, and a number increases as a scheduling bandwidth threshold increases; or numbering is performed in descending order starting from the quantity of the scheduling bandwidth thresholds in the value set by using a step of 1, and a number decreases as a scheduling bandwidth threshold increases; or another numbering rule is used to number the scheduling bandwidth thresholds in the value set. This is not limited in this embodiment. The network device prestores or preconfigures correspondences between all the possible scheduling bandwidth thresholds and elements, and the network device obtains, based on the mapping relationships, the at least one element corresponding to the at least one scheduling bandwidth threshold. The mapping relationships may be expressed by using a mapping table or a formula.

According to the example in S302, the mapping relationships prestored or preconfigured by the network device are listed in Table 10:

TABLE 10

| Scheduling bandwidth threshold | Element value |
|---|---|
| 258 | 1 |
| 259 | 2 |
| 260 | 3 |
| 261 | 4 |
| 262 | 5 |
| 263 | 6 |
| 264 | 7 |
| 265 | 8 |
| 266 | 9 |
| 267 | 10 |

Assuming that three scheduling bandwidth thresholds determined by the terminal device are 258, 262, and 266, values of three elements obtained by the terminal device are 1, 5, and 9.

S320: The network device sends the at least one element to the terminal device.

Specifically, the network device may send the at least one element to the terminal device by using a bit, and the network device determines, based on the quantity of the scheduling bandwidth thresholds in the value set, a quantity of bits used to send each element. The bit quantity is a minimum integer of b satisfying $S \leq 2^b$, where S is the quantity of the scheduling bandwidth thresholds in the value set, and b is the bit quantity. For example, the quantity of the scheduling bandwidth thresholds in the value set is 10. According to the foregoing formula, b=4, and the network device uses 4 bits to represent each element. For example, the at least one element generated by the terminal device is 1, 5, and 9, values sent by the network device to the terminal device are 0001, 0101, and 1001, and a total of 12 bits are occupied. Compared with the prior art in which 9 bits are fixedly occupied by each scheduling code threshold, in this embodiment of the present disclosure, 15 bits are reduced, and overheads for configuring the scheduling bandwidth thresholds by the network device are greatly reduced.

S304: The terminal device obtains the at least one scheduling bandwidth threshold.

Specifically, the terminal device prestores or preconfigures the correspondences between all the possible scheduling bandwidth thresholds and the elements. The correspondences may be expressed by using a mapping table or a formula. The terminal device generates the at least one corresponding scheduling bandwidth threshold based on the at least one received element.

Figure 4A:
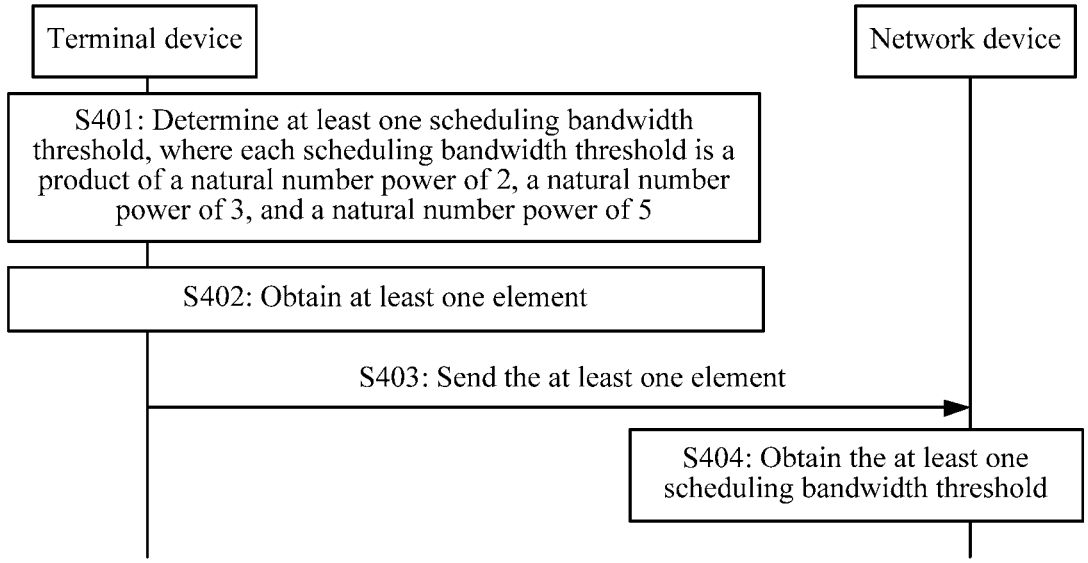
FIG. 4A is another schematic flowchart of a data reporting method according to an embodiment of the present disclosure.

FIG. 4A is a schematic flowchart of a data reporting method according to an embodiment of the present disclosure. In this embodiment of the present disclosure, the method includes the following steps.

S401: A terminal device determines at least one scheduling bandwidth threshold, where each scheduling bandwidth threshold is a product of a natural number power of 2, a natural number power of 3, and a natural number power of 5.

Specifically, the at least one scheduling bandwidth threshold includes a first scheduling bandwidth threshold and a second scheduling bandwidth threshold, each scheduling bandwidth threshold may be represented by an RB quantity, and the RB quantity is an integer greater than or equal to 1. The at least one scheduling bandwidth threshold determined by the terminal device belongs to all possible scheduling bandwidth thresholds of the terminal device. For ease of description, in this embodiment, all the possible scheduling bandwidth thresholds of the terminal device are referred to as a "value set", a maximum scheduling bandwidth threshold in the value set needs to be less than or equal to a specified value, and the specified value is related to a maximum valid system bandwidth and a subcarrier spacing used by the terminal device. For example, the specified value is equal to RB_sym/(SCS$_{UE}$*12), where RB_sym is the maximum valid system bandwidth; SCS$_{UE}$ represents the subcarrier spacing used by the terminal device; and 12 represents a quantity of subcarrier spacings corresponding to one RB. Assuming that the maximum valid system bandwidth is 400 M*0.96, and the subcarrier spacing used by the terminal device is 120 kHz, the specified value is 400 M*0.96/120 k/12+1=267, or the specified value is a minimum natural number greater than a system bandwidth and satisfying a product of a natural number power of 2, a natural number power of 3, and a natural number power of 5, for example, 270.

Each of the at least one scheduling bandwidth threshold is a product of a natural number power of 2, a natural number power of 3, and a natural number power of 5, that is, each scheduling bandwidth threshold in the value set is a product of a natural number power of 2, a natural number power of 3, and a natural number power of 5. The terminal device determines at least one different scheduling bandwidth threshold in the value set.

An example is used for description: The specified value is 270, the value set is {1, 2, 3, 4, 5, 6, 8, 9, 10, 12, 15, 16, 18, 20, 24, 25, 27, 30, 32, 36, 40, 45, 48, 50, 54, 60, 64, 72, 75, 80, 81, 90, 96, 100, 108, 120, 125, 128, 135, 144, 150, 160, 162, 180, 192, 200, 216, 225, 240, 243, 250, 256, 270}, there are a total of 53 scheduling bandwidth thresholds in the value set, and each element in the value set is a product of a natural number power of 2, a natural number power of 3, and a natural number power of 5. It is assumed that three scheduling bandwidth thresholds determined by the terminal device in the value set are 1, 6, and 32.

It should be noted that, some scheduling bandwidth thresholds not satisfying a natural number power of 2, a natural number power of 3, or a natural number power of 5 may be added to the value set according to a requirement. Optionally, 0 is added to the current value set. Optionally, 270 may be replaced by a number greater than 256.

In a possible implementation, each of the at least one scheduling bandwidth threshold is greater than the preset value, that is, each scheduling bandwidth threshold in the value set is greater than the preset value and is a product of a natural number power of 2, a natural number power of 3, and a natural number power of 5.

An example is used for description: The specified value is 267, the preset value is 200, and the value set is {216, 225, 240, 243, 250, 256, 267}. It is assumed that the three scheduling bandwidth thresholds determined by the terminal device in the value set are 216, 243, and 256.

In a possible implementation, a waveform used by the terminal device is DFT-S-OFDM.

S402: The terminal device obtains at least one element.

Specifically, the at least one element is in a one-to-one correspondence with the at least one scheduling bandwidth threshold, and each element is used to indicate one scheduling bandwidth threshold. For example, a first element in the at least one element is used to indicate a first scheduling bandwidth threshold in the at least one scheduling bandwidth threshold, and a second element in the at least one element is used to indicate a second scheduling bandwidth threshold in the at least one scheduling bandwidth threshold. All the scheduling bandwidth thresholds in the value set are numbered, and an element is a number of a scheduling bandwidth threshold. A numbering rule for the scheduling bandwidth thresholds in the value set may be that numbering is performed in ascending order starting from 1 by using a step of 1, and a number increases as a scheduling bandwidth threshold increases; or numbering is performed in ascending order starting from 0 by using a step of 1, and a number increases as a scheduling bandwidth threshold increases; or numbering is performed in descending order starting from the quantity of the scheduling bandwidth thresholds in the value set by using a step of 1, and a number decreases as a scheduling bandwidth threshold increases; or another numbering manner is used. This is not limited in this embodiment. The terminal device prestores or preconfigures mapping relationships between all the possible scheduling bandwidth thresholds and elements, and the terminal device generates, based on the correspondences, the at least one element corresponding to the at least one scheduling bandwidth threshold. The mapping relationships may be expressed by using a mapping table or a formula.

For example, the mapping relationships preconfigured or prestored by the terminal device are listed in Table 11:

TABLE 11

| Scheduling bandwidth threshold | Element value |
|---|---|
| 216 | 1 |
| 225 | 2 |
| 240 | 3 |
| 243 | 4 |
| 250 | 5 |
| 256 | 6 |
| 267 | 7 |

Assuming that the three scheduling bandwidth thresholds determined by the terminal device are 216, 243, and 256, values of three elements generated by the terminal device based on the mapping relationships in Table 11 are 1, 4, and 6.

S403: The terminal device sends the at least one element to a network device, and the network device receives the at least one element from the terminal device.

Specifically, the terminal device sends the at least one element to the network device by using a bit, and the terminal device determines, based on the quantity of the scheduling bandwidth thresholds in the value set, a quantity of bits used to send each element. The bit quantity is a minimum integer of b satisfying $S \leq 2^b$, where S is the quantity of the scheduling bandwidth thresholds in the value set, and b is the bit quantity. For example, the quantity of the scheduling bandwidth thresholds in the value set is 6. According to the foregoing formula, b=3, and the terminal device uses 3 bits to represent each element. For example, if the three generated elements are 1, 4, and 6, the three elements sent by the terminal device are 001, 100, and 111, and a total of 9 bits are required. Compared with the prior art in which 9 bits are fixedly used to report each scheduling bandwidth threshold, in this embodiment of the present disclosure, overheads for reporting the scheduling bandwidth thresholds by the terminal device are greatly reduced.

S404: The network device obtains the at least one scheduling bandwidth threshold, where each scheduling bandwidth threshold is less than or equal to a maximum bandwidth supported by the terminal device.

Specifically, the network device prestores or preconfigures the mapping relationships between the scheduling bandwidth thresholds and the elements, and the network device obtains the at least one scheduling bandwidth threshold based on the received element. The mapping relationships may be expressed by using a mapping table (for example, as listed in Table 11) or a formula. This step is an inverse process of S402. For a specific process, refer to the descriptions of S402. Details are not described herein again.

In the method described in FIG. 4A, the scheduling bandwidth threshold determined by the terminal device is a product of a natural number power of 2, a natural number power of 3, and a natural number power of 5, and the terminal device reports the element associated with the scheduling bandwidth threshold to the network device, thereby reducing a quantity of bits required for reporting by the terminal device, and reducing reporting overheads.

In another embodiment, the method for limiting the scheduling bandwidth threshold to a product of a natural number power of 2, a natural number power of 3, and a natural number power of 5 may also be extended to a process in which the network device configures a threshold for the terminal device, that is, the network device configures, for the terminal device, an element associated with a bandwidth threshold, thereby reducing a quantity of bits required for configuring the threshold by the network device, and reducing overheads of configuration signaling.

Figure 4B:
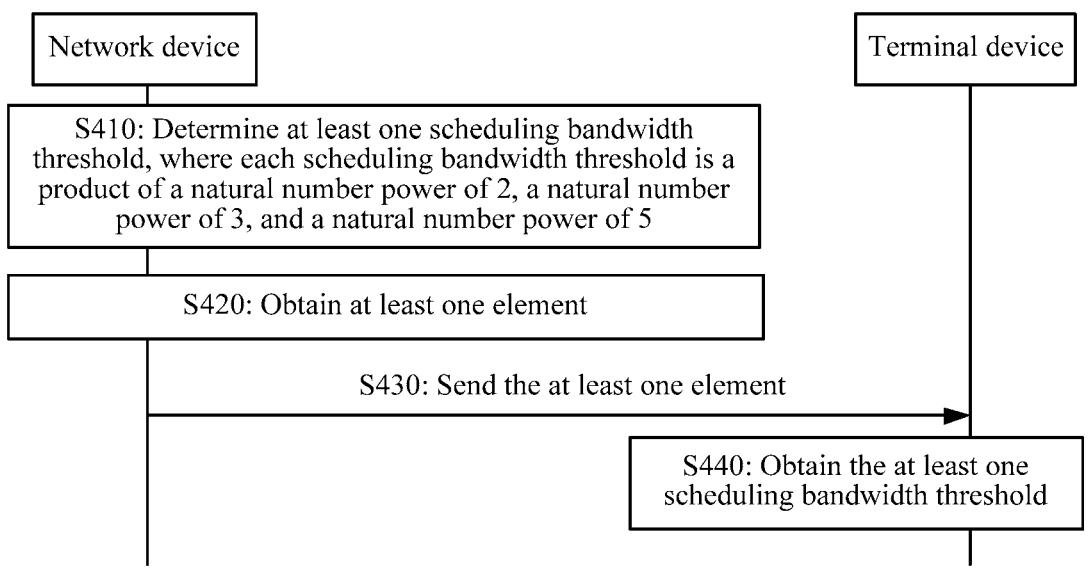
FIG. 4B is another schematic flowchart of a method for configuring a scheduling bandwidth threshold according to an embodiment of the present disclosure.

For example, as shown in FIG. 4B, a method for configuring a scheduling bandwidth threshold by the network device includes the following steps.

S410: The network device determines at least one scheduling bandwidth threshold, where each scheduling bandwidth threshold is a product of a natural number power of 2, a natural number power of 3, and a natural number power of 5.

Specifically, the at least one scheduling bandwidth threshold includes a first scheduling bandwidth threshold and a second scheduling bandwidth threshold, each scheduling bandwidth threshold may be represented by an RB quantity, and the RB quantity is an integer greater than or equal to 1. The at least one scheduling bandwidth threshold determined by the network device belongs to all possible scheduling bandwidth thresholds of the network device. For ease of description, in this embodiment, all the possible scheduling bandwidth thresholds of the network device are referred to as a "value set", a maximum scheduling bandwidth threshold in the value set needs to be less than or equal to a specified value, and the specified value is related to a maximum valid system bandwidth and a subcarrier spacing used by the terminal device. For example, the specified value is equal to $RB\_sym/(SCS_{UE}*12)+1$, where RB_sym is the maximum valid system bandwidth; $SCS_{UE}$ represents the subcarrier spacing used by the terminal device; and 12 represents a quantity of subcarrier spacings corresponding to one RB. Assuming that the maximum valid system bandwidth is 400 M*0.96, and the subcarrier spacing used by the network device is 120 kHz, the specified value is 400 M*0.96/120 k/12+1=267, or the specified value is a minimum natural number greater than a system bandwidth and satisfying a product of a natural number power of 2, a natural number power of 3, and a natural number power of 5, for example, 270.

Each of the at least one scheduling bandwidth threshold is a product of a natural number power of 2, a natural number power of 3, and a natural number power of 5, that is, each scheduling bandwidth threshold in the value set is a product of a natural number power of 2, a natural number power of 3, and a natural number power of 5. The network device determines at least one different scheduling bandwidth threshold in the value set.

An example is used for description: The specified value is 270, the value set is {1, 2, 3, 4, 5, 6, 8, 9, 10, 12, 15, 16, 18, 20, 24, 25, 27, 30, 32, 36, 40, 45, 48, 50, 54, 60, 64, 72, 75, 80, 81, 90, 96, 100, 108, 120, 125, 128, 135, 144, 150, 160, 162, 180, 192, 200, 216, 225, 240, 243, 250, 256, 270}, there are a total of 53 scheduling bandwidth thresholds in the value set, and each element in the value set is a product of a natural number power of 2, a natural number power of 3, and a natural number power of 5. It is assumed that three scheduling bandwidth thresholds determined by the network device in the value set are 1, 6, and 32.

It should be noted that, some scheduling bandwidth thresholds not satisfying a natural number power of 2, a natural number power of 3, and a natural number power of 5 may be added to the value set according to a requirement. Optionally, 0 is added to the current value set. Optionally, 270 may be replaced by a number greater than 256.

In a possible implementation, each of the at least one scheduling bandwidth threshold is greater than the preset value, that is, each scheduling bandwidth threshold in the value set is greater than the preset value and is a natural number power of 2, a natural number power of 3, and a natural number power of 5.

An example is used for description: The specified value is 267, the preset value is 200, and the value set is {216, 225, 240, 243, 250, 256, 267}. It is assumed that three scheduling bandwidth thresholds determined by the network device in the value set are 216, 243, and 256.

In a possible implementation, a waveform used by the network device is DFT-S-OFDM.

S420: The network device obtains at least one element.

Specifically, the at least one element is in a one-to-one correspondence with the at least one scheduling bandwidth threshold, and each element is used to indicate one scheduling bandwidth threshold. For example, a first element in the at least one element is used to indicate a first scheduling bandwidth threshold in the at least one scheduling bandwidth threshold, and a second element in the at least one element is used to indicate a second scheduling bandwidth threshold in the at least one scheduling bandwidth threshold. All the scheduling bandwidth thresholds in the value set are numbered, and an element is a number of a scheduling bandwidth threshold. A numbering rule for the scheduling bandwidth thresholds in the value set may be that numbering is performed in ascending order starting from 1 by using a step of 1, and a number increases as a scheduling bandwidth threshold increases; or numbering is performed in ascending order starting from 0 by using a step of 1, and a number increases as a scheduling bandwidth threshold increases; or numbering is performed in descending order starting from the quantity of the scheduling bandwidth thresholds in the value set by using a step of 1, and a number decreases as a scheduling bandwidth threshold increases; or another numbering manner is used. This is not limited in this embodiment. The network device prestores or preconfigures mapping relationships between all the possible scheduling bandwidth thresholds and elements, and the network device generates, based on the correspondences, the at least one element corresponding to the at least one scheduling bandwidth threshold. The mapping relationships may be expressed by using a mapping table or a formula.

For example, the mapping relationships preconfigured or prestored by the network device are listed in Table 12:

TABLE 12

| Scheduling bandwidth threshold | Element value |
|---|---|
| 216 | 1 |
| 225 | 2 |
| 240 | 3 |
| 243 | 4 |
| 250 | 5 |
| 256 | 6 |
| 267 | 7 |

Assuming that three scheduling bandwidth thresholds determined by the network device are 216, 243, and 256, values of three elements generated by the network device based on the mapping relationships in Table 12 are 1, 4, and 6.

S430: The network device sends the at least one element to the terminal device.

Specifically, the network device sends the at least one element to the terminal device by using a bit, and the network device determines, based on the quantity of the scheduling bandwidth thresholds in the value set, a quantity of bits used to send each element. The bit quantity is a minimum integer of b satisfying $S \leq 2^b$, where S is the quantity of the scheduling bandwidth thresholds in the value set, and b is the bit quantity. For example, the quantity of the scheduling bandwidth thresholds in the value set is 6. According to the foregoing formula, b=3, and the network device uses 3 bits to represent each element. For example, if the three generated elements are 1, 4, and 6, the three elements sent by the network device are 001, 100, and 111, and a total of 9 bits are required. Compared with the prior art in which 9 bits are fixedly used to configure each scheduling bandwidth threshold, in this embodiment of the present disclosure, overheads for configuring the scheduling bandwidth thresholds by the network device are greatly reduced.

S440: The terminal device obtains the at least one scheduling bandwidth threshold, where each scheduling bandwidth threshold is less than or equal to a maximum bandwidth supported by the terminal device.

Specifically, the terminal device prestores or preconfigures the mapping relationships between the scheduling bandwidth thresholds and the elements, and the terminal device obtains the at least one scheduling bandwidth threshold based on the received element. The mapping relationships may be expressed by using a mapping table (for example, as listed in Table 12) or a formula. This step is an inverse process of S420. For a specific process, refer to the descriptions of S420. Details are not described herein again.

Figure 5A:
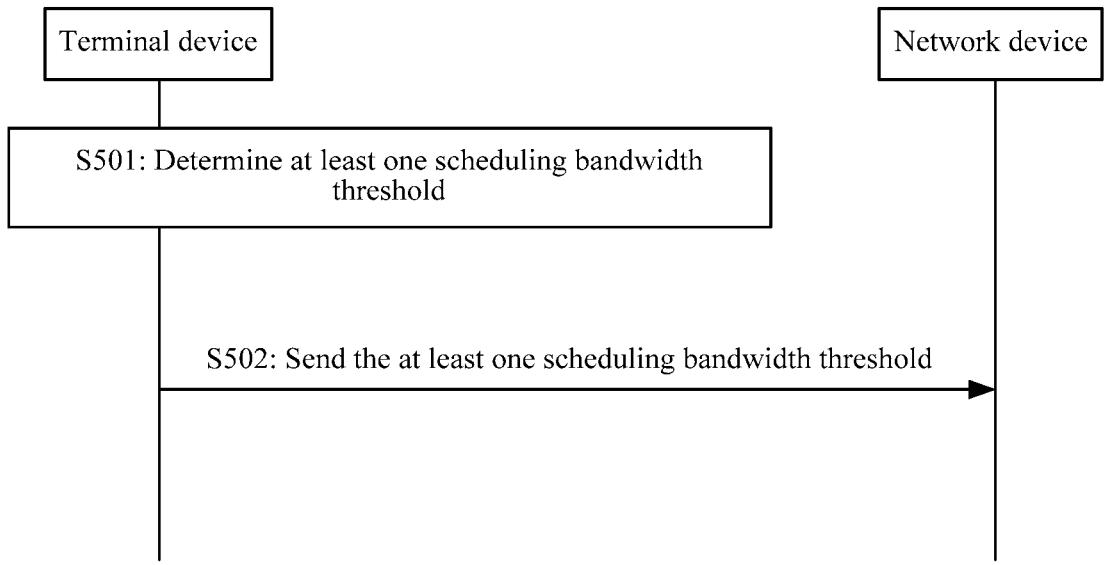
FIG. 5A is a schematic flowchart of a data reporting method according to an embodiment of the present disclosure.

FIG. 5A is a schematic flowchart of a data reporting method according to an embodiment of the present disclosure. In this embodiment of the present disclosure, the method includes the following steps.

S501: A terminal device determines at least one scheduling bandwidth threshold, where each scheduling bandwidth threshold is less than or equal to a maximum bandwidth supported by the terminal device.

Specifically, the at least one scheduling bandwidth threshold includes a first scheduling bandwidth threshold and a second scheduling bandwidth threshold, each scheduling bandwidth threshold may be represented by an RB quantity, and the RB quantity is an integer greater than or equal to 1. The at least one scheduling bandwidth threshold determined by the terminal device belongs to all possible scheduling bandwidth thresholds of the terminal device. For ease of description, in this embodiment, all the possible scheduling bandwidth thresholds of the terminal device are referred to as a "value set", a maximum scheduling bandwidth threshold in the value set needs to be less than or equal to a specified value, and the specified value is related to a maximum valid system bandwidth and a subcarrier spacing used by the terminal device. For example, the specified value is equal to $RB\_sym/(SCS_{UE}*12)+1$, where $RB\_sym$ is the maximum valid system bandwidth; $SCS_{UE}$ represents the subcarrier spacing used by the terminal device; and 12 represents a quantity of subcarrier spacings corresponding to one RB. Assuming that the maximum valid system bandwidth is 400 M*0.96, and the subcarrier spacing used by the terminal device is 120 kHz, the specified value is 400 M*0.96/120 k/12+1=267, or the specified value is a value satisfying another condition.

Each of the at least one scheduling bandwidth threshold determined by the terminal device is less than or equal to the maximum bandwidth supported by the terminal device, that is, each scheduling bandwidth threshold in the value set is less than or equal to the maximum bandwidth supported by the terminal device, and the maximum bandwidth supported by the terminal device may be represented by an RB quantity. The terminal device determines at least one different scheduling bandwidth threshold in the value set. It may be understood that, the maximum bandwidth supported by the terminal device is apparently less than the specified value.

An example is used for description: If the maximum bandwidth supported by the terminal device is 66 RBs, the value set is {1, 2, 3, . . . , 65, 66, 67}. It is assumed that three scheduling bandwidth thresholds determined by the terminal device in the value set are 1, 30, and 50.

In a possible implementation, each of the at least one scheduling bandwidth threshold is a natural number power of 2, that is, each scheduling bandwidth threshold in the value set is less than or equal to the maximum bandwidth supported by the terminal device and is a natural number power of 2.

In a possible implementation, each of the at least one scheduling bandwidth threshold is a product of a natural number power of 2, a natural number power of 3, and a natural number power of 5, that is, each scheduling bandwidth threshold in the value set is less than or equal to the maximum bandwidth supported by the terminal device and is a product of a natural number power of 2, a natural number power of 3, and a natural number power of 5.

S502: The terminal device sends the at least one scheduling bandwidth threshold to a network device, where the network device receives the at least one scheduling bandwidth threshold from the terminal device.

Specifically, the terminal device sends the at least one scheduling bandwidth threshold to the network device by using a bit, and the terminal device determines, based on a quantity of the scheduling bandwidth thresholds in the value set, a quantity of bits used to send each element. The bit quantity is a minimum integer of b satisfying $S \leq 2^b$, where S is the quantity of the scheduling bandwidth thresholds in the value set, and b is the bit quantity. For example, the quantity of the scheduling bandwidth thresholds in the value set is 70. According to the foregoing formula, b=7, and the terminal device uses 7 bits to represent each element. For example, if the three determined scheduling bandwidth thresholds are 1, 30, and 50, three scheduling bandwidth thresholds sent by the terminal device by using bits are 0000001, 0011110, and 0110010, and a total of 21 bits are required. Compared with the prior art in which 9 bits are fixedly used to report each scheduling bandwidth threshold, in this embodiment of the present disclosure, overheads for reporting the scheduling bandwidth thresholds by the terminal device are greatly reduced.

In another possible embodiment, when the network device sends to or configures for the terminal a scheduling bandwidth threshold related to a PTRS pattern, the network device may determine, based on the quantity of the scheduling bandwidth thresholds in the value set, a quantity of bits used to send each element. The scheduling bandwidth threshold in the value set is less than or equal to NRB_max, where NRB_max is, at a given subcarrier spacing, 1+a maximum RB quantity of the maximum bandwidth supported by the terminal.

Figure 5B:
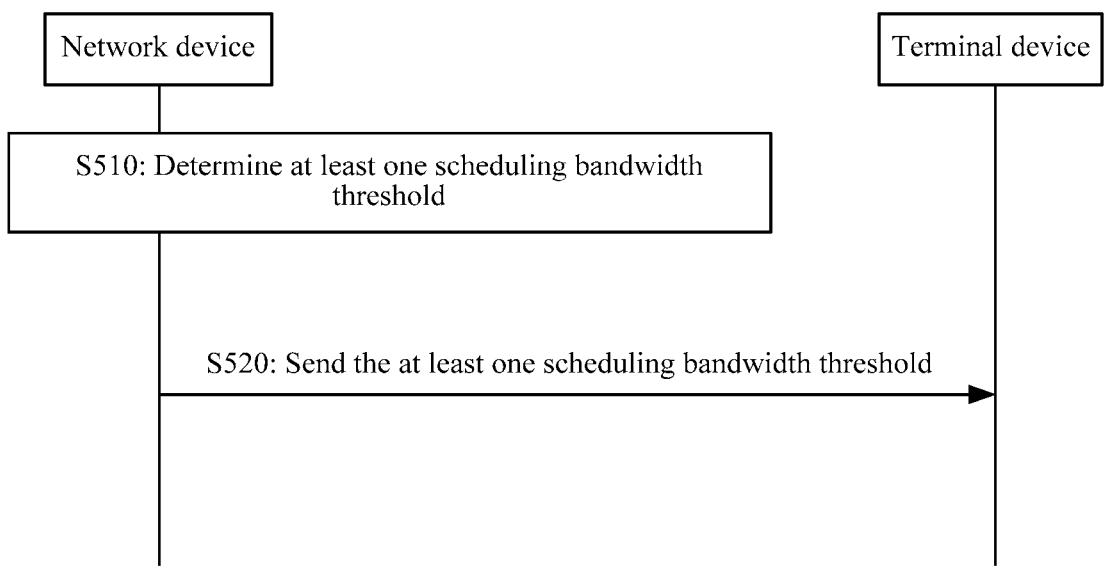
FIG. 5B is another schematic flowchart of a method for configuring a scheduling bandwidth threshold according to an embodiment of the present disclosure.

For example, as shown in FIG. 5B, a method for configuring a scheduling bandwidth threshold by the network device includes the following steps.

S510: The network device determines at least one scheduling bandwidth threshold, where each scheduling bandwidth threshold is less than or equal to the maximum bandwidth supported by the terminal device. For content of step 510, refer to the descriptions of step 501. Details are not described herein again.

S520: The network device sends the at least one scheduling bandwidth threshold to the terminal device.

Specifically, the network device sends the at least one scheduling bandwidth threshold to the terminal device by using a bit, and the network device determines, based on the quantity of the scheduling bandwidth thresholds in the value set, a quantity of bits used to send each element. The bit quantity is a minimum integer of b satisfying $S \leq 2^b$, where S is the quantity of the scheduling bandwidth thresholds in the value set, and b is the bit quantity. For example, the quantity of the scheduling bandwidth thresholds in the value set is 70. According to the foregoing formula, b=7, and the network device uses 7 bits to represent each element. For example, if the three determined scheduling bandwidth thresholds are 1, 30, and 50, the three scheduling bandwidth thresholds sent by the network device by using bits are 0000001, 0011110, and 0110010, and a total of 21 bits are required. Compared with the prior art in which 9 bits are fixedly used to configure each scheduling bandwidth threshold, in this embodiment of the present disclosure, overheads for configuring the scheduling bandwidth thresholds by the network device are greatly reduced.

Figure 6A:
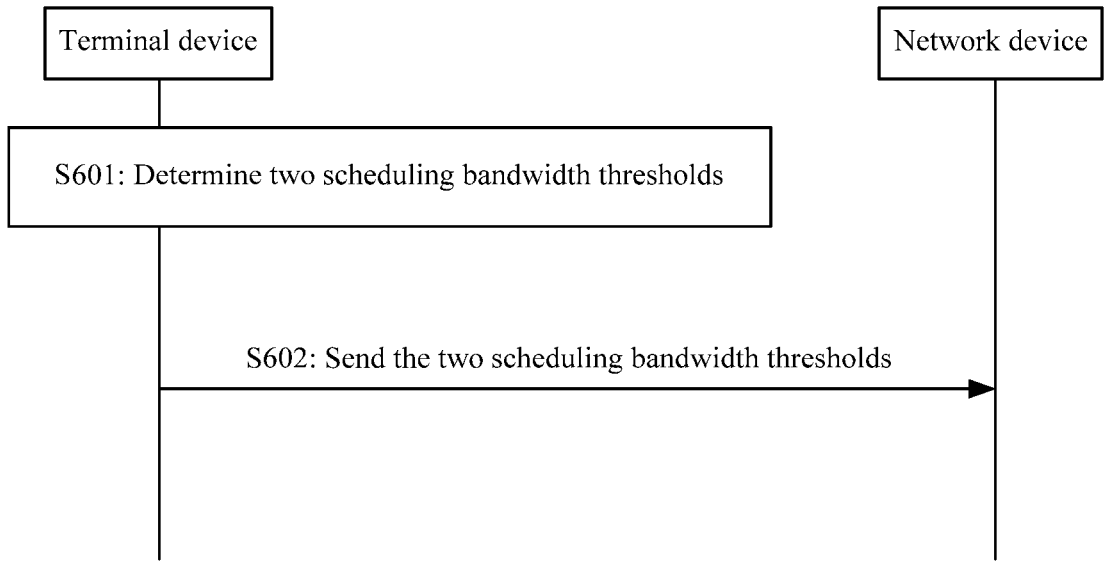
FIG. 6A is a schematic flowchart of a data reporting method according to an embodiment of the present disclosure.

FIG. 6A is a schematic flowchart of a data reporting method according to an embodiment of the present disclosure. In this embodiment of the present disclosure, the method includes the following steps.

S601: A terminal device determines two scheduling bandwidth thresholds.

Specifically, in the prior art, one group of scheduling bandwidth thresholds reported by a terminal device includes three scheduling bandwidth thresholds: a first scheduling bandwidth threshold, a second scheduling bandwidth threshold, and a third scheduling bandwidth threshold. The first scheduling bandwidth threshold is a minimum value, the third scheduling bandwidth threshold is a maximum value, and the second scheduling bandwidth threshold is greater than the first scheduling bandwidth threshold and less than the third scheduling bandwidth threshold. In this embodiment of the present disclosure, two scheduling bandwidth thresholds determined by the terminal device are a first scheduling bandwidth threshold and a second scheduling bandwidth threshold, and a third scheduling bandwidth threshold is a default value. For example, the third scheduling bandwidth threshold is related to a maximum bandwidth supported by the terminal device, the maximum bandwidth may be represented by an RB quantity, and the third scheduling bandwidth threshold is less than or equal to 1 plus the maximum bandwidth supported by the terminal device. The terminal device further needs to report the supported maximum bandwidth, and a network device may determine the third scheduling bandwidth threshold based on the maximum bandwidth reported by the terminal device.

S602: The terminal device sends the two scheduling bandwidth thresholds to the network device.

Specifically, the terminal device sends the two scheduling bandwidth thresholds by using bits. Compared with the prior art in which three scheduling bandwidth thresholds need to be reported, in this embodiment of the present disclosure, overheads for reporting the scheduling bandwidth thresholds by the terminal device are greatly reduced.

In another possible embodiment, when the network device sends to or configures for the terminal a scheduling bandwidth threshold related to a PTRS pattern, the network device may not configure a maximum threshold, that is, pre-agrees on with the terminal device or preconfigures that the maximum threshold is equal to 1 plus the maximum bandwidth supported by the terminal.

Figure 6B:
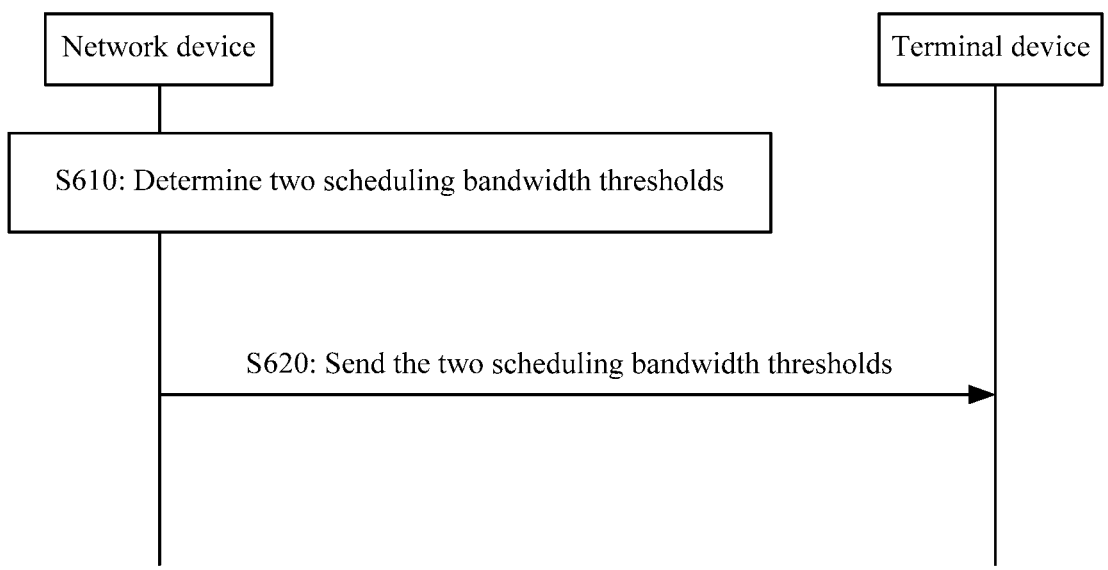
FIG. 6B is another schematic flowchart of a method for configuring a scheduling bandwidth threshold according to an embodiment of the present disclosure.

Specifically, for example, as shown in FIG. 6B, a method for configuring a scheduling bandwidth threshold by the network device includes the following steps.

S610: The network device determines two scheduling bandwidth thresholds.

Specifically, in the prior art, one group of scheduling bandwidth thresholds sent or configured by the network device includes three scheduling bandwidth thresholds: a first scheduling bandwidth threshold, a second scheduling bandwidth threshold, and a third scheduling bandwidth threshold. The first scheduling bandwidth threshold is a minimum value, the third scheduling bandwidth threshold is a maximum value, and the second scheduling bandwidth threshold is greater than the first scheduling bandwidth threshold and less than the third scheduling bandwidth threshold. In this embodiment of the present disclosure, two scheduling bandwidth thresholds determined by the network device are a first scheduling bandwidth threshold and a second scheduling bandwidth threshold, and a third scheduling bandwidth threshold is a default value. For example, for the third scheduling bandwidth threshold and a maximum bandwidth supported by the terminal device, the maximum bandwidth may be represented by an RB quantity, and the third scheduling bandwidth threshold is less than or equal to 1 plus the maximum bandwidth supported by the terminal device. The network device may determine the third scheduling bandwidth threshold based on the maximum bandwidth reported by the terminal device.

S620: The network device sends the two scheduling bandwidth thresholds to the terminal device.

Specifically, the network device sends the two scheduling bandwidth thresholds by using bits. Compared with the prior art in which three scheduling bandwidth thresholds need to be configured, in this embodiment of the present disclosure, overheads for configuring the scheduling bandwidth thresholds by the network device are greatly reduced.

Figure 7A:
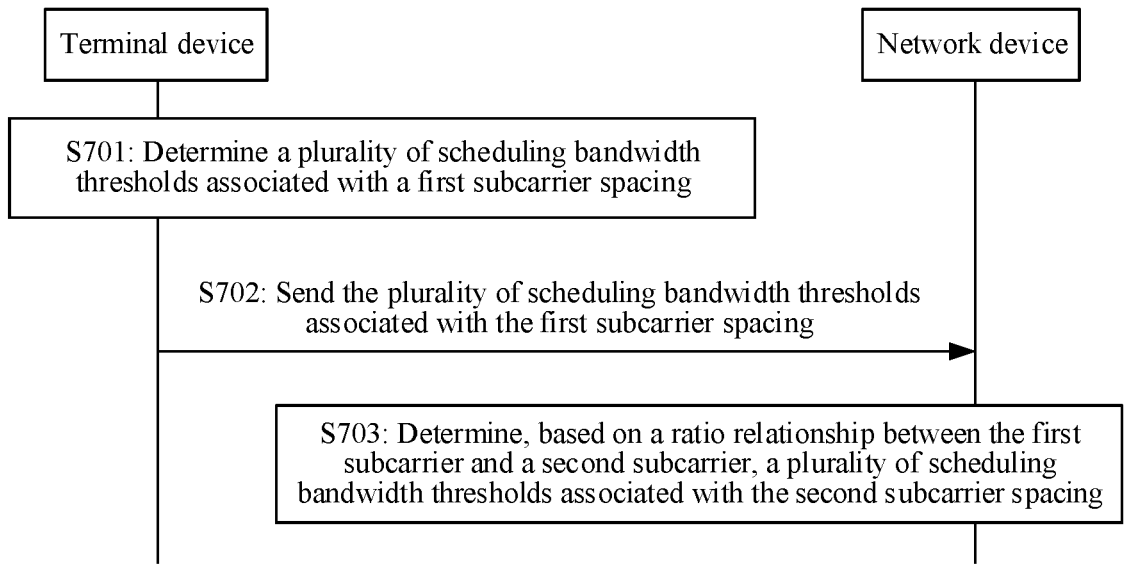
FIG. 7A is a schematic flowchart of a data reporting method according to an embodiment of the present disclosure.

FIG. 7A is a schematic flowchart of a data reporting method according to an embodiment of the present disclosure. In this embodiment of the present disclosure, the method includes the following steps.

S701: A terminal device determines at least one scheduling bandwidth threshold associated with a first subcarrier spacing.

Specifically, in the prior art, a terminal device needs to report at least one scheduling bandwidth threshold for each subcarrier spacing based on different supported subcarrier spacings. For example, if the terminal device supports a subcarrier spacing of 60 kHz and a subcarrier spacing of 120 kHz, the terminal device needs to separately report three scheduling bandwidth thresholds associated with 60 kHz and three scheduling bandwidth thresholds associated with 120 kHz to a network device. In this application, the terminal device uses the first subcarrier spacing as a default subcarrier spacing, and the terminal device only needs to report the at least one scheduling bandwidth threshold associated with the first subcarrier spacing to the network device. For example, if the default subcarrier spacing is 120 kHz, the terminal device determines at least one scheduling bandwidth threshold associated with 120 kHz.

In a possible design, the first subcarrier spacing is associated with two scheduling bandwidth thresholds. In the prior art, one group of scheduling bandwidth thresholds associated with the first subcarrier and reported by the terminal device includes three scheduling bandwidth thresholds: a first scheduling bandwidth threshold, a second scheduling bandwidth threshold, and a third scheduling bandwidth threshold. The first scheduling bandwidth threshold is a minimum value, the third scheduling bandwidth threshold is a maximum value, and the second scheduling bandwidth threshold is greater than the first scheduling bandwidth threshold and less than the third scheduling bandwidth threshold. In this application, a third scheduling bandwidth threshold is a default value, the network device already knows the third scheduling bandwidth threshold, and the terminal device only needs to report a first scheduling bandwidth threshold and a second scheduling bandwidth threshold.

S702: The terminal device sends the at least one scheduling bandwidth threshold associated with the first subcarrier to the network device, and the network device receives, from the terminal device, the at least one scheduling bandwidth threshold associated with the first subcarrier.

Specifically, the terminal device may send, to the network device by using a bit, the at least one scheduling bandwidth threshold associated with the first subcarrier spacing. When the terminal device supports at least one different subcarrier spacing, the terminal device only needs to report at least one scheduling bandwidth threshold associated with one subcarrier spacing, without reporting one group of scheduling bandwidth thresholds for each subcarrier spacing, thereby greatly reducing reporting overheads.

S703: The network device determines, based on a ratio value of a second subcarrier spacing to the first subcarrier spacing, at least one scheduling bandwidth threshold associated with the second subcarrier.

Specifically, the network device determines, based on a ratio relationship between the first subcarrier spacing and the second subcarrier spacing, the at least one scheduling bandwidth threshold associated with the second subcarrier spacing.

For example, when the first subcarrier spacing is 120 kHz, assuming that at least one scheduling bandwidth threshold associated with 120 kHz, reported by the terminal device, and received by the network device is 10, 25, and 67, a method for determining, by the network device, three scheduling bandwidth thresholds associated with a subcarrier of 60 kHz is: determining that a ratio of the first subcarrier spacing to the second subcarrier spacing is 120 kHz/60 kHz=2, multiplying the three scheduling bandwidth thresholds associated with 120 kHz by 2 to obtain the three scheduling bandwidth thresholds associated with 60 kHz: 10*2, 25*2, and 6*2.

For another example, when the first subcarrier spacing is 60 kHz, assuming that three scheduling bandwidth thresholds associated with 60 kHz, reported by the terminal device, and received by the network device are 10, 24, and 133, a method for determining, by the network device, three scheduling bandwidth thresholds associated with the second subcarrier spacing of 120 kHz is: determining that a ratio of the first subcarrier spacing to the second subcarrier is 60 kHz/120 kHz=½, and multiplying the three scheduling bandwidth thresholds associated with 60 kHz by ½ to obtain the three scheduling bandwidth thresholds associated with 120 kHz: 10/2, 24/2, and ⌈133/2⌉, where ⌈ ⌉ represents rounding up to a nearest integer.

According to the descriptions of FIG. 7A, when the terminal device supports at least one different subcarrier spacing, the terminal device only needs to report at least one scheduling bandwidth threshold associated with one subcarrier spacing, without reporting one group of scheduling bandwidth thresholds for each subcarrier spacing, thereby greatly reducing reporting overheads.

In another possible embodiment, when the network device sends to or configures for the terminal a scheduling bandwidth threshold related to a PTRS pattern, the network device may report at least one scheduling bandwidth threshold at only one subcarrier spacing that is pre-agreed on or preconfigured, and the terminal device determines a scheduling threshold at another subcarrier spacing based on the at least one received scheduling bandwidth threshold at the subcarrier spacing that is pre-agreed on or preconfigured.

Figure 7B:
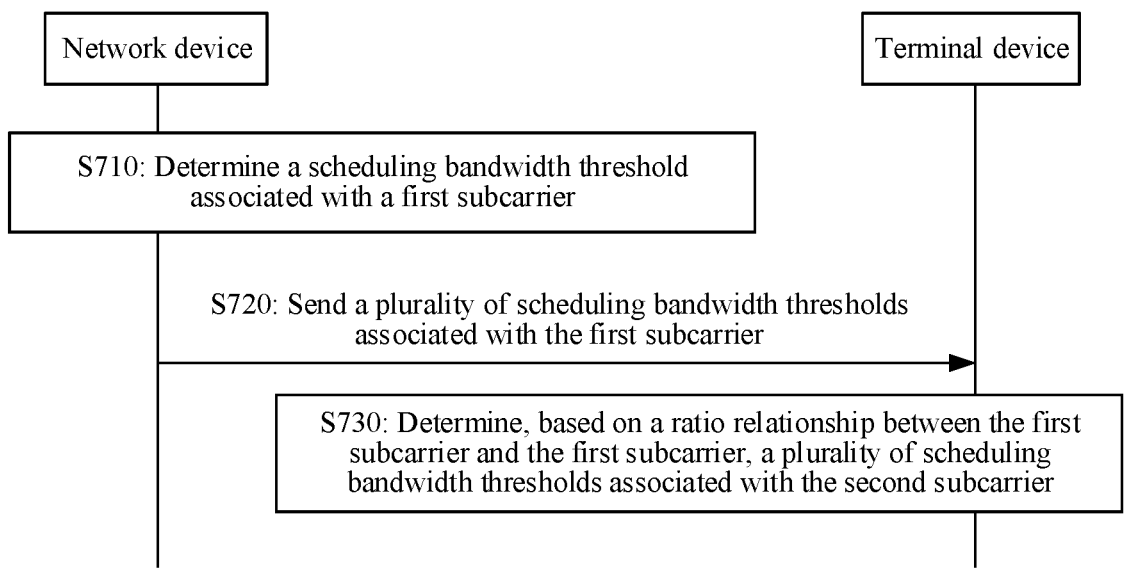
FIG. 7B is another schematic flowchart of a method for configuring a scheduling bandwidth threshold according to an embodiment of the present disclosure.

Specifically, for example, as shown in FIG. 7B, a method for configuring a scheduling bandwidth threshold by the network device includes the following steps.

S710: The network device determines at least one scheduling bandwidth threshold associated with a first subcarrier spacing.

Specifically, in the prior art, a network device needs to configure at least one scheduling bandwidth threshold for each subcarrier spacing based on different supported subcarrier spacings. For example, if the network device supports a subcarrier spacing of 60 kHz and a subcarrier spacing of 120 kHz, in this application, the network device uses the first subcarrier spacing as a default subcarrier spacing, and the network device only needs to configure the at least one scheduling bandwidth threshold associated with the first subcarrier. For example, the default subcarrier spacing is 120 kHz, and the network device determines at least one scheduling bandwidth threshold associated with 120 kHz.

In a possible design, the first subcarrier spacing is associated with two scheduling bandwidth thresholds. In the prior art, one group of scheduling bandwidth thresholds associated with the first subcarrier and configured by the network device includes three scheduling bandwidth thresholds: a first scheduling bandwidth threshold, a second scheduling bandwidth threshold, and a third scheduling bandwidth threshold. The first scheduling bandwidth threshold is a minimum value, the third scheduling bandwidth threshold is a maximum value, and the second scheduling bandwidth threshold is greater than the first scheduling bandwidth threshold and less than the third scheduling bandwidth threshold. In this application, a third scheduling bandwidth threshold is a default value, the terminal device already knows the third scheduling bandwidth threshold, and the network device only needs to configure a first scheduling bandwidth threshold and a second scheduling bandwidth threshold.

S720: The network device sends the at least one scheduling bandwidth threshold associated with the first subcarrier to the terminal device.

Specifically, the network device may send, to the terminal device by using a bit, the at least one scheduling bandwidth threshold associated with the first subcarrier spacing. When the network device supports at least one different subcarrier spacing, the network device only needs to configure at least one scheduling bandwidth threshold associated with one subcarrier spacing, without configuring one group of scheduling bandwidth thresholds for each subcarrier spacing, thereby greatly reducing configuration overheads.

S730: The terminal device determines, based on a ratio value of a second subcarrier to the first subcarrier, at least one scheduling bandwidth threshold associated with the second subcarrier.

Specifically, the terminal device determines, based on a ratio relationship between the first subcarrier spacing and the second subcarrier spacing, the at least one scheduling bandwidth threshold associated with the second subcarrier spacing. For details, refer to the descriptions of step 703. Details are not described herein again.

Figure 8A:
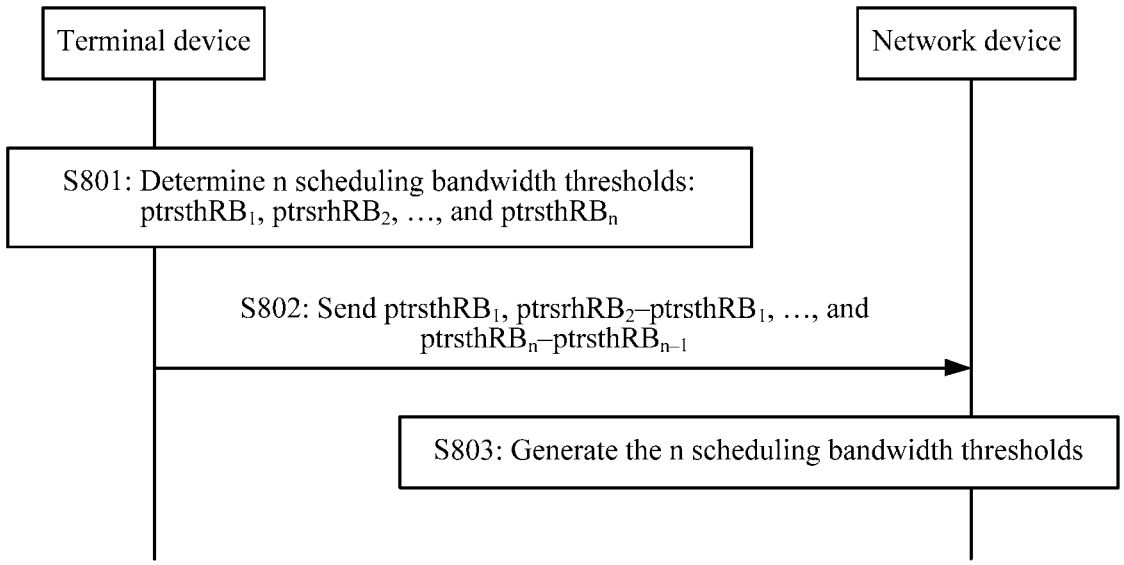
FIG. 8A is a schematic flowchart of a data reporting method according to an embodiment of the present disclosure.

FIG. 8A is a schematic flowchart of a data reporting method according to an embodiment of the present disclosure. In this embodiment of the present disclosure, the method includes the following steps.

S801: A terminal device determines n scheduling bandwidth thresholds: $ptrsthRB_1, ptrsthRB_2, \ldots,$ and $ptrsthRB_n$.

Specifically, n is an integer greater than 1, $ptrsthRB_1 < ptrsthRB_2 < \ldots < ptrsthRB_n$, each scheduling bandwidth threshold may be represented by an RB quantity, and the RB quantity is an integer greater than or equal to 1. The n scheduling bandwidth thresholds determined by the terminal device belong to all possible scheduling bandwidth thresholds of the terminal device. For ease of description, in this embodiment, all the possible scheduling bandwidth thresholds of the terminal device are referred to as a "value set", a maximum scheduling bandwidth threshold in the value set needs to be less than or equal to a specified value, and the specified value is related to a maximum valid system bandwidth and a subcarrier spacing used by the terminal device. For example, the specified value is equal to $RB\_sym/(SCS_{UE}*12)+1$, where RB_sym is the maximum valid system bandwidth; $SCS_{UE}$ represents the subcarrier spacing used by the terminal device; and 12 represents a quantity of subcarrier spacings corresponding to one RB. Assuming that the maximum valid system bandwidth is 400 M*0.96, and the subcarrier spacing used by the terminal device is 120 kHz, the specified value is 400 M*0.96/120 k/12+1=267.

For example, it is assumed that the value set is {1, 2, 3, . . . , 265, 266, 267}, n=3, and a set of three scheduling bandwidth thresholds determined by the terminal device is {10, 20, 80}.

In a possible design, n=2. In the prior art, one group of scheduling bandwidth thresholds reported by a terminal device includes three scheduling bandwidth thresholds: a first scheduling bandwidth threshold, a second scheduling bandwidth threshold, and a third scheduling bandwidth threshold. The first scheduling bandwidth threshold is a minimum value, the third scheduling bandwidth threshold is a maximum value, and the second scheduling bandwidth threshold is greater than the first scheduling bandwidth threshold and less than the third scheduling bandwidth threshold. In this embodiment of the present disclosure, two scheduling bandwidth thresholds determined by the terminal device are a first scheduling bandwidth threshold and a second scheduling bandwidth threshold, and a third scheduling bandwidth threshold is a default value. For example, for the third scheduling bandwidth threshold and a maximum bandwidth supported by the terminal device, the maximum bandwidth may be represented by an RB quantity, and the third scheduling bandwidth threshold is equal to 1 plus the maximum bandwidth supported by the terminal device.

In a possible design, when the terminal device supports a plurality of different subcarrier spacings, the terminal device reports only at least one scheduling bandwidth threshold associated with a first subcarrier spacing, thereby reducing a quantity of groups of bandwidth thresholds reported by the terminal device, and reducing reporting overheads.

In a possible implementation, in this embodiment, a method for reporting a scheduling bandwidth threshold may be performed with reference to an element use manner in FIG. 2A to FIG. 4A, to reduce a quantity of bits occupied by each scheduling bandwidth threshold, thereby further reducing reporting overheads. For a specific method, refer to the descriptions of FIG. 2A to FIG. 4A. Details are not described herein again.

S802: The terminal device sends $ptrsthRB_1$, $ptrsthRB_2-ptrsthRB_1$, . . . , and $ptrsthRB_n-ptrsthRB_{n-1}$ to a network device, and the network device receives $ptrsthRB_1$, $ptrsthRB_2-ptrsthRB_1$, . . . , and $ptrsthRB_n-ptrsthRB_{n-1}$ sent by the terminal device.

Specifically, values of n elements reported by the terminal device to the network device are $ptrsthRB_1$, $ptrsthRB_2-ptrsthRB_1$, . . . , and $ptrsthRB_n-ptrsthRB_{n-1}$, and the n elements are in a one-to-one correspondence with the n scheduling bandwidth thresholds. For example, $ptrsthRB_1$ in the n elements is used to indicate $ptrsthRB_1$ in the n scheduling bandwidth thresholds, and $ptrsthRB_2-ptrsthRB_1$ in the n elements is used to indicate $ptrsthRB_2$ in the n scheduling bandwidth thresholds. The terminal device may report the n elements to the network device by using bits.

The terminal device reports $ptrsthRB_1$ by using an existing default bit, for example, sends $ptrsthRB_1$ by using 9 default bits. For n−1 differential values: $ptrsthRB_2-ptrsthRB_1$, . . . , and $ptrsthRB_n-ptrsthRB_{n-1}$, the terminal device determines a maximum value $S_{max}$ in the n−1 differential values, the terminal device determines a quantity of bits used to send the n−1 differential values, and the bit quantity b is a minimum integer of b satisfying $S_{max} \leq 2b$.

For example, according to the example in S801, if the set of the three scheduling bandwidth thresholds determined by the terminal device is {10, 20, 80}, three elements reported by the terminal device are {10, 10, 60}. If it is determined that the quantity of bits used to send the differential values is 4, {000001010, 001010, 111100} is reported by using bits. Compared with the prior art in which 9 bits are fixedly used to report each scheduling bandwidth threshold, in this embodiment of the present disclosure, reporting overheads of the terminal device are greatly reduced.

According to the descriptions of FIG. 8A, the terminal device reports the scheduling bandwidth threshold to the network device in a differential manner. In this way, a quantity of bits occupied by the scheduling bandwidth threshold can be reduced, and reporting overheads of the terminal device can be reduced.

In another possible embodiment, when the network device sends to or configures for the terminal a scheduling bandwidth threshold related to a PTRS pattern, the network device may send to or configure for the terminal device a bandwidth threshold based on a minimum bandwidth threshold in a differential manner.

Figure 8B:
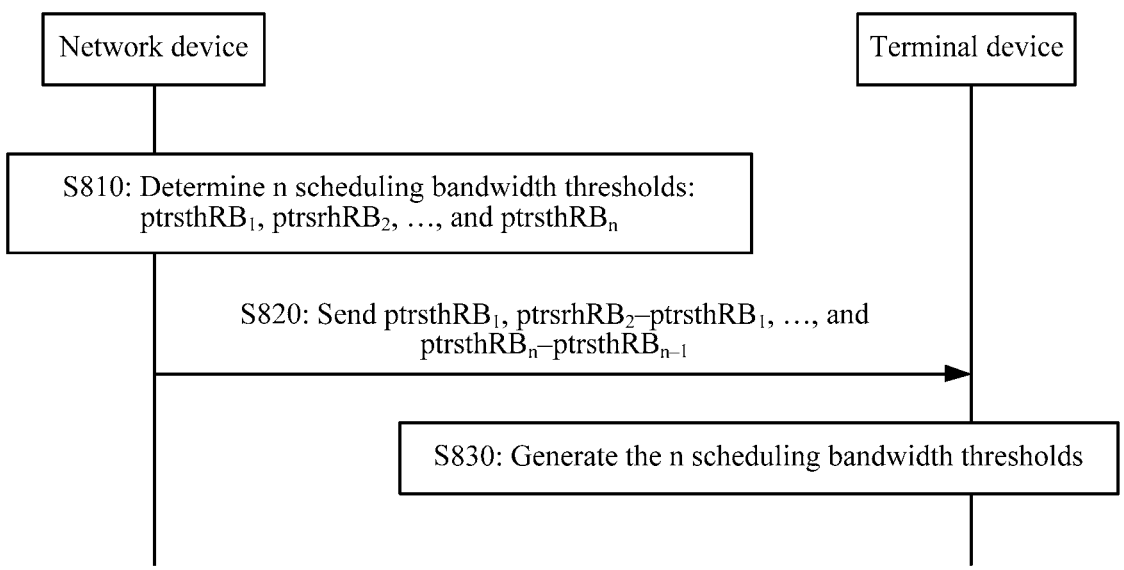
FIG. 8B is another schematic flowchart of a method for configuring a scheduling bandwidth threshold according to an embodiment of the present disclosure.

Specifically, for example, as shown in FIG. 8B, a method for configuring a scheduling bandwidth threshold by the network device includes the following steps.

S810: The network device determines n scheduling bandwidth thresholds: $ptrsthRB_1$, $ptrsthRB_2$, ..., and $ptrsthRB_n$.

Specifically, n is an integer greater than 1, $ptrsthRB_1 < ptrsthRB_2 < ... < ptrsthRB_n$, each scheduling bandwidth threshold may be represented by an RB quantity, and the RB quantity is an integer greater than or equal to 1. The n scheduling bandwidth thresholds determined by the network device belong to all possible scheduling bandwidth thresholds of the terminal device. For ease of description, in this embodiment, all the possible scheduling bandwidth thresholds of the terminal device are referred to as a "value set", a maximum scheduling bandwidth threshold in the value set needs to be less than or equal to a specified value, and the specified value is related to a maximum valid system bandwidth and a subcarrier spacing used by the terminal device. For example, the specified value is equal to $RB\_sym/(SCS_{UE}*12)+1$, where RB_sym is the maximum valid system bandwidth; $SCS_{UE}$ represents the subcarrier spacing used by the network device; and 12 represents a quantity of subcarrier spacings corresponding to one RB. Assuming that the maximum valid system bandwidth is 400 M*0.96, and the subcarrier spacing used by the network device is 120 kHz, the specified value is 400 M*0.96/120 k/12+1=267.

For example, it is assumed that the value set is {1, 2, 3, ..., 265, 266, 267}, n=3, and a set of three scheduling bandwidth thresholds determined by the network device is {10, 20, 80}.

In a possible design, n=2. In the prior art, one group of scheduling bandwidth thresholds configured by a network device includes three scheduling bandwidth thresholds: a first scheduling bandwidth threshold, a second scheduling bandwidth threshold, and a third scheduling bandwidth threshold. The first scheduling bandwidth threshold is a minimum value, the third scheduling bandwidth threshold is a maximum value, and the second scheduling bandwidth threshold is greater than the first scheduling bandwidth threshold and less than the third scheduling bandwidth threshold. In this embodiment of the present disclosure, two scheduling bandwidth thresholds determined by the network device are a first scheduling bandwidth threshold and a second scheduling bandwidth threshold, and a third scheduling bandwidth threshold is a default value. For example, for the third scheduling bandwidth threshold and a maximum bandwidth supported by the terminal device, the maximum bandwidth may be represented by an RB quantity, and the third scheduling bandwidth threshold is equal to 1 plus the maximum bandwidth supported by the terminal device.

In a possible design, when the network device supports a plurality of different subcarrier spacings, the network device configures only at least one scheduling bandwidth threshold associated with a first subcarrier spacing, thereby reducing a quantity of groups of scheduling bandwidth thresholds configured by the network device, and reducing configuration overheads.

S820: The network device sends $ptrsthRB_1$, $ptrsthRB_2 - ptrsthRB_1$, ..., and $ptrsthRB_n - ptrsthRB_{n-1}$ to the terminal device.

Specifically, values of n elements configured by the network device for the terminal device are $ptrsthRB_1$, $ptrsthRB_2 - ptrsthRB_1$, ..., and $ptrsthRB_n - ptrsthRB_{n-1}$, and the n elements are in a one-to-one correspondence with the n scheduling bandwidth thresholds. For example, $ptrsthRB_1$ in the n elements is used to indicate $ptrsthRB_1$ in the n scheduling bandwidth thresholds, and $ptrsthRB_2 - ptrsthRB_1$ in the n elements is used to indicate $ptrsthRB_2$ in the n scheduling bandwidth thresholds. The network device may configure the n elements for the terminal device by using a bit.

The network device configures $ptrsthRB_1$ by using an existing default bit, for example, sends $ptrsthRB_1$ by using 9 default bits. For n−1 differential values: $ptrsthRB_2 - ptrsthRB_1$, ..., and $ptrsthRB_n - ptrsthRB_{n-1}$, the network device determines a maximum value $S_{max}$ in the n−1 differential values, the network device determines a quantity of bits used to send the n−1 differential values, and the bit quantity b is a minimum integer of b satisfying $S_{max} \leq 2^b$.

For example, according to the example in S801, if a set of the three scheduling bandwidth thresholds determined by the network device is {10, 20, 80}, three elements configured by the network device are {10, 10, 60}. If it is determined that the quantity of bits used to send the differential values is 4, {000001010, 001010, 111100} is configured by using bits. Compared with the prior art in which 9 bits are fixedly used to configure each scheduling bandwidth threshold, in this embodiment of the present disclosure, overheads for configuring the scheduling bandwidth thresholds by the network device are greatly reduced.

Figure 9A:
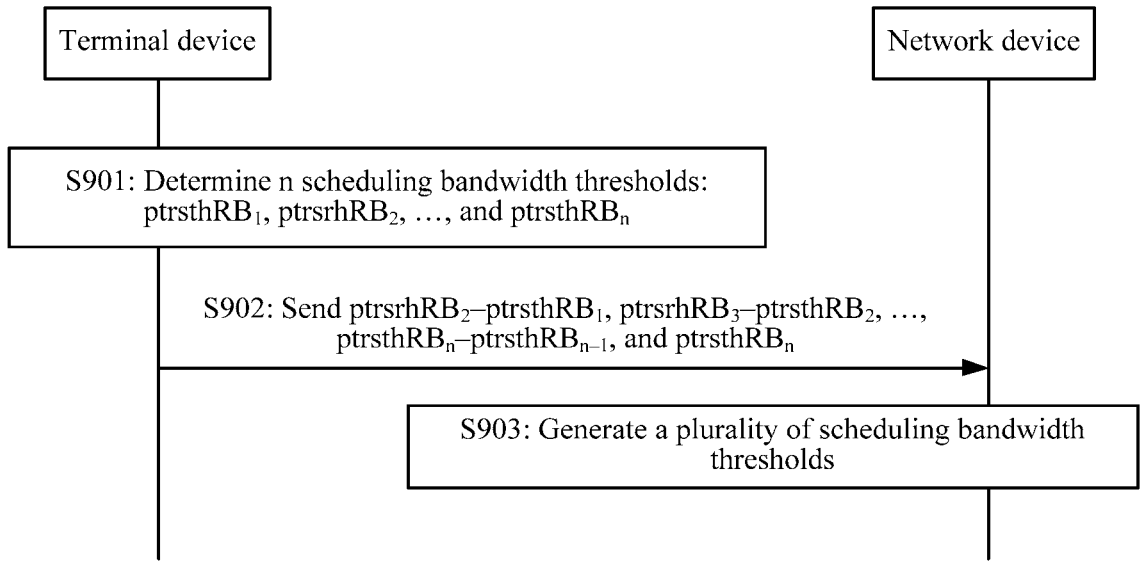
FIG. 9A is a schematic flowchart of a data reporting method according to an embodiment of the present disclosure.

FIG. 9A is a schematic flowchart of a data reporting method according to an embodiment of the present disclosure. In this embodiment of the present disclosure, the method includes the following steps.

S901: A terminal device determines n scheduling bandwidth thresholds: $ptrsthRB_1$, $ptrsthRB_2$, ..., and $ptrsthRB_n$.

Specifically, n is an integer greater than 1, $ptrsthRB_1 < ptrsthRB_2 < ... < ptrsthRB_n$, each scheduling bandwidth threshold may be represented by an RB quantity, and the RB quantity is an integer greater than or equal to 1. The n scheduling bandwidth thresholds determined by the terminal device belong to all possible scheduling bandwidth thresholds of the terminal device. For ease of description, in this embodiment, all the possible scheduling bandwidth thresholds of the terminal device are referred to as a "value set", a maximum scheduling bandwidth threshold in the value set needs to be less than or equal to a specified value, and the specified value is related to a maximum valid system bandwidth and a subcarrier spacing used by the terminal device. For example, the specified value is equal to RB_sym/($SCS_{UE}$*12)+1, where RB_sym is the maximum valid system bandwidth; $SCS_{UE}$ represents the subcarrier spacing used by the terminal device; and 12 represents a quantity of subcarrier spacings corresponding to one RB. Assuming that the maximum valid system bandwidth is 400 M*0.96, and the subcarrier spacing used by the terminal device is 120 kHz, the specified value is 400 M*0.96/120 k/12+1=267, or the specified value is a value satisfying another condition.

For example, it is assumed that the value set is {1, 2, 3, . . . , 265, 266, 267}, n=3, and a set of three scheduling bandwidth thresholds determined by the terminal device is {50, 60, 70}.

S902: The terminal device sends ptrsthRB$_2$–ptrsthRB$_1$, ptrsthRB$_3$–ptrsthRB$_2$, . . . , ptrsthRB$_n$–ptrsthRB$_{n-1}$, and ptrsthRB$_n$ to a network device.

Specifically, values of n elements reported by the terminal device to the network device are ptrsthRB$_1$, ptrsthRB$_2$–ptrsthRB$_1$, . . . , and ptrsthRB$_n$–ptrsthRB$_{n-1}$, and the n elements are in a one-to-one correspondence with the n scheduling bandwidth thresholds. For example, ptrsthRB$_2$–ptrsthRB$_1$ in the n elements is used to indicate ptrsthRB$_1$ in the n scheduling bandwidth thresholds, and ptrsthRB$_3$–ptrsthRB$_2$ in the n elements is used to indicate ptrsthRB$_2$ in then scheduling bandwidth thresholds. The terminal device may report the n elements to the network device by using bits.

The terminal device reports ptrsthRB$_n$ by using an existing default bit position, for example, sends ptrsthRB$_n$ by using 9 default bits. For n–1 differential values: ptrsthRB$_2$–ptrsthRB$_1$, . . . , and ptrsthRB$_n$–ptrsthRB$_{n-1}$, the terminal device determines a maximum value $S_{max}$ in the n–1 differential values, the terminal device determines a quantity of bits used to send the n–1 differential values, and the bit quantity b is a minimum integer of b satisfying $S_{max} \leq 2^b$.

For example, according to the example in S901, if the set of the three scheduling bandwidth thresholds determined by the terminal device is {50, 60, 70}, three elements reported by the terminal device are {10, 10, 70}. When a difference range is limited within 16 (b=4), {1010, 1010, 001000110} is reported by using bits. Compared with the prior art in which 9 bits are fixedly used to report each scheduling bandwidth threshold, in this embodiment of the present disclosure, reporting overheads of the terminal device are greatly reduced.

According to the descriptions of FIG. 9A, the terminal device reports the scheduling bandwidth threshold to the network device in a differential manner. In this way, a quantity of bits occupied by the scheduling bandwidth threshold can be reduced, and reporting overheads of the terminal device can be reduced.

In another possible embodiment, when the network device sends to or configures for the terminal a scheduling bandwidth threshold related to a PTRS pattern, the network device may send to or configure for the terminal device a bandwidth threshold based on a maximum bandwidth threshold in a differential manner.

Figure 9B:
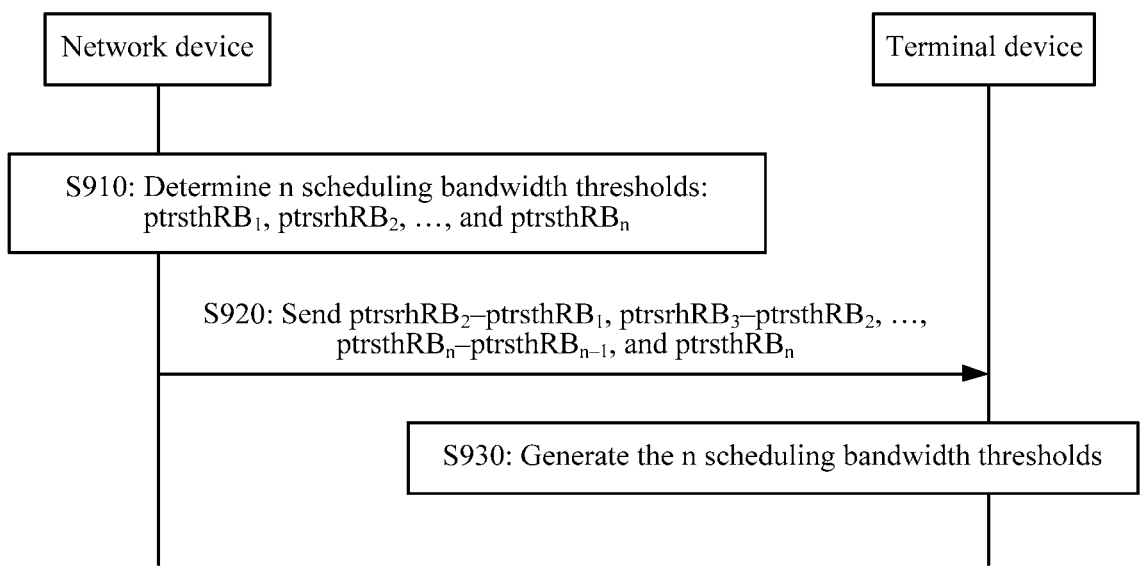
FIG. 9B is another schematic flowchart of a method for configuring a scheduling bandwidth threshold according to an embodiment of the present disclosure.

Specifically, for example, as shown in FIG. 9B, a method for configuring a scheduling bandwidth threshold by the network device includes the following steps.

S910: The network device determines n scheduling bandwidth thresholds: ptrsthRB$_1$, ptrsthRB$_2$, . . . , and ptrsthRB$_n$.

Specifically, n is an integer greater than 1, ptrsthRB$_1$<ptrsthRB$_2$< . . . <ptrsthRB$_n$, each scheduling bandwidth threshold may be represented by an RB quantity, and the RB quantity is an integer greater than or equal to 1. The n scheduling bandwidth thresholds determined by the network device belong to all possible scheduling bandwidth thresholds of the terminal device. For ease of description, in this embodiment, all the possible scheduling bandwidth thresholds of the terminal device are referred to as a "value set", a maximum scheduling bandwidth threshold in the value set needs to be less than or equal to a specified value, and the specified value is related to a maximum valid system bandwidth and a subcarrier spacing used by the terminal device. For example, the specified value is equal to RB_sym/($SCS_{UE}$*12)+1, where RB_sym is the maximum valid system bandwidth; $SCS_{UE}$ represents the subcarrier spacing used by the network device; and 12 represents a quantity of subcarrier spacings corresponding to one RB. Assuming that the maximum valid system bandwidth is 400 M*0.96, and the subcarrier spacing used by the network device is 120 kHz, the specified value is 400 M*0.96/120 k/12+1=267, or the specified value is a value satisfying another condition.

For example, it is assumed that the value set is {1, 2, 3, . . . , 265, 266, 267}, n=3, and a set of three scheduling bandwidth thresholds determined by the network device is {50, 60, 70}.

S920: The network device sends ptrsthRB$_2$–ptrsthRB$_1$, ptrsthRB$_3$–ptrsthRB$_2$, . . . , ptrsthRB$_n$–ptrsthRB$_{n-1}$, and ptrsthRB$_n$ to the terminal device.

Specifically, values of n elements configured by the network device for the terminal device are ptrsthRB$_1$, ptrsthRB$_2$–ptrsthRB$_1$, . . . , and ptrsthRB$_n$–ptrsthRB$_{n-1}$, and the n elements are in a one-to-one correspondence with the n scheduling bandwidth thresholds. For example, ptrsthRB$_2$–ptrsthRB$_1$ in the n elements is used to indicate ptrsthRB$_1$ in the n scheduling bandwidth thresholds, and ptrsthRB$_3$–ptrsthRB$_2$ in the n elements is used to indicate ptrsthRB$_2$ in the n scheduling bandwidth thresholds. The network device may configure the n elements for the terminal device by using bits.

The network device configures ptrsthRB$_n$ by using an existing default bit, for example, sends ptrsthRB$_n$ by using 9 default bits. For n–1 differential values: ptrsthRB$_2$–ptrsthRB$_1$, . . . , and ptrsthRB$_n$–ptrsthRB$_{n-1}$, the network device determines a maximum value ptrsthRB$_{max}$ in the n–1 differential values, the network device determines a quantity of bits used to send the n–1 differential values, and the bit quantity b is a minimum integer of b satisfying $S_{max} \leq 2^b$.

For example, according to the example in S910, if the set of the three scheduling bandwidth thresholds determined by the network device is {50, 60, 70}, three elements configured by the network device are {10, 10, 70}. When a difference range is limited within 16 (b=4), {1010, 1010, 001000110} is configured by using bits. Compared with the prior art in which 9 bits are fixedly used to configure each scheduling bandwidth threshold, in this embodiment of the present disclosure, overheads for configuring the scheduling bandwidth thresholds by the network device are greatly reduced.

Figure 10A:
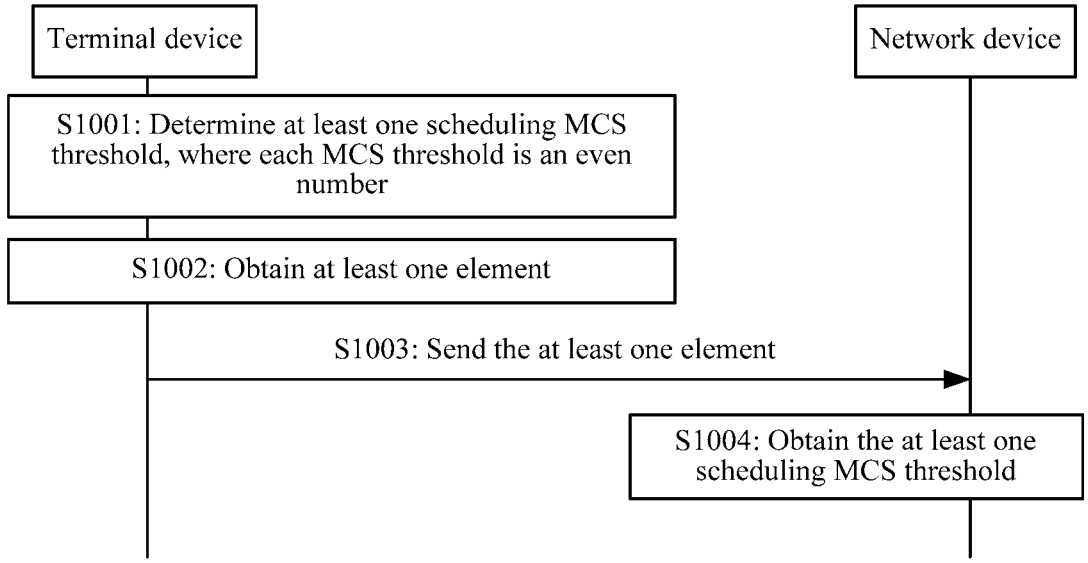
FIG. 10A is a schematic flowchart of a data reporting method according to an embodiment of the present disclosure.

FIG. 10A is a schematic flowchart of a data reporting method according to an embodiment of the present disclosure. In this embodiment of the present disclosure, the method includes the following steps.

S1001: A terminal device determines at least one scheduling MCS threshold.

Specifically, the at least one scheduling MCS threshold includes a first scheduling MCS threshold and a second scheduling MCS threshold, each scheduling MCS threshold may be represented by an MCS index value, and the MCS index value is an integer greater than or equal to 0. The at least one MCS threshold determined by the terminal device belongs to all possible scheduling MCS thresholds of the terminal device. For ease of description, in this embodiment, all the possible scheduling MCS thresholds of the terminal device are referred to as a "value set", and a maximum scheduling MCS threshold in the value set needs to be less than or equal to a specified value. For example, in NR, the specified value may be 31 or 32.

Each of the at least one scheduling MCS threshold determined by the terminal device is an even number, that is, each scheduling MCS threshold in the value set is an even number, and the terminal device determines at least one different scheduling MCS threshold in the value set.

For example, if the specified value is 32, the scheduling MCS thresholds in the value set are {2, 4, 6, 8, . . . , 26, 28, 30, 32}, and four scheduling MCS thresholds determined by the terminal device in the value set are {4, 8, 16, 18}.

In a possible implementation, each scheduling MCS threshold may be greater than a preset value, that is, each scheduling MCS threshold in the value set is greater than the preset value and is an even number.

For example, if the specified value is 32, and the preset value is 20, the scheduling MCS thresholds in the value set are {22, 24, 26, 28, 30, 32}.

S1002: The terminal device obtains at least one element.

Specifically, the at least one element is in a one-to-one correspondence with the at least one scheduling MCS threshold, and each element is used to indicate one scheduling MCS threshold. For example, a first element in the at least one element indicates a first scheduling MCS threshold in the at least one scheduling MCS threshold, and a second element in the at least one element is used to indicate a second scheduling MCS threshold in the at least one scheduling MCS threshold. All the scheduling MCS thresholds in the value set are numbered, and an element is a number of a scheduling MCS threshold. A numbering rule for the scheduling MCS thresholds in the value set may be that numbering is performed in ascending order starting from 1 by using a step of 1, and a number increases as a scheduling MCS threshold increases; or numbering is performed in ascending order starting from 0, and a number increases as a scheduling MCS threshold increases; or numbering is performed in descending order starting from a quantity of the scheduling MCS thresholds in the value set by using a step of 1, and a number decreases as a scheduling MCS threshold increases; or another numbering manner is used. This is not limited in this embodiment. The terminal device prestores or preconfigures mapping relationships between all the possible scheduling MCS thresholds and elements, and the terminal device generates the at least one element based on the mapping relationships. The mapping relationships may be expressed by using a mapping table or a formula.

For example, the mapping relationships prestored or preconfigured by the terminal device are listed in the following Table 13:

TABLE 13

| Scheduling MCS threshold | Element value |
| --- | --- |
| 2 | 0 |
| 4 | 1 |
| 6 | 2 |
| 8 | 3 |
| 10 | 4 |
| 12 | 5 |
| 14 | 6 |

TABLE 13-continued

| Scheduling MCS threshold | Element value |
| --- | --- |
| 16 | 7 |
| 18 | 8 |

Assuming that the four scheduling MCS thresholds determined by the terminal device are {4, 8, 16, 18}, four elements generated by the terminal device based on the mapping relationships in the foregoing table are {1, 3, 7, 8}.

In a possible implementation, a value of each of the at least one element is ½ of the corresponding scheduling MCS threshold. For example, a value of the first element is ½ of the first scheduling MCS threshold, and a value of the second element is ½ of the second scheduling MCS threshold.

S1003: The terminal device sends the at least one element to a network device, and the network device receives the at least one element from the terminal device.

Specifically, the terminal device sends the at least one element to the network device by using a bit, and the terminal device determines, based on the quantity of the scheduling MCS thresholds in the value set, a quantity of bits used to send each element. The bit quantity is a minimum integer of b satisfying $S \leq 2^b$, where S is the quantity of the scheduling MCS thresholds in the value set, and b is the bit quantity. For example, the quantity of the scheduling MCS thresholds in the value set is 9. According to the foregoing formula, b=4, and the terminal device uses 4 bits to represent each element. For example, the four generated elements are 1, 3, 7, and 8, three elements sent by the terminal device are respectively 0001, 0011, and 1000, and a total of 12 bits are required. Compared with the prior art in which 5 bits are fixedly used to report each scheduling MCS threshold, in this embodiment of the present disclosure, overheads for reporting the scheduling MCS thresholds by the terminal device are greatly reduced.

S1004: The network device obtains the at least one scheduling MCS threshold.

Specifically, the network device prestores or preconfigures the mapping relationships between the scheduling MCS thresholds in the value set and the elements. The mapping relationships may be expressed by using a mapping table or a formula. The network device generates the at least one scheduling MCS threshold based on the received element and the mapping relationships. This process may be an inverse process of S1002. For details, refer to the descriptions of S1002. Details are not described herein again.

In a possible implementation, the network device multiplies the at least one received element by 2 to generate the at least one scheduling MCS threshold.

In the method described in FIG. 10A, the scheduling MCS threshold determined by the terminal device is an even number, and the terminal device reports, to the network device, the element associated with the scheduling MCS threshold, thereby reducing a quantity of bits required for reporting by the terminal device, and reducing reporting overheads.

In another possible embodiment, when the network device sends to or configures for the terminal an MCS threshold related to a PTRS pattern, the network device may send to or configure for the terminal device an element associated with the MCS threshold, where the MCS threshold is an even number.

Figure 10B:
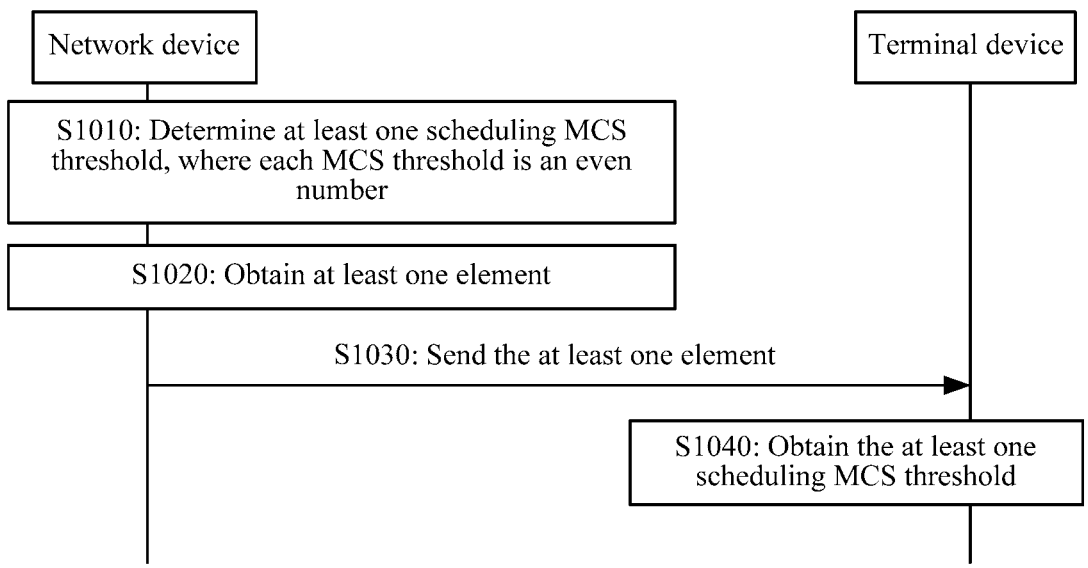
FIG. 10B is another schematic flowchart of a method for configuring a scheduling bandwidth threshold according to an embodiment of the present disclosure.

Specifically, for example, as shown in FIG. 10B, a method for configuring a scheduling MCS threshold by the network device includes the following steps.

S1010: The network device determines at least one scheduling MCS threshold.

Specifically, the at least one scheduling MCS threshold includes a first scheduling MCS threshold and a second scheduling MCS threshold, each scheduling MCS threshold may be represented by an MCS index value, and the MCS index value is an integer greater than or equal to 0. The at least one MCS threshold determined by the network device belongs to all possible scheduling MCS thresholds of the terminal device. For ease of description, in this embodiment, all the possible scheduling MCS thresholds of the terminal device are referred to as a "value set", and a maximum scheduling MCS threshold in the value set needs to be less than or equal to a specified value. For example, in NR, the specified value may be 31 or 32.

Each of the at least one scheduling MCS threshold determined by the network device is an even number, that is, each scheduling MCS threshold in the value set is an even number, and the network device determines at least one different scheduling MCS threshold in the value set.

For example, if the specified value is 32, the scheduling MCS thresholds in the value set are {2, 4, 6, 8, . . . , 26, 28, 30, 32}, and four scheduling MCS thresholds determined by the network device in the value set are {4, 8, 16, 18}.

In a possible implementation, each scheduling MCS threshold may be greater than a preset value, that is, each scheduling MCS threshold in the value set is greater than the preset value and is an even number.

For example, if the specified value is 32, and the preset value is 20, the scheduling MCS thresholds in the value set are {22, 24, 26, 28, 30, 32}.

S1020: The network device obtains at least one element.

Specifically, the at least one element is in a one-to-one correspondence with the at least one scheduling MCS threshold, and each element is used to indicate one scheduling MCS threshold. For example, a first element in the at least one element indicates a first scheduling MCS threshold in the at least one scheduling MCS threshold, and a second element in the at least one element is used to indicate a second scheduling MCS threshold in the at least one scheduling MCS threshold. All the scheduling MCS thresholds in the value set are numbered, and an element is a number of a scheduling MCS threshold. A numbering rule for the scheduling MCS thresholds in the value set may be that numbering is performed in ascending order starting from 1 by using a step of 1, and a number increases as a scheduling MCS threshold increases; or numbering is performed in ascending order starting from 0, and a number increases as a scheduling MCS threshold increases; or numbering is performed in descending order starting from a quantity of the scheduling MCS thresholds in the value set by using a step of 1, and a number decreases as a scheduling MCS threshold increases; or another numbering manner is used. This is not limited in this embodiment. The network device prestores or preconfigures mapping relationships between all the possible scheduling MCS thresholds and elements, and the network device generates the at least one element based on the mapping relationships. The mapping relationships may be expressed by using a mapping table or a formula.

For example, the mapping relationships prestored or preconfigured by the network device are listed in the following Table 14:

TABLE 14

| Scheduling MCS threshold | Element value |
|---|---|
| 2 | 0 |
| 4 | 1 |
| 6 | 2 |
| 8 | 3 |
| 10 | 4 |
| 12 | 5 |
| 14 | 6 |
| 16 | 7 |
| 18 | 8 |

Assuming that the four scheduling MCS thresholds determined by the network device are {4, 8, 16, 18}, four elements generated by the network device based on the mapping relationships in the foregoing table are {1, 3, 7, 8}.

In a possible implementation, a value of each of the at least one element is ½ of the corresponding scheduling MCS threshold. For example, a value of the first element is ½ of the first scheduling MCS threshold, and a value of the second element is ½ of the second scheduling MCS threshold.

S1030: The network device sends the at least one element to the terminal device.

Specifically, the network device sends the at least one element to the terminal device by using a bit, and the network device determines, based on the quantity of the scheduling MCS thresholds in the value set, a quantity of bits used to send each element. The bit quantity is a minimum integer of b satisfying $S \leq 2^b$, where S is the quantity of the scheduling MCS thresholds in the value set, and b is the bit quantity. For example, the quantity of the scheduling bandwidth thresholds in the value set is 9. According to the foregoing formula, b=4, and the network device uses 4 bits to represent each element. For example, the four generated elements are 1, 3, 7, and 8, three elements sent by the network device are respectively 0001, 0011, and 1000, and a total of 12 bits are required. Compared with the prior art in which 5 bits are fixedly used to configure each scheduling MCS threshold, in this embodiment of the present disclosure, overheads for configuring the scheduling MCS thresholds by the network device are greatly reduced.

S1040: The network device obtains the at least one scheduling MCS threshold.

Specifically, the network device prestores or preconfigures the mapping relationships between the scheduling MCS thresholds in the value set and the elements. The mapping relationships may be expressed by using a mapping table or a formula. The network device generates the at least one scheduling MCS threshold based on the received element and the mapping relationships. This process is an inverse process of S1020. For details, refer to the descriptions of S1020. Details are not described herein again.

Figure 11A:
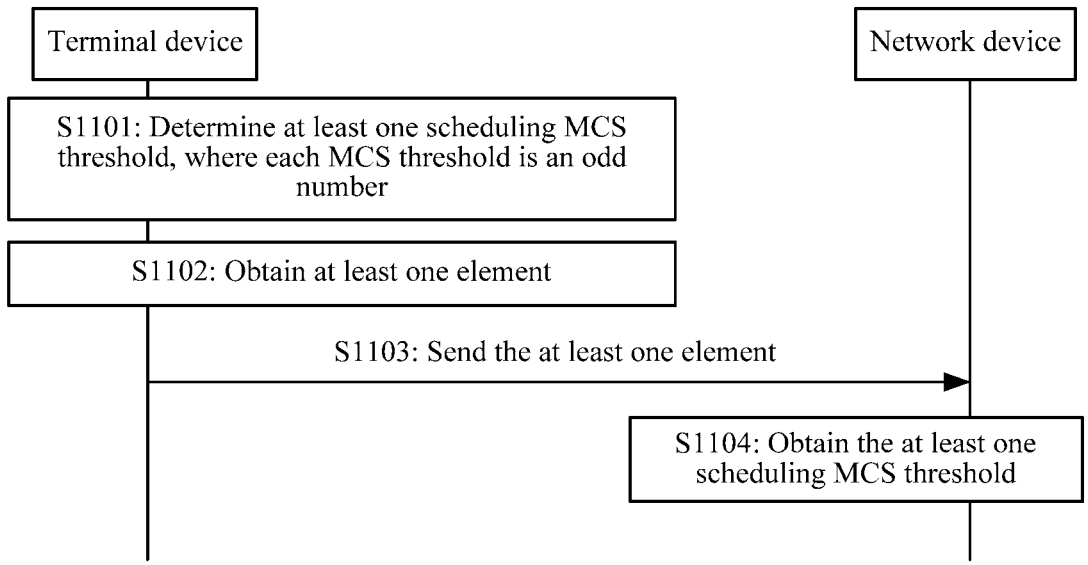
FIG. 11A is a schematic flowchart of a data reporting method according to an embodiment of the present disclosure.

FIG. 11A is a schematic flowchart of a data reporting method according to an embodiment of the present disclosure. In this embodiment of the present disclosure, the method includes the following steps.

S1101: A terminal device determines at least one scheduling MCS threshold.

Specifically, the at least one scheduling MCS threshold includes a first scheduling MCS threshold and a second scheduling MCS threshold, each scheduling MCS threshold may be represented by an MCS index value, and the MCS index value is an integer greater than or equal to 0. The at least one MCS threshold determined by the terminal device belongs to all possible scheduling MCS thresholds of the terminal device. For ease of description, in this embodiment, all the possible scheduling MCS thresholds of the terminal device are referred to as a "value set", and a maximum scheduling MCS threshold in the value set needs to be less than or equal to a specified value. For example, in NR, the specified value may be 31.

Each of the at least one scheduling MCS threshold determined by the terminal device is an odd number, that is, each scheduling MCS threshold in the value set is an odd number, and the terminal device determines at least one different scheduling MCS threshold in the value set.

For example, if the specified value is 31, the scheduling MCS thresholds in the value set are {1, 3, 5, 7, . . . , 27, 29, 31}, and four scheduling MCS thresholds determined by the terminal device in the value set are {5, 9, 17, 19}.

In a possible implementation, each scheduling MCS threshold may be greater than a preset value, that is, each scheduling MCS threshold in the value set is greater than the preset value and is an odd number.

For example, if the specified value is 31, and the preset value is 20, the scheduling MCS thresholds in the value set are {21, 23, 25, 27, 29, 31}.

S1102: The terminal device obtains at least one element.

Specifically, the at least one element is in a one-to-one correspondence with the at least one scheduling MCS threshold, and each element is used to indicate one scheduling MCS threshold. For example, a first element in the at least one element indicates a first scheduling MCS threshold in the at least one scheduling MCS threshold, and a second element in the at least one element is used to indicate a second scheduling MCS threshold in the at least one scheduling MCS threshold. All the scheduling MCS thresholds in the value set are numbered, and an element is a number of a scheduling MCS threshold. A numbering rule for the scheduling MCS thresholds in the value set may be that numbering is performed in ascending order starting from 1 by using a step of 1, and a number increases as a scheduling MCS threshold increases; or numbering is performed in ascending order starting from 0, and a number increases as a scheduling MCS threshold increases; or numbering is performed in descending order starting from a quantity of the scheduling MCS thresholds in the value set by using a step of 1, and a number decreases as a scheduling MCS threshold increases; or another numbering manner is used. This is not limited in this embodiment. The terminal device prestores or preconfigures mapping relationships between all the possible scheduling MCS thresholds and elements, and the terminal device obtains the at least one element based on the mapping relationships. The mapping relationships may be expressed by using a mapping table or a formula.

For example, the mapping relationships prestored or preconfigured by the terminal device are listed in the following Table 15:

TABLE 15

| Scheduling MCS threshold | Element value |
|---|---|
| 1 | 0 |
| 3 | 1 |
| 5 | 2 |
| 7 | 3 |
| 9 | 4 |
| 11 | 5 |
| 13 | 6 |
| 15 | 7 |
| 17 | 8 |

Assuming that the four scheduling MCS thresholds determined by the terminal device are {3, 7, 15, 17}, four elements generated by the terminal device based on the mapping relationships in the foregoing table are {1, 3, 7, 8}.

S1103: The terminal device sends the at least one element to a network device, and the network device receives the at least one element from the terminal device.

Specifically, the terminal device sends the at least one element to the network device by using a bit, and the terminal device determines, based on the quantity of the scheduling MCS thresholds in the value set, a quantity of bits used to send each element. The bit quantity is a minimum integer of b satisfying $S \leq 2^b$, where S is the quantity of the scheduling MCS thresholds in the value set, and b is the bit quantity. For example, the quantity of the scheduling bandwidth thresholds in the value set is 9. According to the foregoing formula, b=4, and the terminal device uses 4 bits to represent each element. For example, if the four generated elements are 1, 3, 7, and 8, four elements sent by the terminal device are respectively 0001, 0011, 0111, and 1000, and a total of 16 bits are required. Compared with the prior art in which 5 bits are fixedly used to report each scheduling MCS threshold, in this embodiment of the present disclosure, overheads for reporting the scheduling MCS thresholds by the terminal device are greatly reduced.

S1104: The network device obtains the at least one scheduling MCS threshold.

Specifically, the network device prestores or preconfigures the mapping relationships between the scheduling MCS thresholds in the value set and the elements. The mapping relationships may be expressed by using a mapping table or a formula. The network device generates the at least one scheduling MCS threshold based on the received element and the mapping relationships. This process may be an inverse process of S1002. For details, refer to the descriptions of S1002. Details are not described herein again.

In the method described in FIG. 11A, the scheduling MCS threshold determined by the terminal device is an odd number, and the terminal device reports, to the network device, the element associated with the scheduling MCS threshold, thereby reducing a quantity of bits required for reporting by the terminal device, and reducing reporting overheads.

In another possible embodiment, when the network device sends to or configures for the terminal an MCS threshold related to a PTRS pattern, the network device may send to or configure for the terminal device an element associated with the MCS threshold, where the MCS threshold is an odd number.

Figure 11B:
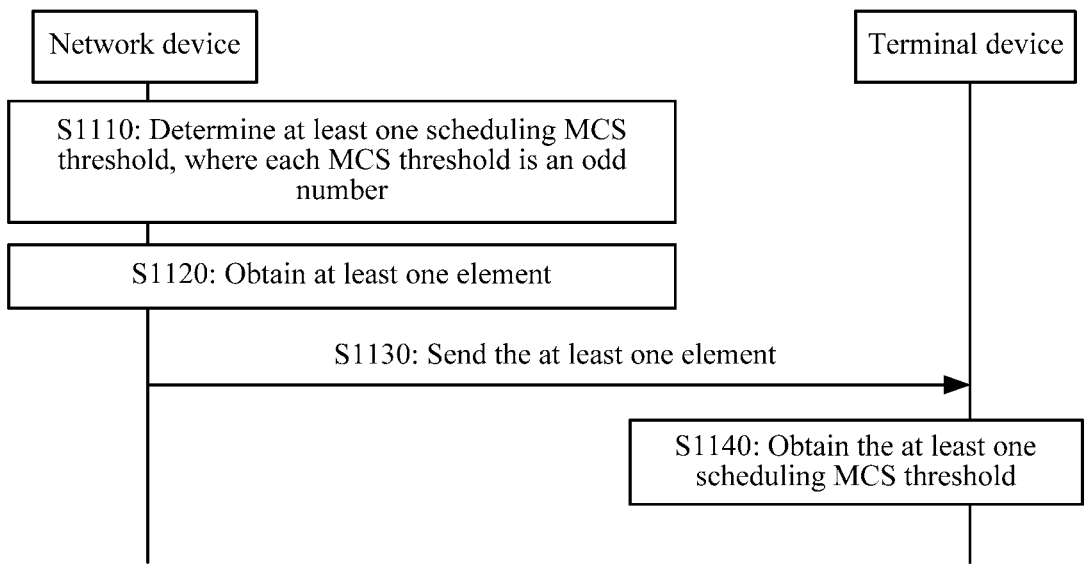
FIG. 11B is another schematic flowchart of a method for configuring a scheduling bandwidth threshold according to an embodiment of the present disclosure.

Specifically, for example, as shown in FIG. 11B, a method for configuring an MCS threshold by the network device includes the following steps.

S1110: The network device determines at least one scheduling MCS threshold.

Specifically, the at least one scheduling MCS threshold includes a first scheduling MCS threshold and a second scheduling MCS threshold, each scheduling MCS threshold may be represented by an MCS index value, and the MCS index value is an integer greater than or equal to 0. The at least one MCS threshold determined by the network device belongs to all possible scheduling MCS thresholds of the terminal device. For ease of description, in this embodiment, all the possible scheduling MCS thresholds of the terminal device are referred to as a "value set", and a maximum scheduling MCS threshold in the value set needs to be less than or equal to a specified value. For example, in NR, the specified value may be 31.

Each of the at least one scheduling MCS threshold determined by the network device is an odd number, that is, each scheduling MCS threshold in the value set is an odd number, and the network device determines at least one different scheduling MCS threshold in the value set.

For example, if the specified value is 31, the scheduling MCS thresholds in the value set are {1, 3, 5, 7, . . . , 27, 29, 31}, and four scheduling MCS thresholds determined by the network device in the value set are {5, 9, 17, 19}.

In a possible implementation, each scheduling MCS threshold may be greater than a preset value, that is, each scheduling MCS threshold in the value set is greater than the preset value and is an even number.

For example, if the specified value is 31, and the preset value is 20, the scheduling MCS thresholds in the value set are {21, 23, 25, 27, 29, 31}.

S1120: The network device obtains at least one element.

Specifically, the at least one element is in a one-to-one correspondence with the at least one scheduling MCS threshold, and each element is used to indicate one scheduling MCS threshold. For example, a first element in the at least one element indicates a first scheduling MCS threshold in the at least one scheduling MCS threshold, and a second element in the at least one element is used to indicate a second scheduling MCS threshold in the at least one scheduling MCS threshold. All the scheduling MCS thresholds in the value set are numbered, and an element is a number of a scheduling MCS threshold. A numbering rule for the scheduling MCS thresholds in the value set may be that numbering is performed in ascending order starting from 1 by using a step of 1, and a number increases as a scheduling MCS threshold increases; or numbering is performed in ascending order starting from 0, and a number increases as a scheduling MCS threshold increases; or numbering is performed in descending order starting from a quantity of the scheduling MCS thresholds in the value set by using a step of 1, and a number decreases as a scheduling MCS threshold increases; or another numbering manner is used. This is not limited in this embodiment. The network device prestores or preconfigures mapping relationships between all the possible scheduling MCS thresholds and elements, and the network device obtains the at least one element based on the mapping relationships. The mapping relationships may be expressed by using a mapping table or a formula.

For example, the mapping relationships prestored or preconfigured by the network device are listed in the following Table 16:

TABLE 16

| Scheduling MCS threshold | Element value |
| --- | --- |
| 1 | 0 |
| 3 | 1 |
| 5 | 2 |
| 7 | 3 |
| 9 | 4 |
| 11 | 5 |
| 13 | 6 |
| 15 | 7 |
| 17 | 8 |

Assuming that the four scheduling MCS thresholds determined by the network device are {3, 7, 15, 17}, four elements generated by the network device based on the mapping relationships in the foregoing table are {1, 3, 7, 8}.

S1130: The network device sends the at least one element to the terminal device.

Specifically, the network device sends the at least one element to the terminal device by using a bit, and the network device determines, based on the quantity of the scheduling MCS thresholds in the value set, a quantity of bits used to send each element. The bit quantity is a minimum integer of b satisfying $S \leq 2^b$, where S is the quantity of the scheduling MCS thresholds in the value set, and b is the bit quantity. For example, the quantity of the scheduling bandwidth thresholds in the value set is 9. According to the foregoing formula, b=4, and the network device uses 4 bits to represent each element. For example, if the four generated elements are 1, 3, 7, and 8, four elements sent by the network device are respectively 0001, 0011, 0111, and 1000, and a total of 16 bits are required. Compared with the prior art in which 5 bits are fixedly used to configure each scheduling MCS threshold, in this embodiment of the present disclosure, overheads for configuring the scheduling MCS thresholds by the network device are greatly reduced.

S1140: The terminal device obtains the at least one scheduling MCS threshold.

Specifically, the terminal device prestores or preconfigures the mapping relationships between the scheduling MCS thresholds in the value set and the elements. The mapping relationships may be expressed by using a mapping table or a formula. The terminal device obtains the at least one scheduling MCS threshold based on the received element and the mapping relationships.

Figure 12A:
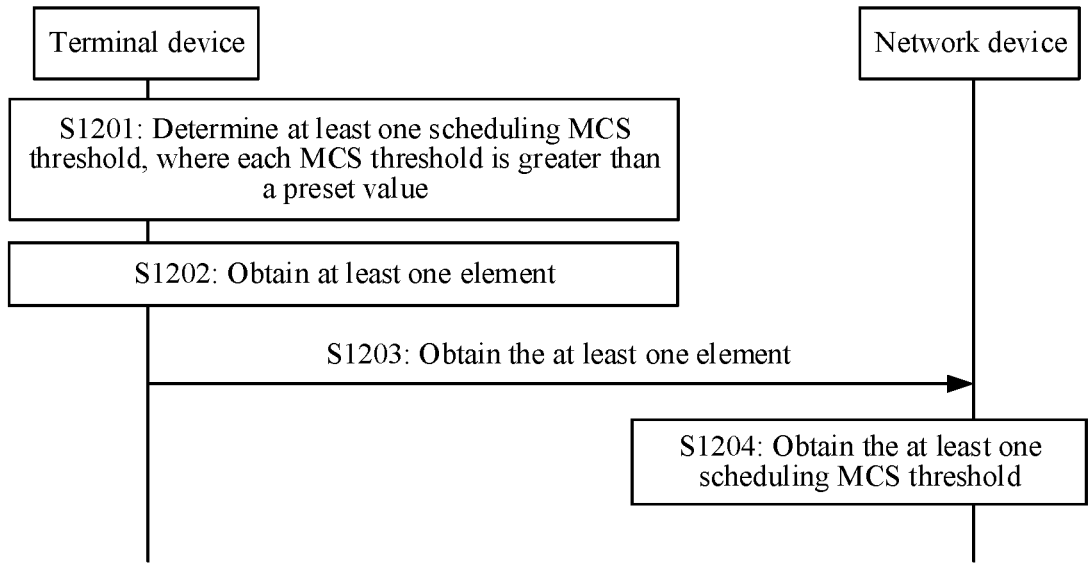
FIG. 12A is a schematic flowchart of a data reporting method according to an embodiment of the present disclosure.

FIG. 12A is a schematic flowchart of a data reporting method according to an embodiment of the present disclosure. In this embodiment of the present disclosure, the method includes the following steps.

S1201: A terminal device determines at least one scheduling MCS threshold.

Specifically, the at least one scheduling MCS threshold includes a first scheduling MCS threshold and a second scheduling MCS threshold, each scheduling MCS threshold may be represented by an MCS index value, and the MCS index value is an integer greater than or equal to 0. The at least one MCS threshold determined by the terminal device belongs to all possible scheduling MCS thresholds of the terminal device. For ease of description, in this embodiment, all the possible scheduling MCS thresholds of the terminal device are referred to as a "value set", and a maximum scheduling MCS threshold in the value set needs to be less than or equal to a specified value. For example, in NR, the specified value is 31.

Each of the at least one scheduling MCS threshold determined by the terminal device is greater than a preset value, that is, each scheduling MCS threshold in the value set is an even number, and the terminal device determines at least one different scheduling MCS threshold in the value set.

For example, if the specified value is 31, and the preset value is 23, the scheduling MCS thresholds in the value set are {24, 25, 26, 27, 28, 29, 30, 31}, and four scheduling MCS thresholds determined by the terminal device in the value set are {24, 25, 28, 30}.

In a possible implementation, each scheduling MCS threshold is an odd number.

In a possible implementation, each MCS threshold is an even number.

S1202: The terminal device obtains at least one element.

Specifically, the at least one element is in a one-to-one correspondence with the at least one scheduling MCS threshold, and each element is used to indicate one scheduling MCS threshold. For example, a first element in the at least one element indicates a first scheduling MCS threshold in the at least one scheduling MCS threshold, and a second element in the at least one element is used to indicate a second scheduling MCS threshold in the at least one scheduling MCS threshold. All the scheduling MCS thresholds in the value set are numbered, and an element is a number of a scheduling MCS threshold. A numbering rule for the scheduling MCS thresholds in the value set may be that numbering is performed in ascending order starting from 1 by using a step of 1, and a number increases as a scheduling MCS threshold increases; or numbering is performed in ascending order starting from 0, and a number increases as a scheduling MCS threshold increases; or numbering is performed in descending order starting from a quantity of the scheduling MCS thresholds in the value set by using a step of 1, and a number decreases as a scheduling MCS threshold increases; or another numbering manner is used. This is not limited in this embodiment. The terminal device prestores or preconfigures mapping relationships between all the possible scheduling MCS thresholds and elements, and the terminal device obtains the at least one element based on the mapping relationships. The mapping relationships may be expressed by using a mapping table or a formula.

For example, the mapping relationships prestored or preconfigured by the terminal device are listed in the following Table 17:

TABLE 17

| Scheduling MCS threshold | Element value |
|---|---|
| 24 | 0 |
| 25 | 1 |
| 26 | 2 |
| 27 | 3 |
| 28 | 4 |
| 29 | 5 |
| 30 | 6 |
| 31 | 7 |

Assuming that the four scheduling MCS thresholds determined by the terminal device are {24, 25, 28, 30}, four elements generated by the terminal device based on the mapping relationships in the foregoing table are {0, 1, 4, 6}.

S1203: The terminal device sends the at least one element to a network device, and the network device receives the at least one element from the terminal device.

Specifically, the terminal device sends the at least one element to the network device by using a bit, and the terminal device determines, based on the quantity of the scheduling MCS thresholds in the value set, a quantity of bits used to send each element. The bit quantity is a minimum integer of b satisfying $S \leq 2^b$, where S is the quantity of the scheduling MCS thresholds in the value set, and b is the bit quantity. For example, the quantity of the scheduling bandwidth thresholds in the value set is 9. According to the foregoing formula, b=4, and the terminal device uses 4 bits to represent each element. For example, if the four generated elements are 0, 2, 5, and 7, four elements sent by the terminal device are respectively 0000, 0010, 0101, and 0111, and a total of 16 bits are required. Compared with the prior art in which 5 bits are fixedly used to report each scheduling MCS threshold, in this embodiment of the present disclosure, overheads for reporting the scheduling MCS thresholds by the terminal device are greatly reduced.

S1204: The network device obtains the at least one scheduling MCS threshold.

Specifically, the network device prestores or preconfigures the mapping relationships between the scheduling MCS thresholds in the value set and the elements. The mapping relationships may be expressed by using a mapping table or a formula. The network device obtains the at least one scheduling MCS threshold based on the received element and the mapping relationships. This process may be an inverse process of S1202. For details, refer to the descriptions of S1202. Details are not described herein again.

In the method described in FIG. 12A, the scheduling MCS threshold determined by the terminal device is greater than the preset value, and the terminal device reports, to the network device, the element associated with the scheduling MCS threshold, thereby reducing a quantity of bits required for reporting by the terminal device, and reducing reporting overheads.

In another possible embodiment, when the network device sends to or configures for the terminal an MCS threshold related to a PTRS pattern, the network device may send to or configure for the terminal device an element associated with the MCS threshold, where the MCS threshold is greater than a preset MCS threshold.

Figure 12B:
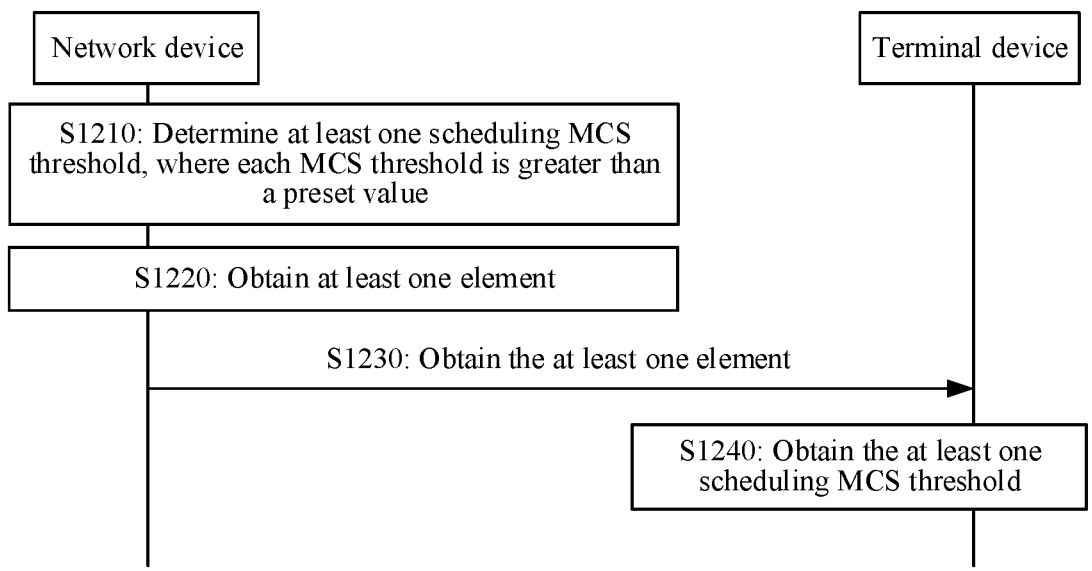
FIG. 12B is another schematic flowchart of a method for configuring a scheduling bandwidth threshold according to an embodiment of the present disclosure.

Specifically, for example, as shown in FIG. 12B, a method for configuring an MCS threshold by the network device includes the following steps.

S1210: The network device determines at least one scheduling MCS threshold.

Specifically, the at least one scheduling MCS threshold includes a first scheduling MCS threshold and a second scheduling MCS threshold, each scheduling MCS threshold may be represented by an MCS index value, and the MCS index value is an integer greater than or equal to 0. The at least one MCS threshold determined by the network device belongs to all possible scheduling MCS thresholds of the terminal device. For ease of description, in this embodiment, all the possible scheduling MCS thresholds of the terminal device are referred to as a "value set", and a maximum scheduling MCS threshold in the value set needs to be less than or equal to a specified value. For example, in NR, the specified value is 31.

Each of the at least one scheduling MCS threshold determined by the network device is greater than the preset value, that is, each scheduling MCS threshold in the value set is an even number, and the network device determines at least one different scheduling MCS threshold in the value set.

For example, if the specified value is 31, and the preset value is 23, the scheduling MCS thresholds in the value set are {24, 25, 26, 27, 28, 29, 30, 31}, and four scheduling MCS thresholds determined by the network device in the value set are {24, 25, 28, 30}.

In a possible implementation, each scheduling MCS threshold is an odd number.

In a possible implementation, each MCS threshold is an even number.

S1220: The network device obtains at least one element.

Specifically, the at least one element is in a one-to-one correspondence with the at least one scheduling MCS threshold, and each element is used to indicate one scheduling MCS threshold. For example, a first element in the at least one element indicates a first scheduling MCS threshold in the at least one scheduling MCS threshold, and a second element in the at least one element is used to indicate a second scheduling MCS threshold in the at least one scheduling MCS threshold. All the scheduling MCS thresholds in the value set are numbered, and an element is a number of a scheduling MCS threshold. A numbering rule for the scheduling MCS thresholds in the value set may be that numbering is performed in ascending order starting from 1 by using a step of 1, and a number increases as a scheduling MCS threshold increases; or numbering is performed in ascending order starting from 0, and a number increases as a scheduling MCS threshold increases; or numbering is performed in descending order starting from a quantity of the scheduling MCS thresholds in the value set by using a step of 1, and a number decreases as a scheduling MCS threshold increases; or another numbering manner is used. This is not limited in this embodiment. The network device prestores or preconfigures mapping relationships between all the possible scheduling MCS thresholds and elements, and the network device obtains the at least one element based on the mapping relationships. The mapping relationships may be expressed by using a mapping table or a formula.

For example, the mapping relationships prestored or preconfigured by the network device are listed in the following Table 18:

TABLE 18

| Scheduling MCS threshold | Element value |
| --- | --- |
| 24 | 0 |
| 25 | 1 |
| 26 | 2 |
| 27 | 3 |
| 28 | 4 |
| 29 | 5 |
| 30 | 6 |
| 31 | 7 |

Assuming that the four scheduling MCS thresholds determined by the network device are {24, 25, 28, 30}, four elements generated by the network device based on the mapping relationships in the foregoing table are {0, 1, 4, 6}.

S1230: The network device sends the at least one element to the terminal device.

Specifically, the network device sends the at least one element to the terminal device by using a bit, and the network device determines, based on the quantity of the scheduling MCS thresholds in the value set, a quantity of bits used to send each element. The bit quantity is a minimum integer of b satisfying $S \leq 2^b$, where S is the quantity of the scheduling MCS thresholds in the value set, and b is the bit quantity. For example, the quantity of the scheduling bandwidth thresholds in the value set is 9. According to the foregoing formula, b=4, and the network device uses 4 bits to represent each element. For example, if the four generated elements are 0, 2, 5, and 7, four elements sent by the network device are respectively 0000, 0010, 0101, and 0111, and a total of 16 bits are required. Compared with the prior art in which 5 bits are fixedly used to configure each scheduling MCS threshold, in this embodiment of the present disclosure, overheads for configuring the scheduling MCS thresholds by the network device are greatly reduced.

S1240: The terminal device obtains the at least one scheduling MCS threshold.

Specifically, the terminal device prestores or preconfigures the mapping relationships between the scheduling MCS thresholds in the value set and the elements. The mapping relationships may be expressed by using a mapping table or a formula. The terminal device obtains the at least one scheduling MCS threshold based on the received element and the mapping relationships.

Figure 13A:
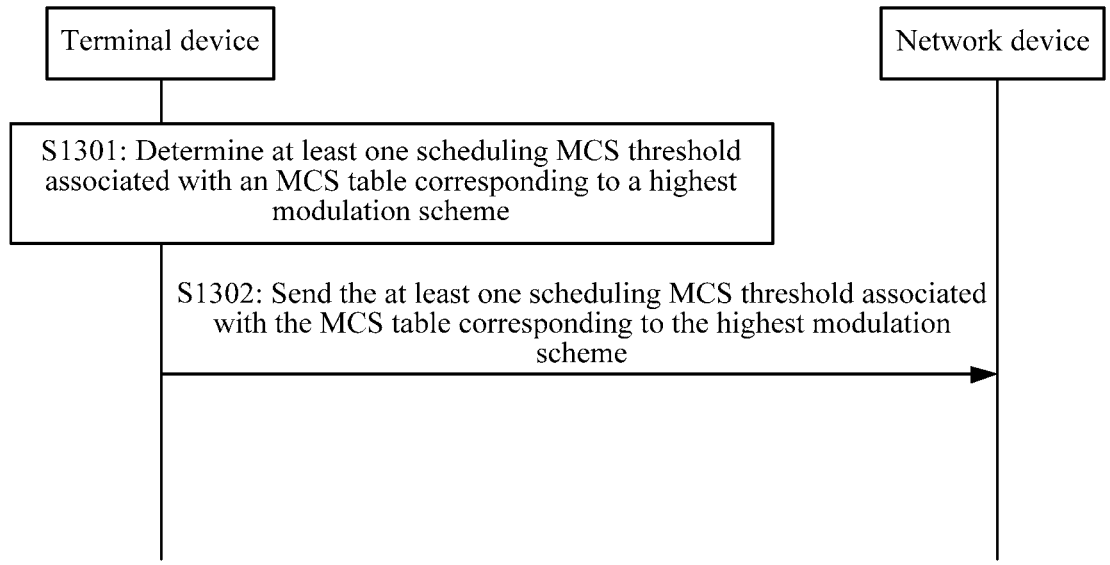
FIG. 13A is a schematic flowchart of a data reporting method according to an embodiment of the present disclosure.

FIG. 13A is a schematic flowchart of a data reporting method according to an embodiment of the present disclosure. In this embodiment of the present disclosure, the method includes the following steps.

S1301: A terminal device determines at least one scheduling MCS threshold associated with an MCS table corresponding to a highest modulation scheme.

Specifically, in the prior art, when a terminal device supports at least one MCS table, the terminal device needs to report at least one scheduling MCS threshold for each MCS table based on different MCS tables. For example, if the terminal device supports an MCS table corresponding to 64QAM and an MCS table corresponding to 256QAM, the terminal device needs to separately report, to a network device, four scheduling MCS thresholds associated with the MCS table corresponding to 64QAM, and four scheduling MCS thresholds associated with the MCS table corresponding to 256QAM. In this application, the terminal device only needs to report, to the network device, the at least one scheduling MCS threshold associated with the MCS table corresponding to the highest modulation scheme. For example, according to the foregoing example, if the highest modulation scheme of the terminal device is 256QAM, the terminal device reports, to the network device, only at least one scheduling MCS threshold associated with the MCS table corresponding to 256QAM, without reporting at least one scheduling MCS threshold associated with the MCS table corresponding to 64QAM. In this way, a quantity of groups of reported scheduling MCS thresholds can be reduced, thereby reducing reporting overheads.

In a possible design, the MCS table corresponding to the highest modulation scheme is associated with three scheduling MCS thresholds. In the prior art, one group of scheduling MCS thresholds reported by the terminal device includes four scheduling MCS thresholds: a first scheduling MCS threshold, a second scheduling MCS threshold, a third scheduling MCS threshold, and a fourth scheduling MCS threshold, and the first scheduling MCS threshold<the second scheduling MCS threshold<the third scheduling MCS threshold<the fourth scheduling MCS threshold. In this application, a fourth scheduling MCS threshold is a default value, the network device already knows the fourth scheduling MCS threshold, and the terminal device needs to report only a first scheduling MCS threshold, a second scheduling MCS threshold, and a third scheduling MCS threshold, so that a quantity of scheduling MCS thresholds in each group is reduced, thereby further reducing reporting overheads of the terminal device. The terminal device further needs to report, to the network device, the highest modulation scheme supported by the terminal device, and the network device may determine the fourth scheduling MCS threshold based on the highest modulation scheme supported by the terminal device.

S1302: The network device receives, from the terminal device, the at least one scheduling MCS threshold associated with the MCS table corresponding to the highest modulation scheme.

Specifically, the terminal device may send the at least one scheduling MCS threshold to the network device by using a bit. When the terminal device supports at least one MCS table, the terminal device only needs to report at least one scheduling MCS threshold associated with an MCS table corresponding to one highest modulation scheme, without reporting one group of scheduling MCS thresholds for each modulation scheme, thereby greatly reducing reporting overheads.

In another possible embodiment, when sending to or configuring for the terminal an MCS threshold related to a PTRS pattern, the network device may send or configure an MCS threshold based on the maximum modulation scheme supported by the terminal. For example, when the maximum modulation scheme supported by the terminal is 64QAM, the sent or configured MCS threshold is a 64QAM-based MCS table, or when the maximum modulation scheme supported by the terminal is 256QAM, the sent or configured MCS threshold is a 256QAM-based MCS table.

Optionally, the network device may not send or configure a maximum MCS threshold, and a maximum MCS threshold that is pre-agreed on with the terminal device or preconfigured is related to the maximum modulation scheme supported by the terminal. For example, when the maximum modulation scheme is 64QAM, the maximum MCS threshold may be 1+a maximum MCS in the MCS table of 64QAM or 1+a maximum MCS index value in the MCS table of 64QAM by default, or 1+a maximum MCS directly corresponding to a modulation order and a code rate or 1+a maximum MCS index value directly corresponding to a modulation order and a code rate, or 1+a maximum MCS for initial transmission or 1+a maximum MCS index value for initial transmission. Assuming that an MCS table of 64QAM in NR and an MCS table of 64QAM in LTE have same settings for initial transmission and retransmission, the maximum MCS threshold may be 29 by default or 32 by default. When the maximum modulation scheme is 256QAM, the maximum MCS threshold may be 1+a maximum MCS in the MCS table of 256QAM or 1+a maximum MCS index value in the MCS table of 256QAM by default, or 1+a maximum MCS directly corresponding to a modulation order and a code rate or 1+a maximum MCS index value directly corresponding to a modulation order and a code rate, or 1+a maximum MCS for initial transmission or 1+a maximum MCS index value for initial transmission. Assuming that an MCS table of 256QAM in NR and an MCS table of 256QAM in LTE have same settings for initial transmission and retransmission, the maximum MCS threshold may be 28 by default or 32 by default.

Figure 13B:
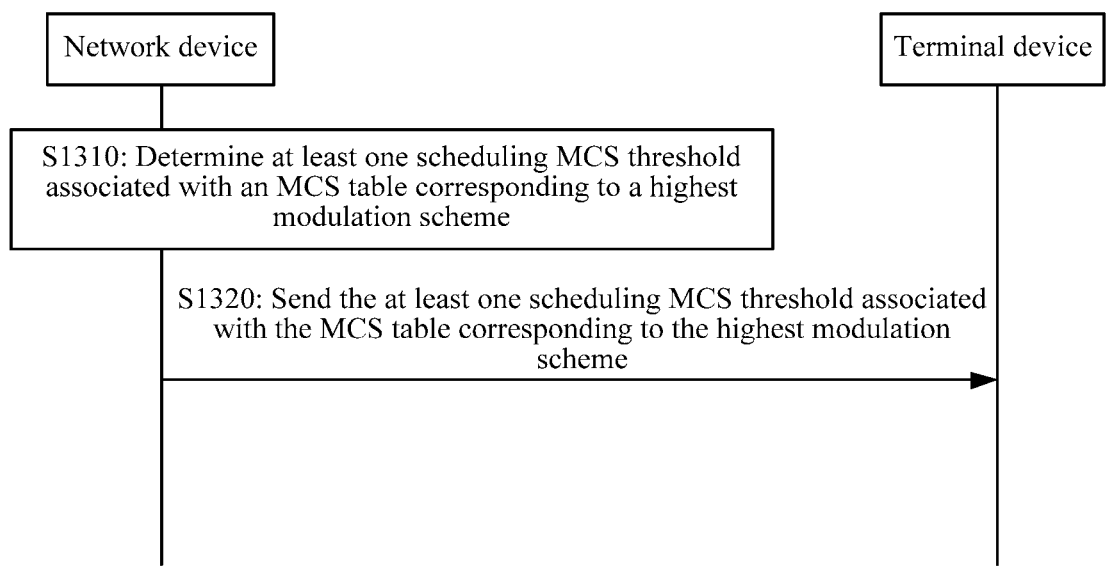
FIG. 13B is another schematic flowchart of a method for configuring a scheduling bandwidth threshold according to an embodiment of the present disclosure.

Specifically, for example, as shown in FIG. 13B, a method for configuring an MCS threshold by the network device includes the following steps.

S1310: The network device determines at least one scheduling MCS threshold associated with an MCS table corresponding to a highest modulation scheme.

Specifically, in the prior art, when a network device supports at least one MCS table, the network device needs to configure at least one scheduling MCS threshold for each MCS table based on different MCS tables. For example, if the network device supports an MCS table corresponding to 64QAM and an MCS table corresponding to 256QAM, the network device needs to separately configure, for the terminal device, four scheduling MCS thresholds associated with the MCS table corresponding to 64QAM, and four scheduling MCS thresholds associated with the MCS table corresponding to 256QAM. In this application, the network device only needs to configure, for the terminal device, the at least one scheduling MCS threshold associated with the MCS table corresponding to the highest modulation scheme. For example, according to the foregoing example, if the highest modulation scheme of the network device is 256QAM, the network device configures, for the terminal device, only at least one scheduling MCS threshold associated with the MCS table corresponding to 256QAM, without configuring at least one scheduling MCS threshold associated with the MCS table corresponding to 64QAM. In this way, a quantity of groups of configured scheduling MCS thresholds can be reduced, thereby reducing configuration overheads.

In a possible design, the MCS table corresponding to the highest modulation scheme is associated with three scheduling MCS thresholds. In the prior art, one group of scheduling MCS thresholds configured by the network device includes four scheduling MCS thresholds: a first scheduling MCS threshold, a second scheduling MCS threshold, a third scheduling MCS threshold, and a fourth scheduling MCS threshold, and the first scheduling MCS threshold<the second scheduling MCS threshold<the third scheduling MCS threshold<the fourth scheduling MCS threshold. In this application, a fourth scheduling MCS threshold is a default value, the terminal device already knows the fourth scheduling MCS threshold, and the network device only needs to configure a first scheduling MCS threshold, a second scheduling MCS threshold, and a third scheduling MCS threshold, so that a quantity of scheduling MCS thresholds in each group is reduced, thereby further reducing configuration overheads of the network device.

S1320: The terminal device receives, from the network device, the at least one scheduling MCS threshold associated with the MCS table corresponding to the highest modulation scheme.

Specifically, the network device may send the at least one scheduling MCS threshold to the terminal device by using a bit. When the network device supports at least one MCS table, the network device only needs to configure at least one scheduling MCS threshold associated with an MCS table corresponding to one highest modulation scheme, without configuring one group of scheduling MCS thresholds for each modulation scheme, thereby greatly reducing configuration overheads.

Figure 14A:
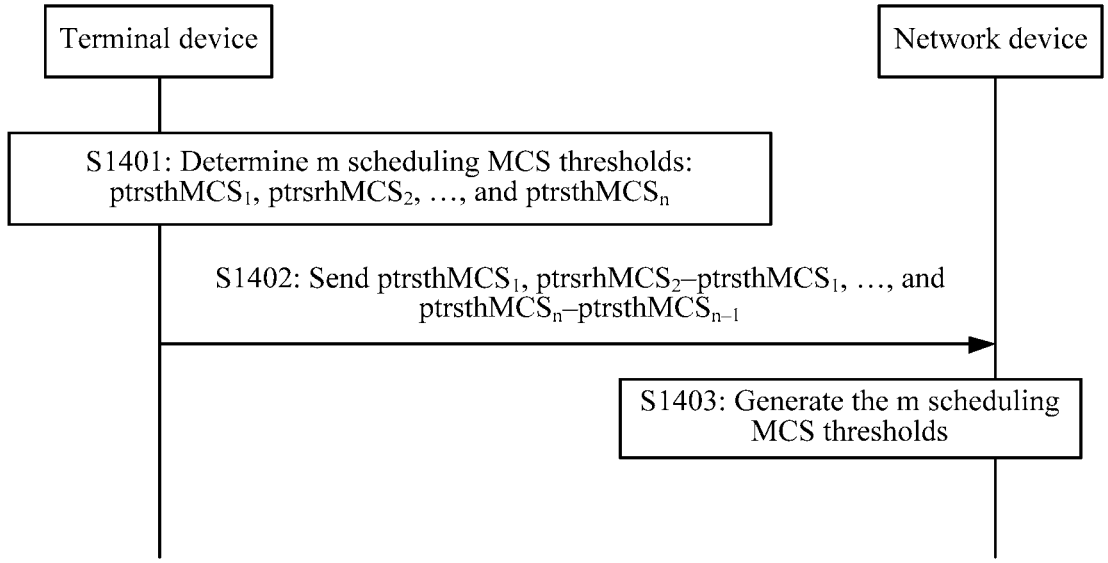
FIG. 14A is a schematic flowchart of a data reporting method according to an embodiment of the present disclosure.

FIG. 14A is a schematic flowchart of a data reporting method according to an embodiment of the present disclosure. In this embodiment of the present disclosure, the method includes the following steps.

S1401: A terminal device determines m scheduling MCS thresholds: $ptrsthMCS_1, ptrsthMCS_2, \ldots,$ and $ptrsthMCS_n$.

Specifically, m is an integer greater than 1, $ptrsthMCS_1 < ptrsthMCS_2 < \ldots < ptrsthMCS_m$, each scheduling MCS threshold may be represented by an MCS index value, and the MCS index value is an integer greater than or equal to 0. The m scheduling MCS thresholds determined by the terminal device belong to all possible scheduling MCS thresholds of the terminal device. For ease of description, in this embodiment, all the possible scheduling MCS thresholds of the terminal device are referred to as a "value set", a maximum scheduling MCS threshold in the value set needs to be less than or equal to a specified value, and the specified value is prestored or preconfigured. For example, in an NR communications system, the specified value is 31.

For example, it is assumed that the value set is {0, 1, 2, . . . , 30, 31}, m=4, and a set of four scheduling MCS thresholds determined by the terminal device is {0, 10, 20, 31}.

In a possible design, m=3. In the prior art, one group of scheduling MCS thresholds reported by a terminal device includes four scheduling MCS thresholds: a first scheduling MCS threshold, a second scheduling MCS threshold, a third scheduling MCS threshold, and a fourth scheduling MCS threshold, and the first scheduling MCS threshold<the second scheduling MCS threshold<the third scheduling MCS threshold<the fourth scheduling MCS threshold. In this application, a fourth scheduling MCS threshold is a default value, the network device already knows the fourth scheduling MCS threshold, and the terminal device only needs to report a first scheduling MCS threshold, a second scheduling MCS threshold, and a third scheduling MCS threshold, so that a quantity of scheduling MCS thresholds in each group is reduced, thereby further reducing reporting overheads of the terminal device.

S1402: The terminal device sends $ptrsthMCS_1$, $ptrsthMCS_2-ptrsthMCS_1$, . . . , and $ptrsthMCS_m-ptrsthMCS_{m-1}$ to the network device.

Specifically, values of m elements reported by the terminal device to the network device are $ptrsthMCS_1$, $ptrsthMCS_2-ptrsthMCS_1$, . . . , and $ptrsthMCS_n-ptrsthMCS_{n-1}$, and the m elements are in a one-to-one correspondence with the m scheduling MCS thresholds. For example, $ptrsthMCS_1$ in the m elements is used to indicate $ptrsthMCS_1$ in the m scheduling MCS thresholds, and $ptrsthMCS_2-ptrsthMCS_1$ in the m elements is used to indicate $ptrsthMCS_2$ in the m scheduling MCS thresholds. The terminal device may report the m elements to the network device by using bits.

The terminal device reports $ptrsthMCS_1$ by using an existing default bit position, for example, sends $ptrsthMCS_1$ by using 5 default bits. For m−1 differential values: $ptrsthMCS_2-ptrsthMCS_1$, . . . , and $ptrsthMCS_m-ptrsthMCS_{m-1}$, the terminal device determines a maximum value $T_{max}$ in the m−1 differential values, the terminal device determines a quantity of bits used to send the n−1 differential values, and the bit quantity b is a minimum integer of b satisfying $T_{max} \leq 2^b$.

For example, according to the example in S1401, if a set of the four scheduling MCS thresholds determined by the terminal device is {0, 10, 20, 31}, four elements reported by the terminal device are {0, 10, 10, 11}. If the differential value is within 16 (b=4), {00000, 1010, 1010, 1011} is reported by using bits. Compared with the prior art in which 5 bits are fixedly used to report each scheduling MCS threshold, in this embodiment of the present disclosure, reporting overheads of the terminal device are greatly reduced.

S1403: The network device generates the m scheduling MCS thresholds.

The network device generates the m scheduling MCS thresholds based on the m elements reported by the terminal device. This step is an inverse process of S1402. For a specific process, refer to the descriptions of S1402. Details are not described herein again.

According to the descriptions of FIG. 14A, the terminal device reports the scheduling MCS thresholds to the network device in a differential manner. In this way, a quantity of bits occupied by the scheduling MCS thresholds can be reduced, and reporting overheads of the terminal device can be reduced.

In another possible embodiment, when the network device sends to or configures for the terminal an MCS threshold related to a PTRS pattern, the network device may send to or configure for the terminal device an MCS threshold based on a minimum MCS threshold in a differential manner.

Figure 14B:
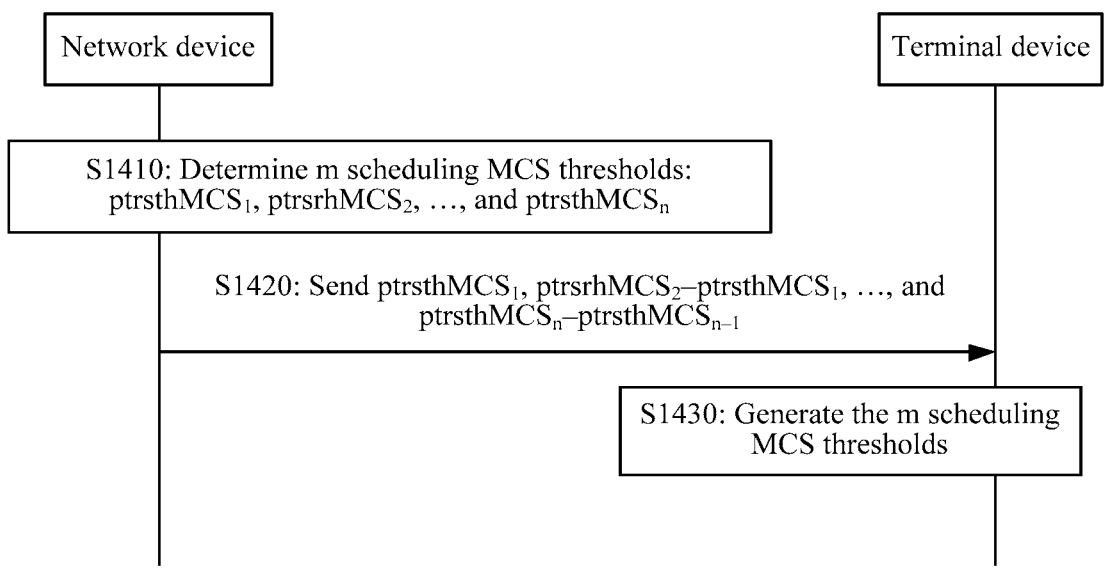
FIG. 14B is another schematic flowchart of a method for configuring a scheduling bandwidth threshold according to an embodiment of the present disclosure.

Specifically, for example, as shown in FIG. 14B, a method for configuring an MCS threshold by the network device includes the following steps.

S1410: The network device determines m scheduling MCS thresholds: $ptrsthMCS_1$, $ptrsthMCS_2$, . . . , and $ptrsthMCS_m$.

Specifically, m is an integer greater than 1, $ptrsthMCS_1 < ptrsthMCS_2 < \ldots < ptrsthMCS_m$, each scheduling MCS threshold may be represented by an MCS index value, and the MCS index value is an integer greater than or equal to 0. The m scheduling MCS thresholds determined by the network device belong to all possible scheduling MCS thresholds of the terminal device. For ease of description, in this embodiment, all the possible scheduling MCS thresholds of the terminal device are referred to as a "value set", a maximum scheduling MCS threshold in the value set needs to be less than or equal to a specified value, and the specified value is prestored or preconfigured. For example, in an NR communications system, the specified value is 31.

For example, it is assumed that the value set is {0, 1, 2, . . . , 30, 31}, m=4, and a set of four scheduling MCS thresholds determined by the network device is {0, 10, 20, 31}.

In a possible design, m=3. In the prior art, one group of scheduling MCS thresholds configured by a network device includes four scheduling MCS thresholds: a first scheduling MCS threshold, a second scheduling MCS threshold, a third scheduling MCS threshold, and a fourth scheduling MCS threshold, and the first scheduling MCS threshold<the second scheduling MCS threshold<the third scheduling MCS threshold<the fourth scheduling MCS threshold. In this application, a fourth scheduling MCS threshold is a default value, the terminal device already knows the fourth scheduling MCS threshold, and the network device only needs to configure a first scheduling MCS threshold, a second scheduling MCS threshold, and a third scheduling MCS threshold, so that a quantity of scheduling MCS thresholds in each group is reduced, thereby further reducing configuration overheads of the network device.

S1420: The network device sends $ptrsthMCS_1$, $ptrsthMCS_2$ $ptrsthMCS_1$, . . . , and $ptrsthMCS_m-ptrsthMCS_{m-1}$ to the terminal device.

Specifically, values of m elements configured by the network device for the terminal device are $ptrsthMCS_1$, $ptrsthMCS_2-ptrsthMCS_1$, . . . , and $ptrsthMCS_n-ptrsthMCS_{n-1}$, and the m elements are in a one-to-one correspondence with the m scheduling MCS thresholds. For example, $ptrsthMCS_1$ in the m elements is used to indicate $ptrsthMCS_1$ in the m scheduling MCS thresholds, and $ptrsthMCS_2-ptrsthMCS_1$ in the m elements is used to indicate $ptrsthRB_2$ in the m scheduling MCS thresholds. The network device may configure the m elements for the terminal device by using bits.

The network device configures $ptrsthMCS_1$ by using an existing default bit position, for example, sends $ptrsthMCS_1$ by using 5 default bits. For m−1 differential values: $ptrsthMCS_2-ptrsthMCS_1$, . . . , and $ptrsthMCS_m-ptrsthMCS_{m-1}$, the network device determines a maximum value $T_{max}$ in the n−1 differential values, the network device determines a quantity of bits used to send the n−1 differential values, and the bit quantity b is a minimum integer of b satisfying $T_{max} \leq 2^b$.

For example, according to the example in S1401, a set of the four scheduling MCS thresholds determined by the network device is {0, 10, 20, 31}, four elements configured by the network device are {0, 10, 10, 11}. If the differential value is within 16 (b=4), {00000, 1010, 1010, 1011} is configured by using bits. Compared with the prior art in which 5 bits are fixedly used to configure each scheduling MCS threshold, in this embodiment of the present disclosure, configuration overheads of the network device are greatly reduced.

S1430: The terminal device obtains the m scheduling MCS thresholds.

The terminal device generates the m scheduling MCS thresholds based on the m elements configured by the network device. This step is an inverse process of S1420. For a specific process, refer to the descriptions of S1420. Details are not described herein again.

Figure 15A:
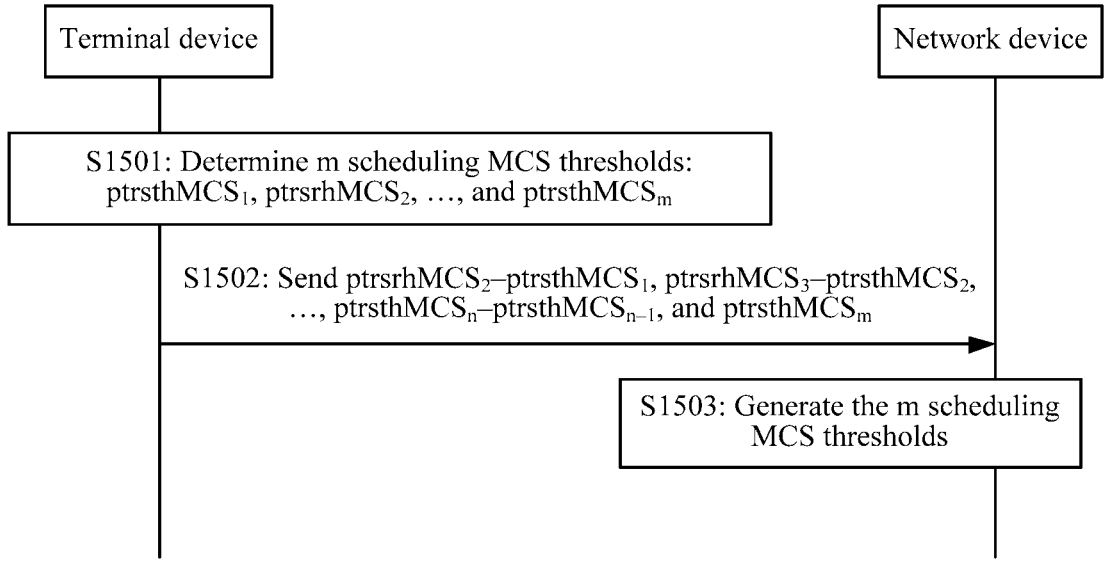
FIG. 15A is a schematic flowchart of a data reporting method according to an embodiment of the present disclosure.

FIG. 15A is a schematic flowchart of a data reporting method according to an embodiment of the present disclosure. In this embodiment of the present disclosure, the method includes the following steps.

S1501: A terminal device determines m scheduling MCS thresholds: $ptrsthMCS_1, ptrsthMCS_2, \ldots,$ and $ptrsthMCS_m$.

Specifically, m is an integer greater than 1, $ptrsthMCS_1 < ptrsthMCS_2 < \ldots < ptrsthMCS_m$, each scheduling MCS threshold may be represented by an MCS index value, and the MCS index value is an integer greater than or equal to 0. The m scheduling MCS thresholds determined by the terminal device belong to all possible scheduling MCS thresholds of the terminal device. For ease of description, in this embodiment, all the possible scheduling MCS thresholds of the terminal device are referred to as a "value set", a maximum scheduling MCS threshold in the value set needs to be less than or equal to a specified value, and the specified value is prestored or preconfigured. For example, in an NR communications system, the specified value may be 31.

For example, it is assumed that the value set is {0, 1, 2, . . . , 30, 31}, m=4, and a set of four scheduling MCS thresholds determined by the terminal device is {15, 20, 25, 31}.

In a possible design, m=3. In the prior art, one group of scheduling MCS thresholds reported by a terminal device includes four scheduling MCS thresholds: a first scheduling MCS threshold, a second scheduling MCS threshold, a third scheduling MCS threshold, and a fourth scheduling MCS threshold, and the first scheduling MCS threshold<the second scheduling MCS threshold<the third scheduling MCS threshold<the fourth scheduling MCS threshold. In this application, a fourth scheduling MCS threshold is a default value, the network device already knows the fourth scheduling MCS threshold, and the terminal device only needs to report a first scheduling MCS threshold, a second scheduling MCS threshold, and a third scheduling MCS threshold, so that a quantity of scheduling MCS thresholds in each group is reduced, thereby further reducing reporting overheads of the terminal device.

S1502: The terminal device sends $ptrsthMCS_2-ptrsthMCS_1, ptrsthMCS_3-ptrsthMCS_2, \ldots, ptrsthMCS_m-ptrsthMCS_{m-1},$ and $ptrsthMCS_m$, and a network device receives $ptrsthMCS_2-ptrsthMCS_1, ptrsthMCS_3-ptrsthMCS_2, \ldots, ptrsthMCS_n-ptrsthMCS_{n-1},$ and $ptrsthMCS_n$ from the terminal device.

Specifically, values of m elements reported by the terminal device to the network device are $ptrsthMCS_1, ptrsthMCS_2-ptrsthMCS_1, \ldots, ptrsthMCS_n-ptrsthMCS_{n-1}$, and the m elements are in a one-to-one correspondence with the m scheduling MCS thresholds. For example, $ptrsthMCS_1$ in the m elements is used to indicate $ptrsthMCS_1$ in the m scheduling MCS thresholds, and $ptrsthMCS_2-ptrsthMCS_1$ in the m elements is used to indicate $ptrsthRB_2$ in the m scheduling MCS thresholds. The terminal device may report the m elements to the network device by using bits.

The terminal device reports $ptrsthMCS_m$ by using an existing default bit position, for example, sends $ptrsthMCS_m$ by using 5 default bits. For m−1 differential values: $ptrsthMCS_2-ptrsthMCS_1, \ldots,$ and $ptrsthMCS_m-ptrsthMCS_{m-1}$, the terminal device determines a maximum value T in the n−1 differential values, the terminal device determines a quantity of bits used to send the n−1 differential values, and the bit quantity b is a minimum integer of b satisfying $T_{max} \leq 2^b$.

For example, according to the example in S1401, if a set of the four scheduling MCS thresholds determined by the terminal device is {15, 20, 25, 31}, four elements reported by the terminal device are {5, 5, 6, 31}. If the differential value is within a range of $2^3$ (b=3), {101, 101, 110, 11111} is reported by using bits. Compared with the prior art in which 5 bits are fixedly used to report each scheduling MCS threshold, in this embodiment of the present disclosure, reporting overheads of the terminal device are greatly reduced.

S1503: The network device generates at least one scheduling MCS threshold.

Specifically, the network device generates the m scheduling MCS thresholds based on the m elements from the terminal device. This step is an inverse process of S1502. For a specific process, refer to the descriptions of S1502. Details are not described herein again.

According to the descriptions of FIG. 15A, the terminal device reports the scheduling bandwidth thresholds to the network device in a differential manner. In this way, a quantity of bits occupied by the scheduling bandwidth thresholds can be reduced, and reporting overheads of the terminal device can be reduced.

In another possible embodiment, when the network device sends to or configures for the terminal an MCS threshold related to a PTRS pattern, the network device may send to or configure for the terminal device an MCS threshold based on a maximum MCS threshold in a differential manner.

Figure 15B:
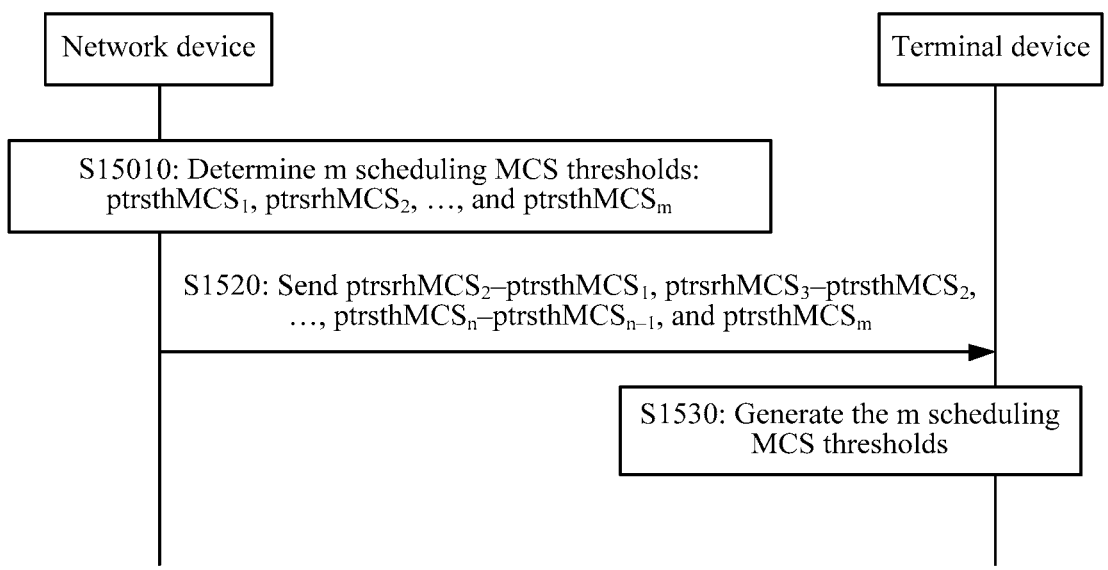
FIG. 15B is another schematic flowchart of a method for configuring a scheduling bandwidth threshold according to an embodiment of the present disclosure.

Specifically, for example, as shown in FIG. 15B, a method for configuring an MCS threshold by the network device includes the following steps.

S1510: The network device determines m scheduling MCS thresholds: $ptrsthMCS_1, ptrsthMCS_2, \ldots,$ and $ptrsthMCS_n$.

Specifically, m is an integer greater than 1, $ptrsthMCS_1 < ptrsthMCS_2 < \ldots < ptrsthMCS_m$, each scheduling MCS threshold may be represented by an MCS index value, and the MCS index value is an integer greater than or equal to 0. The m scheduling MCS thresholds determined by the network device belong to all possible scheduling MCS thresholds of the terminal device. For ease of description, in this embodiment, all the possible scheduling MCS thresholds of the terminal device are referred to as a "value set", a maximum scheduling MCS threshold in the value set needs to be less than or equal to a specified value, and the specified value is prestored or preconfigured. For example, in an NR communications system, the specified value may be 31.

For example, it is assumed that the value set is {0, 1, 2, . . . , 30, 31}, m=4, and a set of four scheduling MCS thresholds determined by the network device is {15, 20, 25, 31}.

In a possible design, m=3. In the prior art, one group of scheduling MCS thresholds configured by a network device includes four scheduling MCS thresholds: a first scheduling MCS threshold, a second scheduling MCS threshold, a third scheduling MCS threshold, and a fourth scheduling MCS threshold, and the first scheduling MCS threshold<the second scheduling MCS threshold<the third scheduling MCS threshold<the fourth scheduling MCS threshold. In this application, a fourth scheduling MCS threshold is a default value, the terminal device already knows the fourth scheduling MCS threshold, and the network device only needs to configure a first scheduling MCS threshold, a second scheduling MCS threshold, and a third scheduling MCS threshold, so that a quantity of scheduling MCS thresholds in each group is reduced, thereby further reducing configuration overheads of the network device.

S1520: The network device sends ptrsthMCS$_2$-ptrsthMCS$_1$, ptrsthMCS$_3$-ptrsthMCS$_2$, . . . , ptrsthMCS$_n$-ptrsthMCS$_{n-1}$, and ptrsthMCS$_n$.

Specifically, values of m elements configured by the network device for the terminal device are ptrsthMCS$_1$, ptrsthMCS$_2$-ptrsthMCS$_1$, . . . , ptrsthMCS$_n$-ptrsthMCS$_{n-1}$, and the m elements are in a one-to-one correspondence with the m scheduling MCS thresholds. For example, ptrsthMCS$_1$ in the m elements is used to indicate ptrsthMCS$_1$ in the m scheduling MCS thresholds, and ptrsthMCS$_2$-ptrsthMCS$_1$ in the m elements is used to indicate ptrsthRB$_2$ in the m scheduling MCS thresholds. The network device may configure the m elements for the terminal device by using bits.

The network device configures ptrsthMCS$_m$ by using an existing default bit, for example, sends ptrsthMCS$_m$ by using 5 default bits. For m-1 differential values: ptrsthMCS$_2$-ptrsthMCS$_1$, . . . , and ptrsthMCS$_m$-ptrsthMCS$_{m-1}$, the network device determines a maximum value T$_{max}$ in the n-1 differential values, the network device determines a quantity of bits used to send the n-1 differential values, and the bit quantity b is a minimum integer of b satisfying T$_{max}$≤$2^b$.

For example, according to the example in S1410, a set of the four scheduling MCS thresholds determined by the network device is {15, 20, 25, 31}, four elements configured by the network device are {5, 5, 6, 31}. If the differential value is within a range of $2^3$ (b=3), {101, 101, 110, 11111} is configured by using bits. Compared with the prior art in which 5 bits are fixedly used to configure each scheduling MCS threshold, in this embodiment of the present disclosure, configuration overheads of the network device are greatly reduced.

S1530: The terminal device generates at least one scheduling MCS threshold.

Specifically, the terminal device generates the m scheduling MCS thresholds based on the m elements from the network device. This step is an inverse process of S1520. For a specific process, refer to the descriptions of S1520. Details are not described herein again.

It should be noted that, for the embodiments in FIG. 2A to FIG. 15A, in a possible implementation, after the terminal device reports a threshold (a scheduling bandwidth threshold or a scheduling MCS threshold), if a threshold configured by the network device for the terminal device by using higher layer signaling is improper, where such an improper configuration includes: the latter threshold is greater than the former threshold, a default PTRS configuration prevails for both the network device and the terminal device.

In another possible implementation, after the terminal device reports a threshold (a scheduling bandwidth threshold or a scheduling MCS threshold), if the network device configures only one group of thresholds for the terminal by using higher layer signaling, that is, delivers only one group of scheduling MCS thresholds or one group of scheduling bandwidth thresholds, there are the following cases for a PTRS configuration of the network device and the terminal device: (a) A default PTRS configuration prevails for the network device and the terminal device. (b) For a configured threshold, the configured threshold prevails, and for a non-configured threshold, a default configuration prevails. For example, when only a scheduling MCS threshold is configured, the configured scheduling MCS threshold prevails for a time domain density, and a default configuration prevails for a scheduling bandwidth threshold. For example, when only a scheduling bandwidth threshold is configured, the configured scheduling bandwidth threshold prevails for a frequency domain density, and a default configuration prevails for a scheduling MCS threshold.

The data reporting method in the embodiments of the present disclosure is described in detail above, and a data reporting apparatus (an apparatus 16 for short below) in an embodiment of the present disclosure is provided below.

Figure 16:
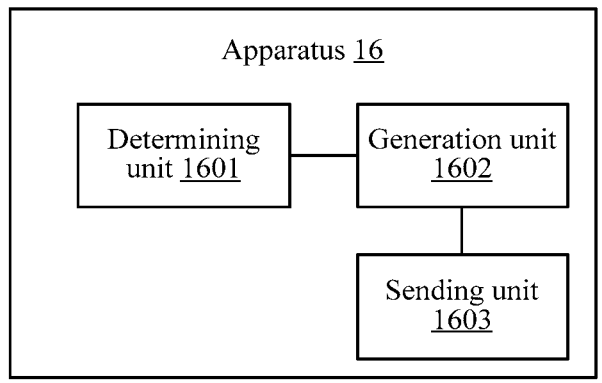
FIG. 16 is a schematic structural diagram of an apparatus according to an embodiment of the present disclosure.

In a possible implementation, the apparatus 16 shown in FIG. 16 can implement a terminal device side in the embodiment shown in FIG. 2A. The apparatus 16 includes a determining unit 1601, a generating unit 1602, and a sending unit 1603. The determining unit 1601 is configured to determine at least one scheduling bandwidth threshold, where each scheduling bandwidth threshold is a natural number power of 2.

The generating unit 1602 is configured to obtain at least one element based on the at least one scheduling bandwidth threshold, where each scheduling bandwidth threshold is used to indicate one of the at least one scheduling bandwidth threshold.

The sending unit 1603 is configured to send the at least one element to a network device.

Optionally, a value of each element is a logarithm of the indicated scheduling bandwidth threshold to a base 2.

Optionally, a maximum scheduling bandwidth threshold in the at least one scheduling bandwidth threshold is less than or equal to a maximum bandwidth supported by the terminal device.

Optionally, each of the at least one scheduling bandwidth threshold is greater than a preset value.

This embodiment of the present disclosure and the method embodiment in FIG. 2A are based on a same idea, and technical effects thereof are also the same. For a specific process, refer to the descriptions of the method embodiment in FIG. 2A. Details are not described herein again.

In another possible implementation, the apparatus 16 shown in FIG. 16 can implement a terminal device side in the embodiment shown in FIG. 5A. The apparatus 16 includes a determining unit 1601, a generating unit 1602, and a sending unit 1603. The determining unit 1601 is configured to determine at least one scheduling bandwidth threshold, where a minimum scheduling bandwidth threshold in the at least one scheduling bandwidth threshold is greater than a preset value.

The generating unit 1602 is configured to obtain at least one element, where each element is used to indicate one of the at least one scheduling bandwidth threshold. The sending unit 1603 is configured to send the at least one element to a network device.

Optionally, each scheduling bandwidth threshold is a natural number power of 2.

Optionally, each scheduling bandwidth threshold is a product of a natural number power of 2, a natural number power of 3, and a natural number power of 5.

This embodiment of the present disclosure and the method embodiment in FIG. 5A are based on a same idea, and technical effects thereof are also the same. For a specific process, refer to the descriptions of the method embodiment in FIG. 5A. Details are not described herein again.

In another possible implementation, the apparatus 16 shown in FIG. 16 can implement a terminal device side in the embodiment shown in FIG. 4A. The apparatus 16 includes a determining unit 1601, a generating unit 1602, and a sending unit 1603. The determining unit 1601 is configured to determine at least one scheduling bandwidth threshold, where each scheduling bandwidth threshold is a product of a natural number power of 2, a natural number power of 3, and a natural number power of 5. The generating unit 1602 is configured to obtain at least one element based on the at least one scheduling bandwidth threshold, where each element is used to indicate one of the at least one scheduling bandwidth threshold. The sending unit 1603 is configured to send the at least one element to a network device.

Optionally, a waveform used by the terminal device is DFT-S-OFDM.

Optionally, each scheduling bandwidth threshold is less than or equal to a maximum bandwidth supported by the terminal device.

This embodiment of the present disclosure and the method embodiment in FIG. 4A are based on a same idea, and technical effects thereof are also the same. For a specific process, refer to the descriptions of the method embodiment in FIG. 4A. Details are not described herein again.

In another possible implementation, the apparatus 16 shown in FIG. 16 can implement a terminal device side in the embodiment shown in FIG. 10A. The apparatus 16 includes a determining unit 1601, a generating unit 1602, and a sending unit 1603. The determining unit 1601 is configured to determine at least one scheduling MCS threshold, where each scheduling MCS threshold is an even number.

The generating unit 1602 is configured to obtain at least one element, where each element is used to indicate one of the at least one scheduling MCS threshold.

The sending unit 1603 is configured to send the at least one element to a network device.

In a possible design, each scheduling MCS threshold is greater than a preset value.

This embodiment of the present disclosure and the method embodiment in FIG. 10A are based on a same idea, and technical effects thereof are also the same. For a specific process, refer to the descriptions of the method embodiment in FIG. 10A. Details are not described herein again.

In another possible implementation, the apparatus 16 shown in FIG. 16 can implement a terminal device side in the embodiment shown in FIG. 11A. The apparatus 16 includes a determining unit 1601, a generating unit 1602, and a sending unit 1603. The determining unit 1601 is configured to determine at least one scheduling MCS threshold, where each scheduling MCS threshold is an odd number.

The generating unit 1602 is configured to obtain at least one element, where each element is used to indicate one of the at least one scheduling MCS threshold.

The sending unit 1603 is configured to send the at least one element to a network device.

Optionally, each scheduling MCS threshold is greater than a preset value.

This embodiment of the present disclosure and the method embodiment in FIG. 11A are based on a same idea, and technical effects thereof are also the same. For a specific process, refer to the descriptions of the method embodiment in FIG. 11A. Details are not described herein again.

The apparatus 16 may be a terminal device, or the apparatus 16 may be a field-programmable gate array (FPGA), a dedicated integrated circuit, a system on chip (SoC), a central processing unit (CPU), a network processor (NP), a digital signal processing circuit, or a micro controller unit (MCU) for implementing a related function, or may be a programmable logic device (PLD) or another integrated circuit.

The data reporting method in the embodiments of the present disclosure is described in detail above, and a data receiving apparatus (an apparatus 17 for short below) in an embodiment of the present disclosure is provided below.

Figure 17:
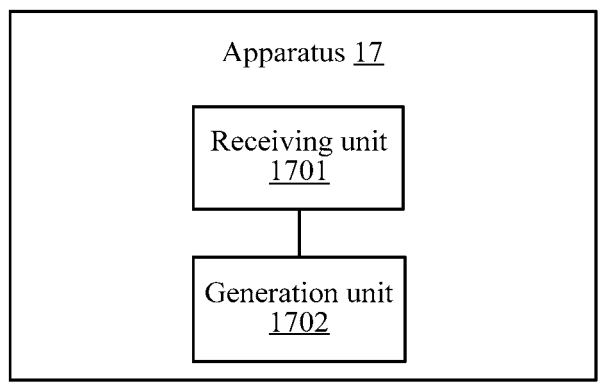
FIG. 17 is another schematic structural diagram of an apparatus according to an embodiment of the present disclosure.

In a possible implementation, the apparatus 17 shown in FIG. 17 can implement a network device side in the embodiment shown in FIG. 2A. The apparatus 17 includes a receiving unit 1701 and a generating unit 1702.

The receiving unit 1701 is configured to receive at least one element from a terminal device, where each element is used to indicate one scheduling bandwidth threshold.

The generating unit 1702 is configured to obtain at least one scheduling bandwidth threshold based on the at least one element, where each scheduling bandwidth threshold is a natural number power of 2.

Optionally, each scheduling bandwidth threshold is equal to a $k^{th}$ power of 2, where k is a value of a corresponding element.

This embodiment of the present disclosure and the method embodiment in FIG. 2A are based on a same idea, and technical effects thereof are also the same. For a specific process, refer to the descriptions of the method embodiment in FIG. 2A. Details are not described herein again.

In another possible implementation, the apparatus 17 shown in FIG. 17 can implement a network device side in the embodiment shown in FIG. 4A. The apparatus 17 includes a receiving unit 1701 and a generating unit 1702. The receiving unit 1701 is configured to receive at least one element from a terminal device, where each element is used to indicate one scheduling bandwidth threshold.

The generating unit 1702 is configured to obtain at least one scheduling bandwidth threshold based on the at least one element, where each scheduling bandwidth threshold is a product of a natural number power of 2, a natural number power of 3, and a natural number power of 5.

In a possible design, a waveform used by the terminal device is a DFT-S-OFDM waveform.

This embodiment of the present disclosure and the method embodiment in FIG. 4A are based on a same idea, and technical effects thereof are also the same. For a specific process, refer to the descriptions of the method embodiment in FIG. 4A. Details are not described herein again.

In another possible implementation, it should be noted that, the apparatus 17 shown in FIG. 17 can implement a network device side in the embodiment shown in FIG. 7A. The apparatus 17 includes a receiving unit 1701 and a generating unit 1702. The receiving unit 1701 is configured to receive, from a terminal device, at least one scheduling bandwidth threshold associated with a first subcarrier spacing.

The generating unit 1702 is configured to determine, based on a ratio relationship between the first subcarrier spacing and a second subcarrier spacing, at least one scheduling bandwidth threshold associated with the second subcarrier spacing.

Optionally, the first subcarrier spacing is associated with two scheduling bandwidth thresholds, and each scheduling bandwidth threshold is less than or equal to a maximum bandwidth supported by the terminal device.

This embodiment of the present disclosure and the method embodiment in FIG. 7A are based on a same idea, and technical effects thereof are also the same. For a specific process, refer to the descriptions of the method embodiment in FIG. 7A. Details are not described herein again.

In another possible implementation, it should be noted that, the apparatus 17 shown in FIG. 17 can implement a network device side in the embodiment shown in FIG. 8A. The apparatus 17 includes a receiving unit 1701 and a generating unit 1702. The receiving unit 1701 is configured to receive n elements from a terminal device, where n is an integer greater than 1, and values of the n elements are $C_1$, $C_2, \ldots$, and $C_n$.

The generating unit 1702 is configured to generate n scheduling bandwidth thresholds based on the n elements, where the n scheduling bandwidth thresholds are $C_1$, $C_1+C_2, \ldots$, and $C_1+C_2+ \ldots +C_n$.

Optionally, n is equal to 2, and $ptrsthRB_1$ and $ptrsthRB_2$ each are less than or equal to a maximum bandwidth supported by the terminal device.

This embodiment of the present disclosure and the method embodiment in FIG. 8A are based on a same idea, and technical effects thereof are also the same. For a specific process, refer to the descriptions of the method embodiment in FIG. 8A. Details are not described herein again.

In another possible implementation, the apparatus 17 shown in FIG. 17 can implement a network device side in the embodiment shown in FIG. 9A. The apparatus 17 includes a receiving unit 1701 and a generating unit 1702. The receiving unit 1701 is configured to receive n elements from a terminal device, where n is an integer greater than 1, and values of the n elements are $C_1, C_2, \ldots$, and $C_n$.

The generating unit 1702 is configured to generate, by a network device, n scheduling bandwidth thresholds based on the n elements, where the n scheduling bandwidth thresholds are $C_n-C_{n-1}-, \ldots, -C_2-C_1, C_n-C_{n-1}-, \ldots, -C_2, \ldots, C_n-C_{n-1}$, and $C_n$.

This embodiment of the present disclosure and the method embodiment in FIG. 9A are based on a same idea, and technical effects thereof are also the same. For a specific process, refer to the descriptions of the method embodiment in FIG. 9A. Details are not described herein again.

In another possible implementation, it should be noted that, the apparatus 17 shown in FIG. 17 can implement a network device side in the embodiment shown in FIG. 14A. The apparatus 17 includes a receiving unit 1701 and a generating unit 1702. The receiving unit 1701 is configured to receive m elements sent by a terminal device, where values of the m elements are $D_1, D_2, \ldots$, and $D_m$.

The generating unit 1702 is configured to generate m scheduling MCS thresholds, where the m MCS thresholds are $D_1, D_1+D_2, \ldots$, and $D_1+D_2+ \ldots +D_{m-1}+D_m$.

This embodiment of the present disclosure and the method embodiment in FIG. 14A are based on a same idea, and technical effects thereof are also the same. For a specific process, refer to the descriptions of the method embodiment in FIG. 14A. Details are not described herein again.

In another possible implementation, the data reporting method in the embodiments of the present disclosure is described in detail above in FIG. 15A, and a data receiving apparatus in an embodiment of the present disclosure is provided below.

It should be noted that, the apparatus 17 shown in FIG. 17 can implement a network device side in the embodiment shown in FIG. 15A. The apparatus 17 includes a receiving unit 1701 and a generating unit 1702. The receiving unit 1701 is configured to receive m elements from a terminal device, where values of the m elements are $D_1, D_2, \ldots$, and $D_m$.

The generating unit 1702 is configured to generate m scheduling MCS thresholds, where the m scheduling MCS thresholds are $D_m-D_{m-1}- \ldots -D_2-D_1, D_m-D_{m-1}- \ldots -D_2, \ldots D_m-D_{m-1}$, and $D_m$.

This embodiment of the present disclosure and the method embodiment in FIG. 15A are based on a same idea, and technical effects thereof are also the same. For a specific process, refer to the descriptions of the method embodiment in FIG. 15A. Details are not described herein again.

The data reporting method in the embodiments of the present disclosure is described in detail above, and a data reporting apparatus (an apparatus 18 for short below) in an embodiment of the present disclosure is provided below.

Figure 18:
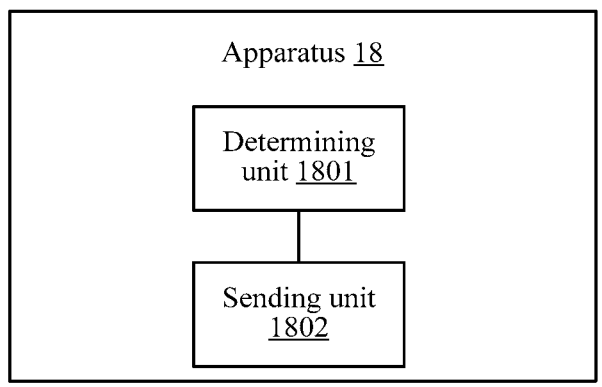
FIG. 18 is another schematic structural diagram of an apparatus according to an embodiment of the present disclosure.

It should be noted that, the apparatus 18 shown in FIG. 18 can implement a terminal device side in the embodiment shown in FIG. 5A. The apparatus 18 includes a determining unit 1801 and a sending unit 1802. The determining unit 1801 is configured to determine at least one scheduling bandwidth threshold, where a maximum scheduling bandwidth threshold in the at least one scheduling bandwidth threshold is less than or equal to a maximum bandwidth supported by a terminal device. The sending unit 1802 is configured to send the at least one scheduling bandwidth threshold to a network device.

This embodiment of the present disclosure and the method embodiment in FIG. 5A are based on a same idea, and technical effects thereof are also the same. For a specific process, refer to the descriptions of the method embodiment in FIG. 5A. Details are not described herein again.

In a possible implementation, the apparatus 18 shown in FIG. 18 can implement a terminal device side in the embodiment shown in FIG. 6A. The apparatus 18 includes a determining unit 1801 and a sending unit 1802. The determining unit 1801 is configured to determine two scheduling bandwidth thresholds, where a larger one of the two scheduling bandwidth thresholds is less than a maximum bandwidth supported by the terminal device.

The sending unit 1802 is configured to send the two scheduling bandwidth thresholds to a network device.

Optionally, a waveform used by the terminal device is DFT-S-OFDM.

Optionally, each scheduling bandwidth threshold is less than or equal to the maximum bandwidth supported by the terminal device.

This embodiment of the present disclosure and the method embodiment in FIG. 6A are based on a same idea, and technical effects thereof are also the same. For a specific process, refer to the descriptions of the method embodiment in FIG. 6A. Details are not described herein again.

In a possible implementation, the apparatus 18 shown in FIG. 18 can implement a terminal device side in the embodiment shown in FIG. 7A. The apparatus 18 includes a determining unit 1801 and a sending unit 1802. The determining unit 1801 is configured to determine at least one scheduling bandwidth threshold associated with a first subcarrier spacing. The sending unit 1802 is configured to send the at least one scheduling bandwidth threshold associated with the first subcarrier spacing to a network device.

In a possible design, the first subcarrier spacing is associated with two scheduling bandwidth thresholds, and each scheduling bandwidth threshold is less than or equal to a maximum bandwidth supported by the terminal device.

This embodiment of the present disclosure and the method embodiment in FIG. 7A are based on a same idea, and technical effects thereof are also the same. For a specific process, refer to the descriptions of the method embodiment in FIG. 7A. Details are not described herein again.

In a possible implementation, the apparatus 18 shown in FIG. 18 can implement a terminal device side in the embodiment shown in FIG. 8A. The apparatus 18 includes a determining unit 1801 and a sending unit 1802. The determining unit 1801 is configured to determine n scheduling bandwidth thresholds, where the n scheduling bandwidth thresholds are $ptrsthRB_1$, $ptrsthRB_2$, ..., and $ptrsthRB_n$, $ptrsthRB_1 < ptrsthRB_2 < ... < ptrsthRB_n$, and n is an integer greater than 1.

The sending unit 1802 is configured to send $ptrsthRB_1$, $ptrsthRB_2 - ptrsthRB_1$, ..., and $ptrsthRB_n - ptrsthRB_{n-1}$ to a network device.

Optionally, n is equal to 2, and $ptrsthRB_1$ and $ptrsthRB_2$ each are less than or equal to a maximum bandwidth supported by a terminal device.

This embodiment of the present disclosure and the method embodiment in FIG. 8A are based on a same idea, and technical effects thereof are also the same. For a specific process, refer to the descriptions of the method embodiment in FIG. 8A. Details are not described herein again.

In a possible implementation, the apparatus 18 shown in FIG. 18 can implement a terminal device side in the embodiment shown in FIG. 9A. The apparatus 18 includes a determining unit 1801 and a sending unit 1802. The determining unit 1801 is configured to determine n scheduling bandwidth thresholds, where the n scheduling bandwidth thresholds are $ptrsthRB_1$, $ptrsthRB_2$, ..., and $ptrsthRB_n$, n is an integer greater than 1, and $ptrsthRB_1 < ptrsthRB_2 < ... < ptrsthRB_n$.

The sending unit 1802 is configured to send $ptrsthRB_2 - ptrsthRB_1$, $ptrsthRB_3 - ptrsthRB_2$, ..., $ptrsthRB_n - ptrsthRB_{n-1}$, and $ptrsthRB_n$ to a network device.

Optionally, n is equal to 2, and $ptrsthRB_1$ and $ptrsthRB_2$ each are less than or equal to a maximum bandwidth supported by a terminal device.

This embodiment of the present disclosure and the method embodiment in FIG. 9A are based on a same idea, and technical effects thereof are also the same. For a specific process, refer to the descriptions of the method embodiment in FIG. 9A. Details are not described herein again.

In a possible implementation, the apparatus 18 shown in FIG. 18 can implement a terminal device side in the embodiment shown in FIG. 13A. The apparatus 18 includes a determining unit 1801 and a sending unit 1802. The determining unit 1801 is configured to determine at least one scheduling MCS threshold associated with a highest modulation scheme.

The sending unit 1802 is configured to send, to a network device, the at least one scheduling MCS threshold associated with the highest modulation scheme.

Optionally, the at least one scheduling MCS threshold includes three scheduling MCS thresholds, and a maximum scheduling MCS threshold in the three scheduling MCS thresholds is less than 1 plus a maximum MCS index value corresponding to the highest modulation scheme.

This embodiment of the present disclosure and the method embodiment in FIG. 13A are based on a same idea, and technical effects thereof are also the same. For a specific process, refer to the descriptions of the method embodiment in FIG. 13A. Details are not described herein again.

In a possible implementation, the apparatus 18 shown in FIG. 18 can implement a terminal device side in the embodiment shown in FIG. 14A. The apparatus 18 includes a determining unit 1801 and a sending unit 1802. The determining unit 1801 is configured to determine m scheduling MCS thresholds, where the m scheduling MCS thresholds are $ptrsthMCS_1$, $ptrsthMCS_2$, ..., and $ptrsthMCS_m$, m is an integer greater than 1, and $ptrsthMCS_1$, $ptrsthMCS_2$, ..., $< ptrsthMCS_m$.

The sending unit 1802 is configured to send $ptrsthMCS_1$, $ptrsthMCS_2 - ptrsthMCS_1$, ..., and $ptrsthMCS_m - ptrsthMCS_{m-1}$ to a network device.

This embodiment of the present disclosure and the method embodiment in FIG. 14A are based on a same idea, and technical effects thereof are also the same. For a specific process, refer to the descriptions of the method embodiment in FIG. 14A. Details are not described herein again.

In a possible implementation, the apparatus 18 shown in FIG. 18 can implement a terminal device side in the embodiment shown in FIG. 15A. The apparatus 18 includes a determining unit 1801 and a sending unit 1802. The determining unit 1801 is configured to determine m scheduling MCS thresholds, where at least one scheduling MCS threshold is $ptrsthMCS_1$, $ptrsthMCS_2$, ..., and $ptrsthMCS_m$, m is an integer greater than 1, and $ptrsthMCS_1 < ptrsthMCS_2$, ..., $< ptrsthMCS_m$.

The sending unit 1802 is configured to send $ptrsthMCS_2 - ptrsthMCS_1$, $ptrsthMCS_3 - ptrsthMCS_2$, ..., $ptrsthMCS_m - ptrsthMCS_{m-1}$, and $ptrsthMCS_m$ to a network device.

This embodiment of the present disclosure and the method embodiment in FIG. 15A are based on a same idea, and technical effects thereof are also the same. For a specific process, refer to the descriptions of the method embodiment in FIG. 15A. Details are not described herein again.

The apparatus 18 may be a terminal device, or the apparatus 18 may be a field-programmable gate array (FPGA), a dedicated integrated circuit, a system on chip (SoC), a central processing unit (CPU), a network processor (NP), a digital signal processing circuit, or a micro controller unit (MCU) for implementing a related function, or may be a programmable logic device (PLD) or another integrated circuit.

Figure 19:
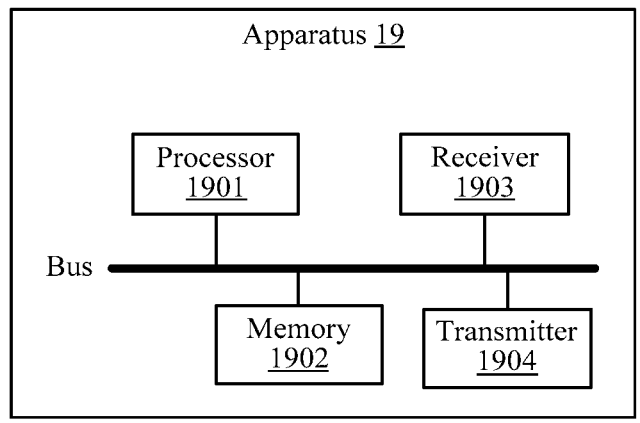
FIG. 19 is another schematic structural diagram of an apparatus according to an embodiment of the present disclosure.

FIG. 19 is a schematic structural diagram of an apparatus according to an embodiment of the present disclosure. The apparatus is briefly referred to as an apparatus 19. The apparatus 19 may be integrated into the foregoing network device or terminal device. As shown in FIG. 19, the apparatus includes a memory 1902, a processor 1901, a transmitter 1904, and a receiver 1903.

The memory 1902 may be an independent physical unit, and is connected to the processor 1901, the transmitter 1904, and the receiver 1903 by using a bus. The memory 1902, the processor 1901, the transmitter 1904, and the receiver 1903 may be integrated together, implemented through hardware, and the like.

The transmitter 1904 and the receiver 1903 may be further connected to an antenna. The receiver 1903 receives, through the antenna, information sent by another device, and correspondingly, the transmitter 1904 sends information to another device through the antenna.

The memory 1902 is configured to store a program for implementing the foregoing method embodiment or the modules in the foregoing apparatus embodiment. The processor 1901 invokes the program, to perform an operation in the foregoing method embodiment.

Optionally, when some or all of the steps in the method in the foregoing embodiment are implemented through software, the apparatus may alternatively include only the processor. The memory configured to store a program is located outside the apparatus, and the processor is connected to the memory through a circuit/wire, and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory may include a volatile memory, for example, a random access memory (RAM); or the memory may include a non-volatile memory, for example, a flash memory, a hard disk drive (HDD), or a solid-state drive (SSD); or the memory may include a combination of the foregoing types of memories.

Figure 20:
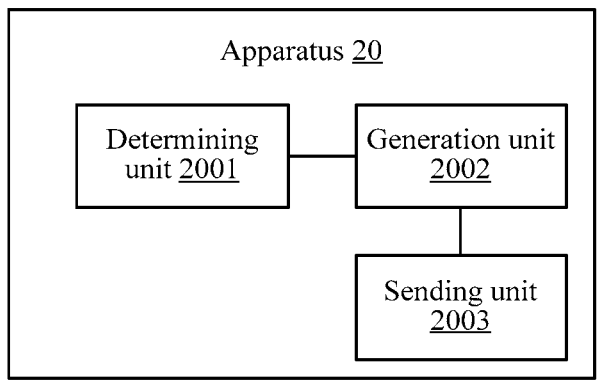
FIG. 20 is another schematic structural diagram of an apparatus according to an embodiment of the present disclosure.

In a possible implementation, an apparatus 20 shown in FIG. 20 can implement a network device side in the embodiment shown in FIG. 2B. The apparatus 20 includes a determining unit 2001, a generating unit 2002, and a sending unit 2003. The determining unit 2001 is configured to determine at least one scheduling bandwidth threshold, where each scheduling bandwidth threshold is a natural number power of 2.

The generating unit 2002 is configured to obtain at least one element based on the at least one scheduling bandwidth threshold, where each scheduling bandwidth threshold is used to indicate one of the at least one scheduling bandwidth threshold.

The sending unit 2003 is configured to send the at least one element to a terminal device.

Optionally, a value of each element is a logarithm of the indicated scheduling bandwidth threshold to a base 2.

Optionally, a maximum scheduling bandwidth threshold in the at least one scheduling bandwidth threshold is less than or equal to a maximum bandwidth supported by the terminal device.

Optionally, each of the at least one scheduling bandwidth threshold is greater than a preset value.

This embodiment of the present disclosure and the method embodiment in FIG. 2B are based on a same idea, and technical effects thereof are also the same. For a specific process, refer to the descriptions of the method embodiment in FIG. 2B. Details are not described herein again.

In another possible implementation, the apparatus 20 shown in FIG. 20 can implement a network device side in the embodiment shown in FIG. 5B. The apparatus 20 includes a determining unit 2001, a generating unit 2002, and a sending unit 2003. The determining unit 2001 is configured to determine at least one scheduling bandwidth threshold, where a minimum scheduling bandwidth threshold in the at least one scheduling bandwidth threshold is greater than a preset value.

The generating unit 2002 is configured to obtain at least one element, where each element is used to indicate one of the at least one scheduling bandwidth threshold. The sending unit 2003 is configured to send the at least one element to a terminal device.

Optionally, each scheduling bandwidth threshold is a natural number power of 2.

Optionally, each scheduling bandwidth threshold is a product of a natural number power of 2, a natural number power of 3, and a natural number power of 5.

This embodiment of the present disclosure and the method embodiment in FIG. 5B are based on a same idea, and technical effects thereof are also the same. For a specific process, refer to the descriptions of the method embodiment in FIG. 5B. Details are not described herein again.

In another possible implementation, the apparatus 20 shown in FIG. 20 can implement a network device side in the embodiment shown in FIG. 4B. The apparatus 20 includes a determining unit 2001, a generating unit 2002, and a sending unit 2003. The determining unit 2001 is configured to determine at least one scheduling bandwidth threshold, where each scheduling bandwidth threshold is a product of a natural number power of 2, a natural number power of 3, and a natural number power of 5. The generating unit 2002 is configured to obtain at least one element based on the at least one scheduling bandwidth threshold, where each element is used to indicate one of the at least one scheduling bandwidth threshold. The sending unit 2003 is configured to send the at least one element to a terminal device.

Optionally, a used waveform is DFT-S-OFDM.

Optionally, each scheduling bandwidth threshold is less than or equal to a maximum bandwidth supported by the terminal device.

This embodiment of the present disclosure and the method embodiment in FIG. 4B are based on a same idea, and technical effects thereof are also the same. For a specific process, refer to the descriptions of the method embodiment in FIG. 4B. Details are not described herein again.

In another possible implementation, the apparatus 20 shown in FIG. 20 can implement a terminal device side in the embodiment shown in FIG. 10B. The apparatus 20 includes a determining unit 2001, a generating unit 2002, and a sending unit 2003. The determining unit 2001 is configured to determine at least one scheduling MCS threshold, where each scheduling MCS threshold is an even number.

The generating unit 2002 is configured to obtain at least one element, where each element is used to indicate one of the at least one scheduling MCS threshold.

The sending unit 2003 is configured to send the at least one element to a terminal device.

In a possible design, each scheduling MCS threshold is greater than a preset value.

This embodiment of the present disclosure and the method embodiment in FIG. 10B are based on a same idea, and technical effects thereof are also the same. For a specific process, refer to the descriptions of the method embodiment in FIG. 10B. Details are not described herein again.

In another possible implementation, the apparatus 20 shown in FIG. 20 can implement a terminal device side in the embodiment shown in FIG. 11B. The apparatus 20 includes a determining unit 2001, a generating unit 2002, and a sending unit 2003. The determining unit 2001 is configured to determine at least one scheduling MCS threshold, where each scheduling MCS threshold is an odd number.

The generating unit 2002 is configured to obtain at least one element, where each element is used to indicate one of the at least one scheduling MCS threshold.

The sending unit 2003 is configured to send the at least one element to a terminal device.

Optionally, each scheduling MCS threshold is greater than a preset value.

This embodiment of the present disclosure and the method embodiment in FIG. 11B are based on a same idea, and technical effects thereof are also the same. For a specific process, refer to the descriptions of the method embodiment in FIG. 11B. Details are not described herein again.

The apparatus 20 may be a network device, or the apparatus 20 may be a field-programmable gate array (FPGA), a dedicated integrated circuit, a system on chip (SoC), a central processing unit (CPU), a network processor (NP), a digital signal processing circuit, or a micro controller unit (MCU) for implementing a related function, or may be a programmable logic device (PLD) or another integrated circuit.

Figure 21:
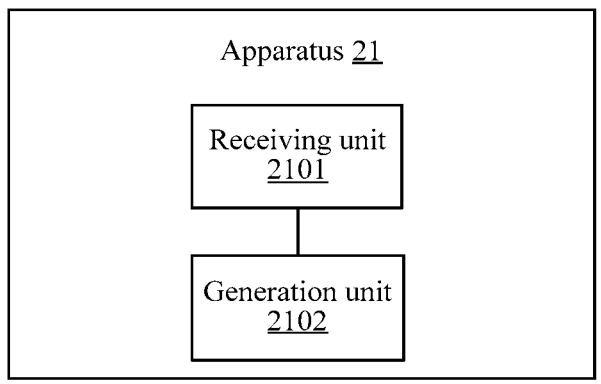
FIG. 21 is another schematic structural diagram of an apparatus according to an embodiment of the present disclosure.

In a possible implementation, an apparatus 21 shown in FIG. 21 can implement a terminal device side in the embodiment shown in FIG. 2B. The apparatus 21 includes a receiving unit 2101 and a generating unit 2102.

The receiving unit 2101 is configured to receive at least one element from a network device, where each element is used to indicate one scheduling bandwidth threshold.

The generating unit 2102 is configured to obtain at least one scheduling bandwidth threshold based on the at least one element, where each scheduling bandwidth threshold is a natural number power of 2.

Optionally, each scheduling bandwidth threshold is equal to a $k^{th}$ power of 2, where k is a value of a corresponding element.

This embodiment of the present disclosure and the method embodiment in FIG. 2B are based on a same idea, and technical effects thereof are also the same. For a specific process, refer to the descriptions of the method embodiment in FIG. 2B. Details are not described herein again.

In another possible implementation, the apparatus 21 shown in FIG. 21 can implement a network device side in the embodiment shown in FIG. 4B. The apparatus 21 includes a receiving unit 2101 and a generating unit 2102. The receiving unit 2101 is configured to receive at least one element from a network device, where each element is used to indicate one scheduling bandwidth threshold.

The generating unit 2102 is configured to obtain at least one scheduling bandwidth threshold based on the at least one element, where each scheduling bandwidth threshold is a product of a natural number power of 2, a natural number power of 3, and a natural number power of 5.

In a possible design, a waveform used by the terminal device is a DFT-S-OFDM waveform.

This embodiment of the present disclosure and the method embodiment in FIG. 4B are based on a same idea, and technical effects thereof are also the same. For a specific process, refer to the descriptions of the method embodiment in FIG. 4B. Details are not described herein again.

In another possible implementation, it should be noted that, the apparatus 21 shown in FIG. 21 can implement a terminal device side in the embodiment shown in FIG. 7B. The apparatus 21 includes a receiving unit 2101 and a determining unit 2102. The receiving unit 2101 is configured to receive, from a network device, at least one scheduling bandwidth threshold associated with a first subcarrier spacing.

The generating unit 2102 is configured to determine, based on a ratio relationship between the first subcarrier spacing and a second subcarrier spacing, at least one scheduling bandwidth threshold associated with the second subcarrier spacing.

Optionally, the first subcarrier spacing is associated with two scheduling bandwidth thresholds, and each scheduling bandwidth threshold is less than or equal to a maximum bandwidth supported by the terminal device.

This embodiment of the present disclosure and the method embodiment in FIG. 7B are based on a same idea, and technical effects thereof are also the same. For a specific process, refer to the descriptions of the method embodiment in FIG. 7B. Details are not described herein again.

In another possible implementation, it should be noted that, the apparatus 21 shown in FIG. 21 can implement a network device side in the embodiment shown in FIG. 8B. The apparatus 21 includes a receiving unit 2101 and a generating unit 2102. The receiving unit 2101 is configured to receive n elements from a network device, where n is an integer greater than 1, and values of then elements are $C_1$, $C_2, \ldots,$ and $C_n$.

The generating unit 2102 is configured to generate n scheduling bandwidth thresholds based on the n elements, where the n scheduling bandwidth thresholds are $C_1$, $C_1+C_2, \ldots,$ and $C_1+C_2+ \ldots +C_2$.

Optionally, n is equal to 2, and ptrsthRB$_1$ and ptrsthRB$_2$ each are less than or equal to 1 plus a maximum bandwidth supported by a terminal device.

This embodiment of the present disclosure and the method embodiment in FIG. 8B are based on a same idea, and technical effects thereof are also the same. For a specific process, refer to the descriptions of the method embodiment in FIG. 8B. Details are not described herein again.

In another possible implementation, the apparatus 21 shown in FIG. 21 can implement a network device side in the embodiment shown in FIG. 9B. The apparatus 21 includes a receiving unit 2101 and a generating unit 2102. The receiving unit 2101 is configured to receive n elements from a network device, where n is an integer greater than 1, and values of then elements are $C_1, C_2, \ldots,$ and $C_n$.

The generating unit 2102 is configured to generate, by a terminal device, n scheduling bandwidth thresholds based on the n elements, where the n scheduling bandwidth thresholds are $C_n C_{n-1}-, \ldots, -C_2-C_1, C_n-C_{n-1}-, \ldots, C_2, \ldots, C_n-C_{n-1}, \ldots,$ and $C_n$.

This embodiment of the present disclosure and the method embodiment in FIG. 9B are based on a same idea, and technical effects thereof are also the same. For a specific process, refer to the descriptions of the method embodiment in FIG. 9B. Details are not described herein again.

In another possible implementation, it should be noted that, the apparatus 21 shown in FIG. 21 can implement a network device side in the embodiment shown in FIG. 14B. The apparatus 21 includes a receiving unit 2101 and a generating unit 2102. The receiving unit 2101 is configured to receive m elements sent by a network device, where values of the m elements are $D_1, D_2, \ldots,$ and $D_m$.

The generating unit 2102 is configured to generate m scheduling MCS thresholds, where the m MCS thresholds are $D_1, D_1+D_2, \ldots,$ and $D_1+D_2+ \ldots +D_1+D_m$.

This embodiment of the present disclosure and the method embodiment in FIG. 14B are based on a same idea, and technical effects thereof are also the same. For a specific process, refer to the descriptions of the method embodiment in FIG. 14B. Details are not described herein again.

In another possible implementation, it should be noted that, the apparatus 21 shown in FIG. 21 can implement a network device side in the embodiment shown in FIG. 15B. The apparatus 21 includes a receiving unit 2101 and a generating unit 2102. The receiving unit 2101 is configured to receive m elements from a network device, where values of the m elements are $D_1, D_2, \ldots,$ and $D_m$.

The generating unit 2102 is configured to generate m scheduling MCS thresholds, where the m scheduling MCS thresholds are $D_m-D_{m-1}- \ldots -D_2-D_1, D_m-D_{m-1}- \ldots -D_2, \ldots D_m-D_{m-1},$ and $D_m$.

This embodiment of the present disclosure and the method embodiment in FIG. 15B are based on a same idea, and technical effects thereof are also the same. For a specific process, refer to the descriptions of the method embodiment in FIG. 15B. Details are not described herein again.

The apparatus 21 may be a terminal device, or the apparatus 21 may be a field-programmable gate array (FPGA), a dedicated integrated circuit, a system on chip (SoC), a central processing unit (CPU), a network processor (NP), a digital signal processing circuit, or a micro controller unit (MCU) for implementing a related function, or may be a programmable logic device (PLD) or another integrated circuit.

In the foregoing embodiments, a sending module or a transmitter performs sending steps in the foregoing method embodiments, a receiving module or a receiver performs receiving steps in the foregoing method embodiments, and other steps are performed by other modules or processors. The sending module and the receiving module can form a transceiver module, and the receiver and the transmitter can form a transceiver.

An embodiment of this application further provides a computer storage medium, storing a computer program. The computer program is used to perform the random access method in the foregoing embodiment.

An embodiment of this application further provides a computer program product including an instruction. When the computer program product is run on a computer, the computer is enabled to perform the random access method in the foregoing embodiment.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A communication method, comprising:
   determining, by a network device, at least one modulation and coding scheme (MCS) threshold; and
   sending, by the network device, the at least one MCS threshold, wherein the at least one MCS threshold is for a terminal device;
   wherein the at least one MCS threshold and a maximum MCS threshold are associated with a first MCS table corresponding to a highest modulation scheme supported by the terminal device; and
   wherein:
      the highest modulation scheme supported by the terminal device is 64 quadrature amplitude modulation (QAM), and the maximum MCS threshold is 29; or
      the highest modulation scheme supported by the terminal device is 256 QAM, and the maximum MCS threshold is 28.

2. The method according to claim 1, wherein the at least one MCS threshold comprises three MCS thresholds, wherein each MCS threshold of the three MCS thresholds is less than the maximum MCS threshold.

3. The method according to claim 1, wherein the at least one MCS threshold comprises three MCS thresholds, and a maximum MCS threshold among the three MCS thresholds is less than or equal to 1 plus a maximum MCS index value corresponding to a code rate in the first MCS table.

4. The method according to claim 1,
   wherein the highest modulation scheme supported by the terminal device is 256 QAM; and
   wherein an MCS threshold associated with a second MCS table that corresponds to 64QAM is not sent by the network device for the terminal device.

5. The method according to claim 1, further comprising:
   receiving, by the network device, the highest modulation scheme supported by the terminal device; and
   determining, by the network device, the maximum MCS threshold based on the highest modulation scheme supported by the terminal device.

6. The method according to claim 1, wherein the at least one MCS threshold comprises three MCS thresholds, and at least one of the maximum MCS threshold or the three MCS thresholds is used for determining phase tracking reference signal (PTRS) time domain density.

7. A communication method, comprising:
   receiving, by a terminal device from a network device, at least one modulation and coding scheme (MCS) threshold;
   wherein the at least one MCS threshold and a maximum MCS threshold are associated with a first MCS table corresponding to a highest modulation scheme supported by the terminal device; and
   wherein:
      the highest modulation scheme supported by the terminal device is 64 quadrature amplitude modulation (QAM), and the maximum MCS threshold is 29; or
      the highest modulation scheme supported by the terminal device is 256 QAM, and the maximum MCS threshold is 28.

8. The method according to claim 7, wherein the at least one MCS threshold comprises three MCS thresholds, wherein each MCS threshold of the three MCS thresholds is less than the maximum MCS threshold.

9. The method according to claim 7, wherein the at least one MCS threshold comprises three MCS thresholds, and a maximum MCS threshold among the three MCS thresholds is less than or equal to 1 plus a maximum MCS index value corresponding to a code rate in the first MCS table.

10. The method according to claim 7,
wherein the highest modulation scheme supported by the terminal device is 256 QAM; and
wherein an MCS threshold associated with a second MCS table that corresponds to 64QAM is not received by the terminal device from the network device.

11. The method according to claim 7, wherein the at least one MCS threshold comprises three MCS thresholds, and at least one of the maximum MCS threshold or the three MCS thresholds is used for determining phase tracking reference signal (PTRS) time domain density.

12. The method according to claim 7, wherein before receiving the at least one MCS threshold from the network device, the method further comprising:
reporting, by the terminal device to the network device, three MCS thresholds associated with the first MCS table and determined by the terminal device.

13. An apparatus, comprising:
a processor; and
a memory, wherein the memory stores a program, and the processor is configured to execute the program to cause the apparatus to:
determine at least one modulation and coding scheme (MCS) threshold; and
send the at least one MCS threshold, wherein the at least one MCS threshold is for a terminal device;
wherein the at least one MCS threshold and a maximum MCS threshold are associated with a first MCS table corresponding to a highest modulation scheme supported by the terminal device; and
wherein:
the highest modulation scheme supported by the terminal device is 64 quadrature amplitude modulation (QAM), and the maximum MCS threshold is 29; or
the highest modulation scheme supported by the terminal device is 256 QAM, and the maximum MCS threshold is 28.

14. The apparatus according to claim 13,
wherein the at least one MCS threshold comprises three MCS thresholds; and
wherein:
a maximum MCS threshold among the three MCS thresholds is less than or equal to 1 plus a maximum MCS index value corresponding to a code rate in the first MCS table; or
each MCS threshold of the three MCS thresholds is less than the maximum MCS threshold.

15. The apparatus according to claim 13,
wherein the highest modulation scheme supported by the terminal device is 256 QAM; and
wherein an MCS threshold associated with a second MCS table that corresponds to 64QAM is not sent by the apparatus for the terminal device.

16. The apparatus according to claim 13, wherein the at least one MCS threshold comprises three MCS thresholds, and at least one of the maximum MCS threshold or the three MCS thresholds is used for determining phase tracking reference signal (PTRS) time domain density.

17. An apparatus, comprising:
a processor; and
a memory, wherein the memory stores a program, and the processor is configured to execute the program to cause the apparatus to receive at least one modulation and coding scheme (MCS) threshold;
wherein the at least one MCS threshold and a maximum MCS threshold are associated with a first MCS table corresponding to a highest modulation scheme supported by the apparatus; and
wherein:
the highest modulation scheme supported by the apparatus is 64 quadrature amplitude modulation (QAM), and the maximum MCS threshold is 29; or
the highest modulation scheme supported by the apparatus is 256 QAM, and the maximum MCS threshold is 28.

18. The apparatus according to claim 17,
wherein the at least one MCS threshold comprises three MCS thresholds; and
wherein:
a maximum MCS threshold among the three MCS thresholds is less than or equal to 1 plus a maximum MCS index value corresponding to a code rate in the first MCS table; or
each MCS threshold of the three MCS thresholds is less than the maximum MCS threshold.

19. The apparatus according to claim 17,
wherein the highest modulation scheme supported by the apparatus is 256 QAM; and
wherein an MCS threshold associated with a second MCS table that corresponds to 64QAM is not received by the apparatus.

20. The apparatus according to claim 17, wherein the at least one MCS threshold comprises three MCS thresholds, and at least one of the maximum MCS threshold or the three MCS thresholds is used for determining phase tracking reference signal (PTRS) time domain density.

21. The apparatus according to claim 17, wherein executing the program further causes the apparatus to:
report three MCS thresholds associated with the first MCS table.

* * * * *